US009027846B2

(12) United States Patent
Zhadanovsky

(10) Patent No.: US 9,027,846 B2
(45) Date of Patent: May 12, 2015

(54) VACUUM SUSTAINING HEATING SYSTEMS AND METHODS

(71) Applicant: Igor Zhadanovsky, West Newton, MA (US)

(72) Inventor: Igor Zhadanovsky, West Newton, MA (US)

( * ) Notice: Subject to any disclaimer, the term of this patent is extended or adjusted under 35 U.S.C. 154(b) by 0 days.

(21) Appl. No.: 14/553,751

(22) Filed: Nov. 25, 2014

(65) Prior Publication Data

US 2015/0076241 A1  Mar. 19, 2015

Related U.S. Application Data

(63) Continuation-in-part of application No. 14/256,978, filed on Apr. 20, 2014, which is a continuation of application No. 14/025,292, filed on Sep. 12, 2013, now Pat. No. 8,702,013.

(60) Provisional application No. 61/908,485, filed on Nov. 25, 2013, provisional application No. 61/702,533, filed on Sep. 18, 2012.

(51) Int. Cl.
*F24D 1/08* (2006.01)
*F24D 19/10* (2006.01)
(Continued)

(52) U.S. Cl.
CPC .............. *F24D 19/1003* (2013.01); *F24D 1/08* (2013.01); *F24D 19/0012* (2013.01); *F24D 19/081* (2013.01)

(58) Field of Classification Search
CPC .............. F24D 1/08; F24D 1/02; F24D 1/00; F24D 19/0004; F24D 19/0009; F24D 19/0012; F24D 19/081; F24D 19/1003; F24D 2200/046; F24D 27/006; F24D 15/02; F24D 15/0209; F04B 49/06; F04B 49/065; F04B 49/02; F04B 2205/10
USPC ................ 237/74, 73, 67, 16, 17, 18, 7, 9 R; 432/91; 417/32
IPC .................................................. F24D 1/08, 1/02
See application file for complete search history.

(56) References Cited

U.S. PATENT DOCUMENTS 318,401 A * 5/1885 Tudo .............................. 237/9 R
788,314 A * 4/1905 Hepburn ....................... 122/412
(Continued)

FOREIGN PATENT DOCUMENTS

JP         60186626 A * 9/1985 ................ F24D 1/00
JP         62119330 A * 5/1987 ................ F24D 1/08
(Continued)

OTHER PUBLICATIONS

"Trane Vapor System," Everything2.com, Retrieved Oct. 23, 2013, Available at: http://everything2.com/title/Trane+Vapor+System.
(Continued)

*Primary Examiner* — Steven B McAllister
*Assistant Examiner* — Daniel E Namay
(74) *Attorney, Agent, or Firm* — American Patent Agency PC; Karl P. Dresdner, Jr.; Daniar Hussain

(57) ABSTRACT

In order to solve the numerous problems with existing steam, vacuum, and hot water heating systems, presented are novel systems and methods of vapor vacuum heating having several improvements over the prior art, including: condensate return which can operate without steam traps; naturally-induced vacuum; improved vacuum pump operation for sustaining vacuum in such systems; liquid lift apparatus for use with such systems; and other improvements. All innovations presented herein make vapor vacuum heating more efficient and economical for industrial, commercial, and home applications. A field test conducted with these innovations show results of about 26-50% reduced energy usage, implying significant energy savings from the use of the present invention over current heating systems.

29 Claims, 29 Drawing Sheets

(51) Int. Cl.
*F24D 19/00* (2006.01)
*F24D 19/08* (2006.01)
*F24D 1/02* (2006.01)
*F24D 1/00* (2006.01)

(56) References Cited

U.S. PATENT DOCUMENTS

| | | | | | |
|---|---|---|---|---|---|
| 792,283 | A | * | 6/1905 | Osborne | 237/67 |
| 820,809 | A | * | 5/1906 | Morgan | 237/9 R |
| 847,934 | A | * | 3/1907 | Gifford | 237/67 |
| 874,112 | A | * | 12/1907 | Peck | 237/9 R |
| 874,113 | A | * | 12/1907 | Peck | 237/67 |
| 1,721,693 | A | * | 7/1929 | Ford | 237/67 |
| 1,968,834 | A | | 8/1934 | Jones | |
| 1,986,391 | A | * | 1/1935 | Crosthwait, Jr. | 237/67 |
| 2,004,226 | A | | 6/1935 | Stickle | |
| 2,868,461 | A | * | 1/1959 | Gaddis | 237/9 R |
| 4,090,557 | A | | 5/1978 | Currier | |
| 4,398,663 | A | * | 8/1983 | Hegberg | 237/9 R |
| 8,702,013 | B2 | | 4/2014 | Zhadanovsky | |
| 2008/0173723 | A1 | | 7/2008 | Zhadanovsky | |
| 2011/0198406 | A1 | | 8/2011 | Zhadanovsky | |
| 2014/0030112 | A1 | * | 1/2014 | Klein et al. | 417/32 |
| 2014/0034743 | A1 | | 2/2014 | Zhadanovsky | |
| 2014/0217191 | A1 | | 8/2014 | Zhadanovsky | |

FOREIGN PATENT DOCUMENTS

| | | | | | |
|---|---|---|---|---|---|
| JP | 63032223 | A | * | 2/1988 | F24D 1/08 |
| JP | 04306422 | A | * | 10/1992 | F24D 7/00 |
| JP | 04366322 | A | * | 12/1992 | F24D 1/08 |
| KR | 2011058442 | A | * | 6/2011 | F24D 3/18 |
| WO | WO2009117296 | A3 | | 3/2009 | |
| WO | WO2012093310 | A2 | | 7/2012 | |

OTHER PUBLICATIONS

"TLV Vacuumizer: Vacuum steam heating and cooling system," TLV International, Inc. corporate brochure, Retrieved Oct. 23, 2013, Available at: http://www.tlv.com/global_pdf/tii/e-pamphlet-04-hp.pdf.

Holohan, Dan, "The Lost Art of Steam Heating," pp. 242-253, 259-267, Dan Holohan Associates, Beth Page, NC, 2002. (ISBN 0-9743960-9-5).

Freeman, Rob, Jr., "ITC Steam Temperature Control System," Johnson Controls Inc., Nov. 8, 2009, Available at: http://www.green-buildings.com/content/781087-itc-steam-temperature-control-system.

Zhadanovsky, Igor, "Vapor Heating System with Naturally Induced Vacuum (VHSNIV)," IDEA Conference, Indianapolis, IN, Jun. 13-16, 2010.

Zhadanovsky, Igor, "Steam Heating System Upgrade to Vapor Heating System with Naturally Induced Vacuum (VHSNIV)," ASHRAE Transactions, vol. 117, Part 2, Montreal, QC, Jul. 1, 2011.

Zhadanovsky, Igor, "Vapor Vacuum Heating Technology," CIBSE ASHRAE Technical Symposium, Imperial College, London, UK, Apr. 18-19, 2012.

Zhadanovsky, Igor, "Scrutinizing Condensing Boilers With the Second Law of Thermodynamics (SLT)," Blog posted May 29, 2013, Retrieved Oct. 23, 2013, Available at: http://homeenergypros.lbl.gov/profiles/blogs/scrutinizing-condensing-boilers-with-the-second-law-of.

Eco Property, "NextGen Heating," Episode 4, Aug. 29, 2014. Available at http://boazentertainment.net/2014/08/29/eco-property-ep04-nextgen-heating/.

Zhadanovsky, Igor, "Cost Efficiency comparison for Hot-Water Condensing Boiler (HWCB) and Vapor Vacuum Heating and Condensing Boiler (VVHCB) combo," Conference Proceedings, ASHRAE, vol. 120, Pt. 2, 2014.

Zhadanovsky, Igor, "Vacuum Steam Heating: Past, present, future?" District Energy, 4th Quarter, vol. 100, No. 4, p. 27-31, 2014.

Dunham, C.A., "High Altitude Heating for Buildings: An Explanation of Dunham Sub-Atmospheric Steam Heating," Brochure No. 632, originally published 1944.

Zhadanovsky, Igor, "Pilot retrofit of steam heating system into Vacuum Heating System (VHS)," Technical Paper Session 6 on New Energy Efficient Technologies for Hydronic Heating and Cooling Systems, ASHRAE Annual Conference, Seattle, 2014.

King, Alfred, "Practical Steam and Hot Water Heating and Ventilation," Digitized Google Book, originally published 1908.

* cited by examiner

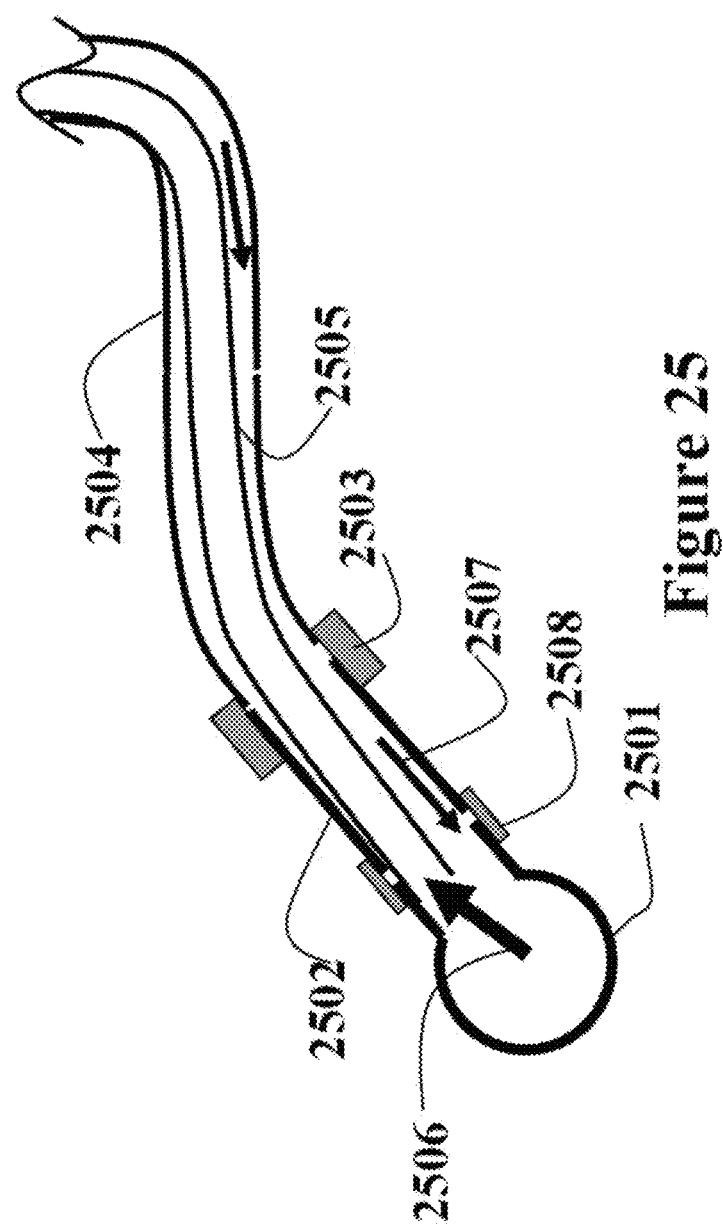

VACUUM SUSTAINING HEATING SYSTEMS AND METHODS

REFERENCES TO RELATED APPLICATIONS

This application is a Non-Provisional application and claims the benefit of priority from a Provisional application U.S. Ser. No. 61/908,485, filed Nov. 25, 2013, entitled "Vacuum Sustaining Heating System," the entirety of which is hereby incorporated by reference herein.

Furthermore, this application is a Continuation-In-Part of non-provisional application U.S. Ser. No. 14/256,978, filed Apr. 20, 2014, entitled "Vapor Vacuum Condensing Boiler Designs," which itself claims the benefit of priority from a non-provisional application U.S. Ser. No. 14/025,292, filed Sep. 12, 2013, entitled "Vapor vacuum heating systems and integration with condensing vacuum boilers," issued as U.S. Pat. No. 8,702,013, which itself claims the benefit of priority from a provisional application U.S. Ser. No. 61/702,533, filed on Sep. 18, 2012, entitled "Condensing boiler and vapor vacuum heating system combo," the entirety of all of which are hereby incorporated by reference herein.

FIELD OF THE INVENTION

The present invention relates generally to closed-loop, two-pipe vapor vacuum distribution systems. More specifically, some of such systems comprise a vapor source, a plurality of radiators, a separator to separate condensate for return to the vapor source, a vacuum pump, and a vacuum pump control unit for controlling the vacuum pump based on the vapor temperature in the separator.

BACKGROUND OF THE INVENTION

The statements in this section merely provide background information related to the present disclosure and may not constitute prior art.

Existing positive low-pressure steam heating systems provide simple and reliable techniques for heating in a wide variety of industrial, commercial, and residential applications. Water (as a liquid) heated in a boiler becomes steam (a gas), which then rises through the feeder pipes (conduits) and condenses in radiators, giving off its latent heat. Radiators become hot and heat up objects in the room directly as well as the surrounding air. Steam is traditionally delivered under a low pressure of up to 2 psig at 218° F. in order to improve boiler safety and efficiency.

An existing steam system can be converted to a vapor (steam) vacuum system by operating under 5-10 inches of Hg vacuum. Although there are some efficiency gains, the conversion of a steam system into a vacuum system results in an increased maintenance cost due to additional vacuum equipment, condensate pumps, and electricity usage. In existing vacuum systems, steam traps are utilized in which condensate is separated from steam, sucked by a vacuum pump, and returned into the system by a water pump. Malfunctioning steam trap deteriorates vacuum system performance, causes vacuum pump overload by hot vapor and is a major maintenance, repair, and replacement problem. Few new vacuum systems have been installed in the last fifty years due to high installation and maintenance costs.

Existing steam (vapor) systems are robust and reliable but have multiple problems, including high installation costs, noise, uneven heat distribution, and control difficulties. Therefore, many worn out steam systems are being retrofitted into hot water heating systems. However, such retrofits are very expensive because the boiler and the old plumbing have to be replaced which requires significant demolition of building internals. Alternatively, the level of building destruction is much less for conversion of a steam into a vacuum system and the existing steam boiler can be utilized. Therefore, a low-cost and efficient vacuum system would be an advantageous alternative for steam system retrofits as well as for new heating system installations.

Accordingly, as recognized by the present inventor, what are needed are novel systems and methods for improved vapor vacuum systems. Therefore, it would be an advancement in the state of the art to provide an apparatus, system, and method for improved vapor vacuum. It is against this background that various embodiments of the present invention were developed.

BRIEF SUMMARY OF THE INVENTION

Accordingly, one embodiment of the present invention is a heating system integrating a closed-loop, two-pipe vapor vacuum distribution system, as illustratively shown in FIG. 15. The heating system comprises a vapor source adapted to generate vapor, the vapor source having a vapor source temperature sensor and a vapor source pressure sensor adapted to sense a vapor source temperature and a vapor source pressure at an exit of the vapor source; a plurality of radiators; an up-feeder conduit connecting said vapor source to said radiators; a down-return conduit for returning condensate by gravity from each radiator, wherein said down-return conduit contains no steam traps; a separator adapted to separate condensate into liquid and gas phases, and to feed the liquid phase into the vapor source, wherein the separator comprises a gravity return condensate line from the separator via a check valve into the vapor source, and wherein the separator comprises a separator temperature sensor at an entrance of the separator adapted to sense a separator temperature of the condensate at the entrance of the separator; a vacuum pump connected to the top end of the separator to evacuate air from the system to a preset vacuum interval, wherein the vapor source, the radiators, the up-feeder conduit, the down-return conduit, and the separator are sufficiently air-tight to ensure vacuum pump operation; a vapor source control unit for controlling the vapor source based on a building temperature controller, and additionally based on a preset vapor source temperature interval by measuring the vapor source temperature sensed by the vapor source temperature sensor and/or the vapor source pressure sensed by the vapor source pressure sensor; and a vacuum pump control unit for controlling the vacuum pump based on the vapor source pressure sensor to maintain the preset vacuum interval in the system, and additionally based on a preset separator limiting temperature of the separator temperature sensor, wherein when the vapor source is on and the separator temperature is below the preset separator limiting temperature, the vacuum pump is turned on, and wherein when the vapor source is on and the separator temperature exceeds the preset separator limiting temperature, the vacuum pump is turned off, thereby switching the vacuum pump off when hot vapor enters the separator and allowing the vacuum pump to remove only air without being exposed to hot vapor.

Another embodiment of the present invention is the system described above, wherein the preset vacuum interval is within 5 to 20 inches Hg, with the system producing a higher vacuum itself during a cooling phase.

Another embodiment of the present invention is the system described above, wherein the preset vacuum interval is within 5 to 15 inches Hg when vapor source is on, and within 10 to 20 inches Hg when vapor source is off, with the system producing a higher vacuum itself during a cooling phase.

Another embodiment of the present invention is the system described above, wherein supply conduit tubing and fittings provision condensate return channel at the bottom of vapor supply conduit.

Another embodiment of the present invention is the system described above, wherein at temperature as low as 20° C. on the return line at the separator entrance, temperature controller stops vacuum pump and the preset vacuum interval is within 27 inch Hg (off) and up to 2 psig (on).

Another embodiment of the present invention is the system described above, wherein the preset vapor source temperature interval is a function of outside temperature.

Another embodiment of the present invention is the system described above, wherein the vapor source is a boiler.

Another embodiment of the present invention is the system described above, wherein the vapor source, located at a building top, supplies vapor into the radiators via down-feed from the building top.

Another embodiment of the present invention is the system described above, wherein radiators on lowest floor(s) of high rise buildings are connected to the separator via a separate line in order to prevent condensate flooding from the radiators on higher floors.

Another embodiment of the present invention is the system described above, further comprising a plurality of one or more additional separators.

Another embodiment of the present invention is the system described above, wherein heat distribution through parts of the system is controlled by changing a vacuum level in the separators.

Another embodiment of the present invention is the system described above, wherein the vapor source is located on a top of a building and comprises an evaporating section and a storage section, wherein condensate from a bottom is periodically returned into the storage section of the vapor source by a liquid lift apparatus.

Another embodiment of the present invention is the system described above, wherein the liquid lift apparatus is adapted to pumping liquid to a height above 10 meters by using a liquid lift vacuum pump, the liquid lift apparatus comprising: means for filling a lowest compartment with a liquid, closing a liquid supply line, connecting the lowest compartment to atmosphere; means for switching the liquid lift vacuum pump on and pulling the liquid from a compartment at a bottom to a compartment at a top via transport tubes connecting a bottom of a lower compartment to a top of a compartment above; and means for switch the liquid lift vacuum pump off when all of the liquid from a lowest compartment is pulled to a top-most compartment by vacuum, opening a valve to discharge the liquid from the top-most compartment, and closing the valve.

Another embodiment of the present invention is the system described above, wherein the vapor source is a heat exchanger with heat supplied into the heat exchanger from a district heating grid.

Another embodiment of the present invention is the system described above, wherein the vapor source is steam from a district heating grid supplied under a perforated plate of an evaporator, and condensate is periodically returned into the district heating grid via a condensate separator located at a building bottom.

Another embodiment of the present invention is the system described above, further comprising means to prevent condensate hammering in return lines of the heating system, wherein the return lines from the radiators to a vertical collector line are smaller in diameter, and wherein the vertical collector is divided into compartments by soxhlet like separators.

Another embodiment of the present invention is the system described above, wherein an electrostatic capacitive sensor in the separator is calibrated to indicate an air content in the gas phase via a difference in a water vapor capacitance in vacuum, and a current vapor phase capacitance in the system in a temperature interval from 25° to 100° C.

Another embodiment of the present invention is the system described above, wherein an electrostatic capacitive sensor is located in each of the separators to monitor and locate air leakage for a riser base associated with each separator.

In some embodiments, the inventor used small diameter transparent return lines, and was able to see water plugs at the radiators' exit lines. Such plugs would not have been formed in larger diameter tubing and would not have been seen if the tubing was not transparent.

Another embodiment of the present invention includes a control unit for a heating system comprising a closed-loop vapor vacuum distribution sub-system, a vapor source, a plurality of radiators, a separator for separating condensate into liquid and gas phases, and a vacuum pump connected to the separator to evacuate air from the heating system to a preset vacuum interval, the control unit comprising: a vacuum pump control unit for controlling the vacuum pump based on a vapor source pressure sensor to maintain the preset vacuum interval in the heating system, and additionally based on a preset separator limiting temperature of a separator temperature sensor in the separator, wherein the separator temperature sensor is adapted to sense a temperature of the condensate at an entrance to the separator, wherein when the vapor source is on and the separator temperature is below the preset separator limiting temperature, the vacuum pump is turned on, and wherein when the vapor source is on and the separator temperature exceeds the preset separator limiting temperature, the vacuum pump is turned off, thereby switching the vacuum pump off when hot vapor enters the separator and allowing the vacuum pump to remove only air without being exposed to hot vapor. Other embodiments of the present invention also include control units to control the heating systems described herein. Other embodiments of the present invention include methods corresponding to the systems described above, as well as methods of operation of the systems described above. Other features, utilities and advantages of the various embodiments of the invention will be apparent from the following more particular description of embodiments of the invention as illustrated in the accompanying drawings, in which like numerals indicate like elements.

BRIEF DESCRIPTION OF THE DRAWINGS

FIG. 25 depicts a vapor supply line modified in a field test in order to minimize the noise caused by vapor bubbling through condensate accumulated in a vapor supply line to a radiator.

DETAILED DESCRIPTION OF THE INVENTION

Figure 1:
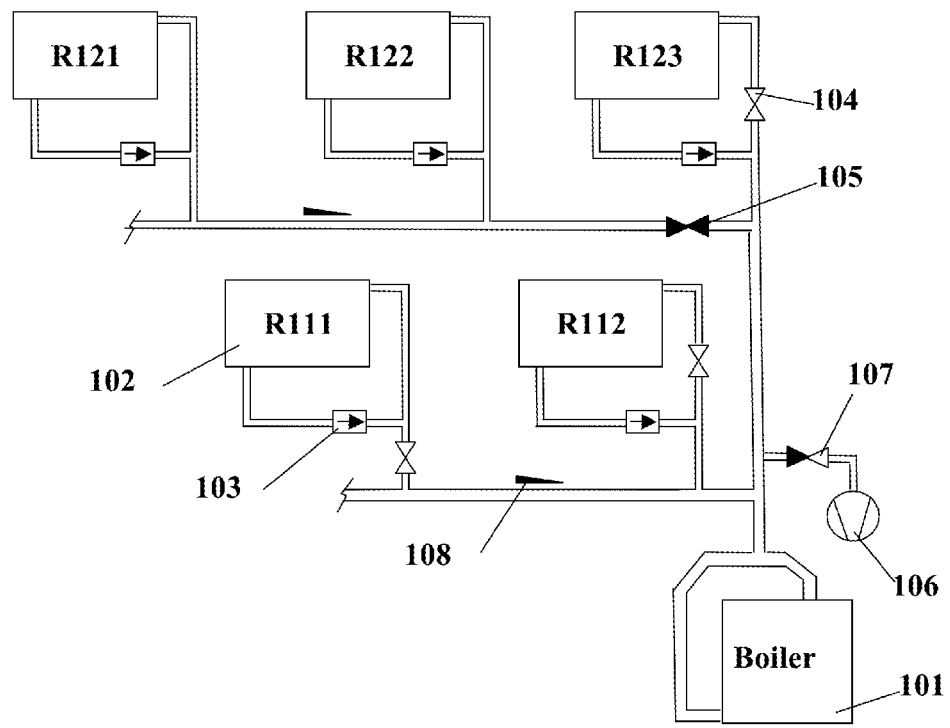
FIG. 1 illustrates a schematic of a single-pipe vapor vacuum system with periodic condensate return according to one embodiment of the present invention.

The following description is merely exemplary in nature and is in no way intended to limit the present disclosure, application, or uses.

In order to solve the aforementioned problems with conventional steam, vacuum, and hot water heating systems, presented herein are numerous improvements to vapor vacuum systems, including:
(1) First is presented single-pipe vapor vacuum systems having a low temperature periodic condensate return.
(2) Second is presented an embodiment of a two-pipe vapor vacuum system without steam traps.
(3) Third is disclosed systems and methods for integrating the two-pipe vapor vacuum system with a condensing boiler.
(4) Fourth is presented several systems and method of operating radiators with the vapor vacuum system to ensure low temperature condensate return.
(5) Fifth are presented several designs for condensing vacuum boilers that can be utilized with the low temperature vapor vacuum system.
(6) Sixth is presented a single-pipe vapor vacuum system integration with a condensing boiler.
(7) Seventh is presented an embodiment of the present invention with a naturally induced vacuum.
(8) Eight is presented illustrative control logic for system operation.
(9) Ninth are presented various embodiments for improved and sustained vacuum in vapor vacuum systems utilizing improved pump control logic.
(10) Tenth are presented results of energy savings from a field test of operating some embodiments of the present invention in a real setting.

Certain embodiments will now be described in order to provide an overall understanding of the principles of the structure, function, manufacture, and use of the devices and methods disclosed herein. The features illustrated or described in connection with one embodiment may be combined with the features of other embodiments.

The vapor vacuum system of the present invention can be used in any building and/or dwelling as needed. For the purposes of the descriptions herein, the term "building" will be used to represent any home, dwelling, office building, and commercial building, as well as any other type of building as will be appreciated by one skilled in the art. For purposes of this description, "steam" and "vapor" are used interchangeably. "Single-pipe" and "one-pipe" are used interchangeably and refer to systems with a single pipe used for both feeding vapor to the radiators and returning condensate. "Two-pipe" and "double-pipe" are used interchangeably to refer to systems in which a separate pipe is used to return condensate from the pipe used to feed the vapor to the radiators. As used herein, "closed-loop," "closed loop," and "closed system" are used interchangeably to mean an essentially closed vacuum system and piping with essentially air-tight connections and negligible leakage. The term "steam system" shall refer to positive pressure steam systems, usually operating at up to 2 psig, whereas the term "vapor vacuum systems" refer to steam systems operating within an interval of low positive pressure (inches of water column) to negative pressure of at least 5 inches Hg vacuum. "Vacuum systems" refer to steam systems operating in a vacuum up to 28-29 inches Hg. It should be noted that "vapor vacuum system" and "vacuum system" can be operated at positive pressure up to 2 psig if quick heating is required or in very cold conditions.

1. Single-Pipe Vapor Vacuum Systems with Periodic Condensate Return

First, a vapor vacuum heating system with a cycling steam (vapor) source used with a plurality of radiators having periodic condensate return is presented. During a heating cycle, condensate is retained in radiators and released later through steam supply line. Such condensate and steam flow alternation eliminates water hammering and justifies usage of smaller diameter tubes and new radiator design. Under vacuum, the system operates like a branched heat pipe with periodic condensate return. In a heat pipe, heat is captured as liquid evaporates at one end, and releases the heat when the vapor condenses at an opposite end. In one embodiment, the system may include a vacuum pump to evacuate air from the system. In another embodiment, the system may include a vacuum check valve on air vent lines and operational procedure to create vacuum naturally by steam condensing in a closed space after complete air purging from the system. The vapor source's cut off pressure can be adjusted to regulate the vapor's temperature depending on the outside temperature.

Temperature control for steam/vacuum systems includes a thermo-regulator in the room farthest from the boiler. Because of higher pressure drop in the pipe, this room is the last one to receive heat, and the boiler shuts off when a set temperature is achieved. Therefore, rooms closest to the boiler are overheated and usually cooled by open windows, while the most distant rooms are under-heated. Uneven steam distribution and building overheating are common problems of such steam heating, especially for single-pipe systems. It is estimated that for every 1° F. increase of internal temperatures, the space heating cost increases by 3%. In summary, an ordinary building's overheating by 14° F. (average 7° F.) corresponds to around 21% more fuel consumption and implies 21% higher heating bills.

To decrease the system's pressure drop and achieve uniform steam distribution, large diameters steel pipes with thick threaded walls have been utilized. In addition, reduced steam velocity in such pipes helps to avoid water hammering when steam and condensate are counter-flowing. Unfortunately, the usage of large diameter heavy steel piping has caused significant problems, including:
(1) Steam supply lines should be preheated to a saturated steam temperature before any steam is delivered into the radiator; the line should be kept at this temperature for the duration of the heating cycle. The average 33.3% difference between the boiler's "gross" and "net" is the heat it takes to bring the system piping up to the steam temperature. "Net" is the heat available to the radiators after the steam has heated the pipes.
(2) The choice of a radiator is limited to heavy cast iron models; these radiators require a long time to heat up and continue to emit heat into the room long after the set temperature is reached and the burner is deactivated.
(3) Expensive installation
(4) High heat loss Converting steam heating systems into known vacuum systems improves heat distribution and system efficiency, but adds maintenance and repair problems. Converted steam systems maintain vacuum at 5-10" Hg, and employ original heavy steel piping, and cast iron radiators; new installation of such vacuum systems would be very expensive.

The entry of forced air systems into the U.S. market shattered the dominance of steam, vacuum, and hot-water heating. The superior quality and efficiency of radiant heat was sacrificed for convection heating, all for the sake of a lower installation cost. Few steam or vacuum heating systems were installed during the last fifty years. Still, many buildings in the U.S. and abroad are heated by steam from either boilers or district systems. Significant savings can be achieved by converting such steam systems into vacuum vapor systems according to some embodiment of this invention. For new high-rise buildings, steam is often a valid choice because of the problems associated with long air ducts (for forced air systems) and with high pressure (for water heating systems).

According to one embodiment of the present invention, what has been developed is a system and method for preventing water hammering in a single-pipe steam heating system by condensate retention in the radiator during the heating cycle and release into the boiler afterward. In one embodiment, a steam (vapor) source is provided for producing and introducing steam into the systems described herein. The steam source may be any source known in the art capable of heating water to produce steam, including a boiler system located within the building, or an external district heating system, heat from power generation, waste heat from industry, and other systems known to provide steam.

A common principle of steam heating operation assumes continuous condensate return into the boiler either through the inlet pipe ("feeder conduit" for single-pipe systems) or via a separate line ("return condensate line" in two-pipe systems). A single pipe system usually employs large diameter pipes in order to avoid water hammering and that requirement subsequently worsens system efficiency, comfort, control, etc. This problem can be resolved by an embodiment of the present invention having a periodic condensate return from the radiators after each heating cycle as shown in FIG. 1.

The system of such an embodiment can be modeled conceptually as a branched "heat pipe," but without a wick and, therefore, no restriction on length. As shown in FIG. 1, while steam is entering into the upper section of radiator 102, condensate accumulates at the bottom and is returned into the steam supply line through condensate flow control valve 103 after heating cycle. Either a float check valve, a thermostatic valve, a zero pressure check valve, or another suitable valve can be used to control condensate return cycles; bubble tight performance is not crucial. Steam delivery can be regulated by a control valve 104 per radiator base (R111, R112, R123) or by a zone control valve 105 per radiator group (R121, R122). The system is connected to a vacuum pump 106 through a vacuum pump control valve 107. In one embodiment, a steam ejector may be utilized to create an initial vacuum in the system; this makes the system self-sufficient and less electricity dependent. Proper plumbing pitch directions 108 should be provisioned for condensate return into the boiler by gravity. Such an arrangement facilitates periodic condensate return only after boiler 101 stops. The benefits of this embodiment of the present invention include:

(1) Hot condensate retaining in the radiator during the heating cycle adds heat into the space to be heated.
(2) After the boiler shut off, the vapor from the boiler continues to deliver heat into the radiators until the vacuum is formed in the system and equilibrium is established.
(3) Turbulent vapor flow regime in smaller diameter tubes ensures that condensate droplets will be carried into the radiator.
(4) Tubes of smaller diameters can be easily connected with fewer fittings and less leaks.
(5) Operating under higher vacuum (up to 29" Hg or even higher), and utilizing modern plumbing, radiators, and a control models, rather than the existing vacuum systems operating at 5-10" Hg.

Saturated water vapor pressure in the boiler is a function of temperature and vice versa (Table 1). The vapor temperature at the radiators' entrances (and therefore the temperature of the radiators) can be controlled in a broad range by the temperature/pressure setting of the boiler. For example, at 2 psi pressure drop in the tubing and a boiler pressure of 10.3 psia, vapor will enter into the radiators at 8.3 psia@184.6° F., and at boiler pressure of 9.3 psia, vapor will enter into the radiators at 7.3 psia@178.9° F., correspondingly. So the radiators' temperature can be controlled by changing temperature/vacuum level in the boiler.

TABLE 1

Properties of Saturated Steam

| Saturated Steam Pressure | Pressure in System | | Temperature | |
|---|---|---|---|---|
| (inch Hg) | inch Hg | psia | ° F. | ° C. |
| 0.0 | 29.74 | 0 | 32 | 0.0 |
| 5.7 | 24 | 2.8 | 140.3 | 60.2 |
| 10.7 | 19 | 5.3 | 165.2 | 74.0 |
| 12.7 | 17 | 6.3 | 172.5 | 78.1 |
| 14.7 | 15 | 7.3 | 178.9 | 81.6 |
| 16.7 | 13 | 8.3 | 184.6 | 84.8 |
| 18.7 | 11 | 9.3 | 189.7 | 87.6 |
| 20.7 | 9 | 10.3 | 194.4 | 90.2 |
| 22.7 | 7 | 11.2 | 198.8 | 92.7 |
| 29.7 | 0 | 14.7 | 212 | 100.0 |

Similar to modern air conditioning applications, a vacuum in this leak-tight system is created once by a vacuum pump and restored on rare occasions. Alternatively, achieving and maintaining a vacuum level of 26-29" Hg (versus 29.9" Hg for air conditioning application) is simpler, less expensive, and the water vapor is not an environmental pollutant (unlike Freon and other chlorofluorocarbons used in air conditioning systems).

Depending on the outside conditions, the temperature of the vapor supplied into the radiators may be adjusted by controlling the system operating interval in the vacuum; the deeper the vacuum, the lower the vapor's temperature. Modern copper plumbing is warranted for many years, so the system dependency on the tightness to leaks and, therefore, on electricity for vacuum pump is reduced. In one preferred embodiment, polysulfone type tubing can be utilized for steam conduit and flexible Teflon type tubing for end-point connections to radiators; both thermoplastics' properties exceed the vacuum heating system operational parameters.

2. Two-Pipe Vapor Vacuum Systems without Steam Traces

Second is presented an embodiment of a two-pipe vapor vacuum system without steam traps. In a typical vacuum heating system, steam traps and/or thermostatic steam traps, are utilized like in a steam system. The purpose of conventional steam traps is to periodically release condensate back into the boiler and to prevent steam from entering into return lines. Such steam traps are a major maintenance problem requiring routine inspections, repairs, and replacement.

Figure 2:
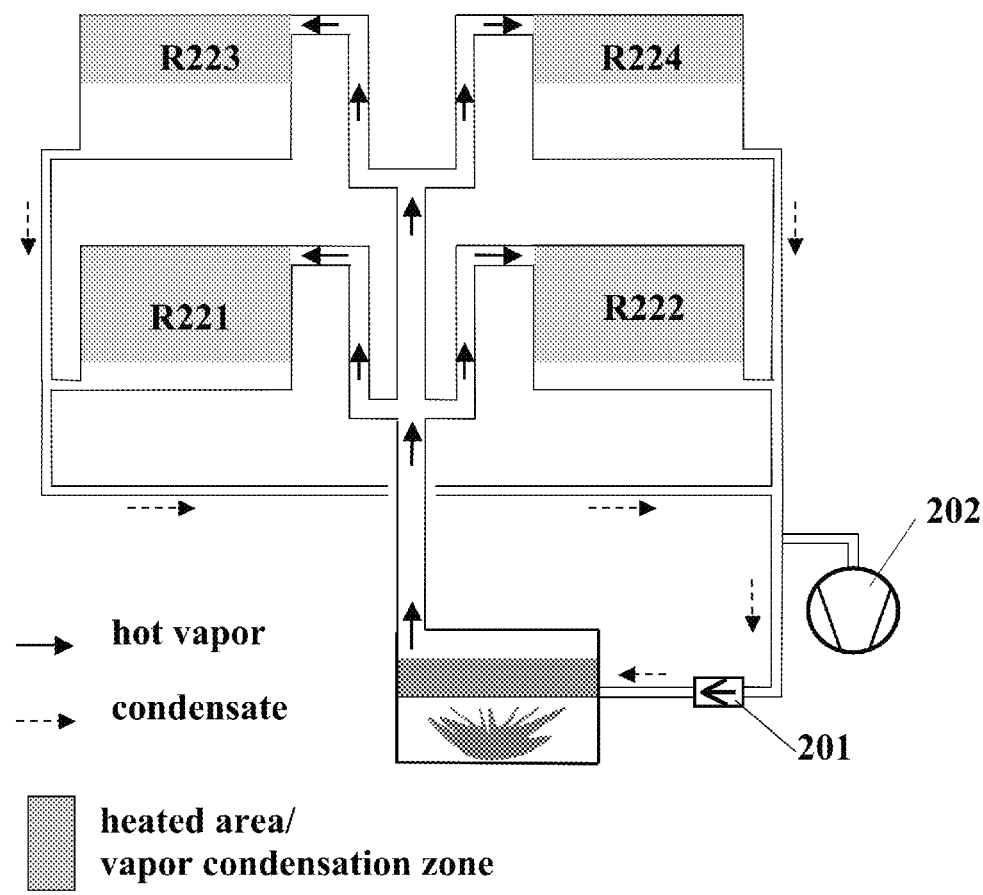
FIG. 2 illustrates a schematic of a two-pipe vapor vacuum heating system adapted to operate without steam traps according to another embodiment of the present invention.

One embodiment of the vapor vacuum system, operating in vacuum/pressure interval from initial vacuum of 28-29" Hg and up to 2 psig (recommended maximum pressure for steam systems), was tested with lightweight supply lines and radiators as shown in FIG. 2. Vacuum was created initially and restored (if necessary) by vacuum pump 202, and check valve 201 was used to prevent boiler backflow. It was found that the vapor vacuum system according to one embodiment can operate successfully without steam traps. Vacuum, created in each radiator by condensing vapor, keeps the condensate from leaving the radiator in the form of a natural plug at the radiator bottom. Because of the short heat cycle period, the level of accumulated condensate is not significant enough to reduce radiator heat transfer area. When the radiator is heated from top to bottom as in radiators R221 and R222, the pressure of saturated vapor inside the radiator increases, and vapor from the boiler is directed to other less heated radiators R223 and R224. The boiler stops when the pressure/temperature rises to an upper set point, the pressure equalizes in the idle system and condensate returns by gravity from each radiator. When the boiler temperature drops to a low set temperature (or corresponding pressure), another heating cycle starts until the set temperature in a heated space is achieved. Accordingly, in one embodiment, no steam traps are necessary.

Figure 3:
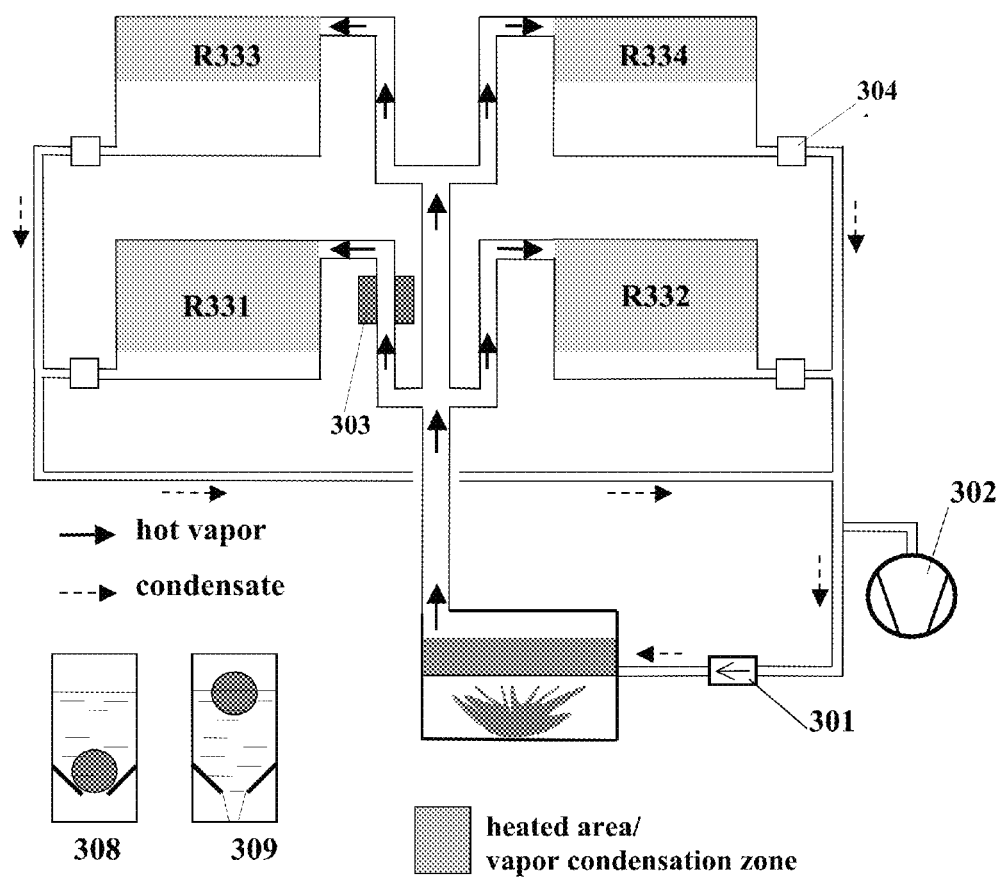
FIG. 3 illustrates an operation of the two-pipe vapor vacuum heating system operating with control valves on supply lines and check valves on condensate return lines according to yet another embodiment of the present invention.

This natural heat distribution balance can be disrupted if supply line is closed by flow control valve on any radiator. As an example, shown in FIG. 3, vapor from nearby radiator R333 will enter radiator R331 through a condensate return line if a control valve 303 is closed. To prevent vapor entering the condensate return line, each radiator is equipped with a float ball check valve 304. When the radiator is heated from top to bottom during the heating cycle, the ball is pressed down, and the float ball check valve is closed (FIG. 3, insert 308). When the boiler stops and pressure/vacuum equalize throughout the system, the ball floats and releases condensate to the boiler (FIG. 3, insert 309). In contrast to traditional steam traps, in a float ball check valve, there is no intermediate condensate release during heating cycle. A float ball check valve is employed for condensate handling on each radiator; this simple, reliable, and inexpensive device works consistently, whether the system is working under pressure or under a vacuum. Because vapor and condensate flow are alternating on the same line, water hammering can be prevented, which allows for the usage of smaller diameter tubing. Optionally, and according to alternative embodiments of the present invention, heat activated valves may be utilized on condensate return lines instead of float ball valves. As in FIG. 2, vacuum was created initially and restored (if necessary) by vacuum pump 302, and check valve 301 was used to prevent boiler backflow.

Therefore, one embodiment of the present invention eliminates the need for steam traps, which are expensive inspection and maintenance problems for steam and existing vacuum heating systems.

Accordingly, one embodiment of the present invention is a vapor vacuum heating system with a plurality of radiators, comprising a vapor source; a feeder conduit connecting said vapor source to the radiators; a condensate return conduit having no steam traps on each radiator connected to said feeder conduit; a float ball check valve on said condensate return conduit to prevent vapor entering condensate return line during the heating cycle and releasing condensate after the heating cycle; a vacuum pump to evacuate the system; a thermostat in the space to be heated; a vapor source control unit; and a pressure sensor for generating a signal to the vapor source control unit, wherein an air from the system is evacuated by the vacuum pump, and wherein the vapor source is switched on and off by the vapor control unit within preset pressure until the temperature in the space to be heated is equal to a thermostat set temperature.

3. Two-Pipe Vapor Vacuum System Integration with Condensing Boilers

Third is disclosed systems and methods for integrating the two-pipe vapor vacuum system with a condensing boiler (CB).

Figure 4:
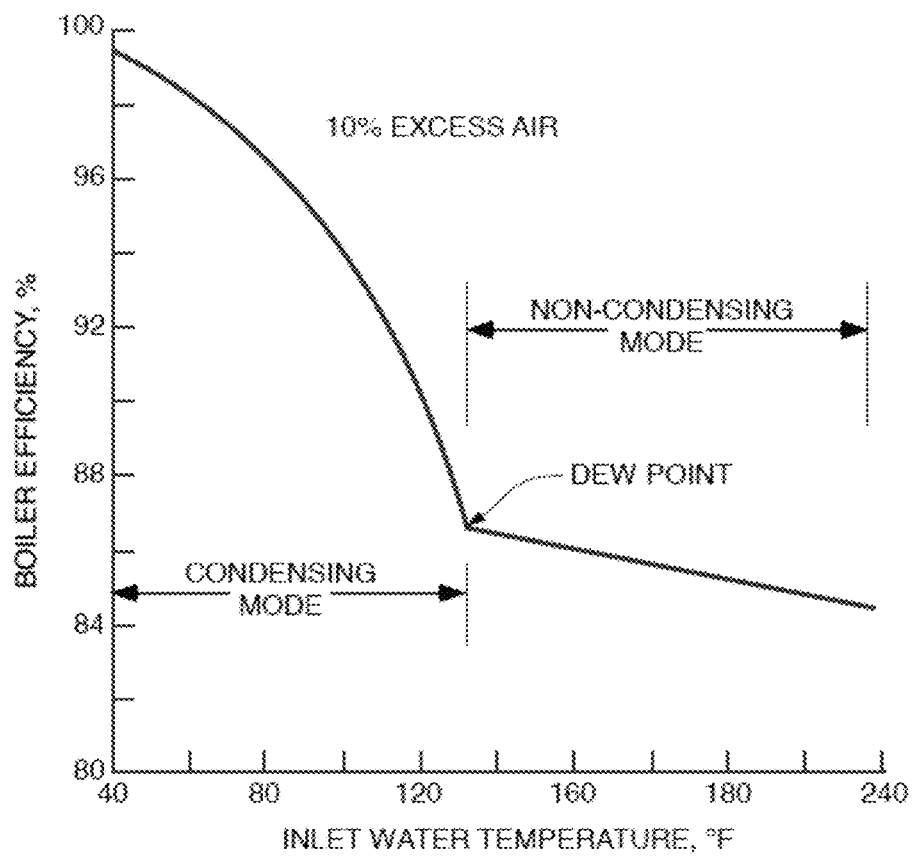
FIG. 4 illustrates a thermal efficiency of a hot water condensing boiler system as a function of return condensate temperature.

In order to boost energy efficiency, modern hot water CB absorb the latent heat of water vapor from the flue gas. Recommended temperature of water return temperature (supply into boiler condensing section) is below 100° F. in order to condense most of the water (see FIG. 4, adapted from T. H. Durkin, "Boiler System Efficiency," ASHRAE Journal, vol. 48, July 2006, p. 51). In reality, water return temperature is at 140° F. level for most of the heating season in order to deliver enough heat into building. As a result, benefits of condensing mode usage are lost. Another problem of hot water CB is limited temperature of supply water. Typical temperature drop through hot water heating systems is 20° F. and therefore for CB supply water temperature is limited to 120-160° F. At such low temperatures, the energy value of delivered heat is less than in regular hot water systems.

The temperature of condensate return in traditional vacuum single-pipe systems is either equal to the temperature of vapor rising through the same pipe or slightly lower in two pipe systems. The high temperature of condensate return is considered an inherent feature of traditional vacuum and steam systems and is never challenged. The present inventor has recognized that lowering the temperature of condensate return would improve system efficiency and reduce heat losses.

Figure 5:
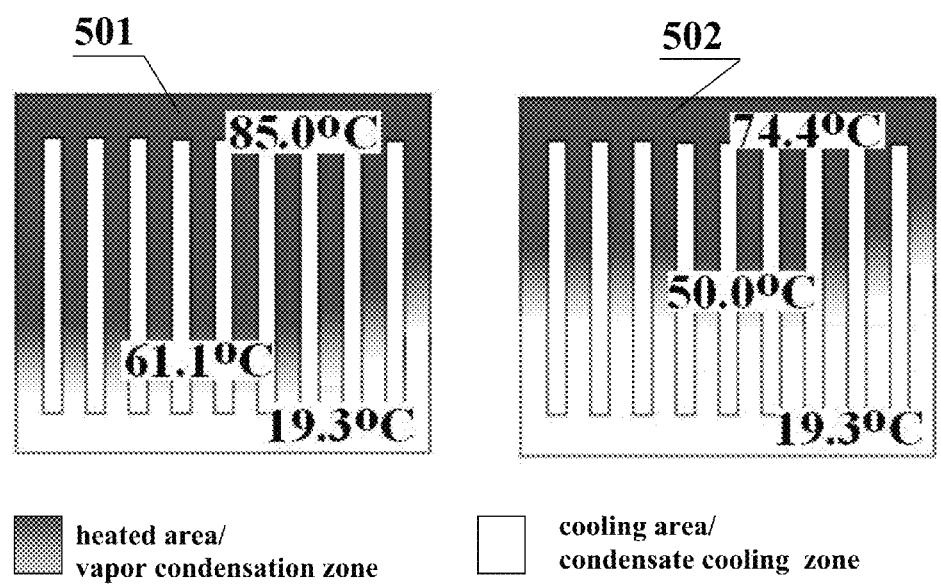
FIG. 5 illustrates a thermal image of a flat panel radiator according to one embodiment of the present invention during an operational test run.

Typical thermal images of the radiator in the proposed two-pipe vapor vacuum system are shown in FIG. 5 after the boiler was stopped at 10" Hg (after 7 and 20 minutes, 501 and 502, respectively). It shows the remarkably even temperature of the heated area at the radiator top and area of low temperature at the bottom. The phenomenon can be explained by the fact that latent heat of water evaporation/condensation represents 85-90% of total vapor heat. Due to this, a small portion of the radiator surface is sufficient to cool the condensate to room temperature (dissipate heat of saturated liquid). This test finding suggested a possible way to improve the system's efficiency by integrating condensing boiler technology into the vapor vacuum heating system.

In the vapor vacuum system described in this application, the "return temperature versus efficiency" dilemma can be resolved. Condensing boiler integration into vapor vacuum system not only eliminates restrictions on operation parameters (which are imposed in hot water systems), but can also add significant benefits in design, safety, maintenance, efficiency and installation costs. The vapor vacuum system described in this application can keep radiators hot up to 212° F. and yet still return condensate at temperatures below approximately 100° F. into the condensing section at the same time.

The various vapor vacuum heating systems presented herein can be integrated with a condensing boiler, to create overall system efficiency improvements. Such a system comprises a condensing boiler, at least one radiator located in the space to be heated, an apparatus (vacuum pump, steam ejector, etc.) to evacuate air from the system, vapor transfer line(s) extending between the boiler and the radiator(s), and return line(s) for condensate return. The boiler oscillates within a predefined vacuum/temperature interval until a set temperature is achieved. Condensate from the radiator(s) is returned back by gravity into the boiler's condensing section. Several methods are proposed to reduce the temperature of radiators' condensate return into the boiler in order to integrate the system with condensing boilers. Later, a design for a vacuum condensing boiler which can be utilized with the present invention is presented.

Figure 6:
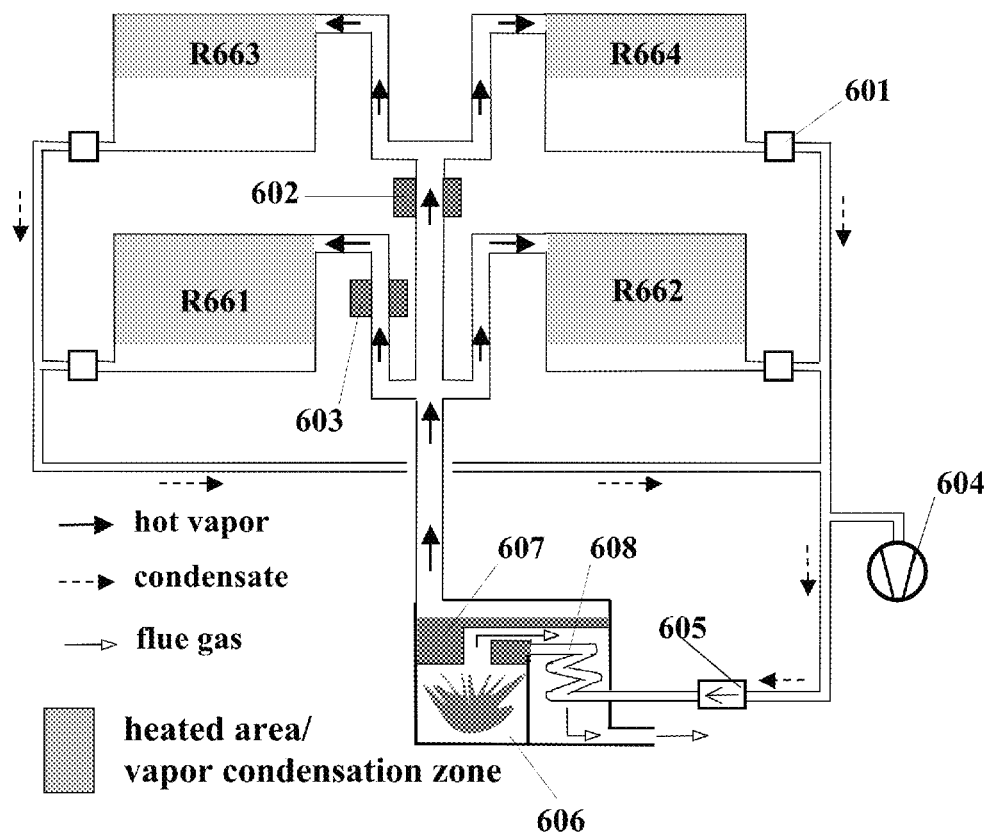
FIG. 6 illustrates one method of integrating a vapor vacuum system according to the present invention with a vacuum condensing boiler according to another embodiment of the present invention.

In one embodiment of the present invention, the various embodiments of the vapor vacuum heating systems described in this application may be integrated with a condensing boiler. A schematic of a two-pipe vapor vacuum heating system integration with a condensing boiler according to one embodiment of the present invention is shown in FIG. 6. The condensing boiler comprises a burner 606, an evaporating section 607, and a condensing section 608. In one embodiment, each radiator is equipped with a heat activated valve (HAV) 601 at an exit of the condensate return line. During the heating cycle, HAV 601 at the exit of the hottest radiators (radiators R661, R662 which are nearest to the boiler) are closed, and hot condensate is accumulating at the bottom. At the same time, condensate flows back into the boiler from partially heated radiators R663, R664. Zone control valve 602 and radiator control valve 603 can be utilized for heat distribution control. Vacuum in the system is created and maintained by a vacuum pump 604, and check valve 605 prevents hot water backflow from boiler during heating cycle.

Figure 7:
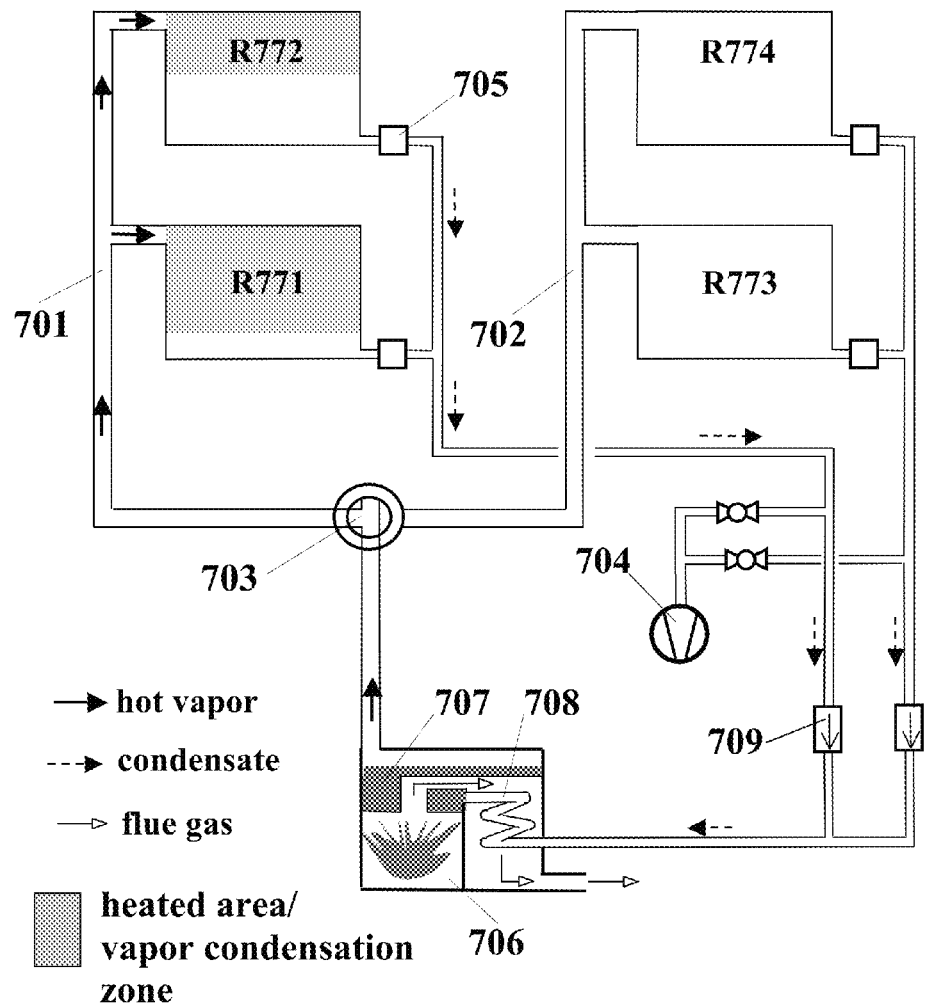
FIG. 7 illustrates a schematic of a vapor vacuum heating system having multiple risers and a control manifold/set of valves according to yet another embodiment of the present invention.

In a two-pipe vacuum system with multiple risers, a manifold (set of valves) can be utilized to alternate heat supply into the multiple risers. An example of a two-riser system is shown in FIG. 7. The condensing boiler comprises a burner 706, an evaporating section 707, and a condensing section 708. While radiators R771 and R772 on riser 701 are receiving heat, vacuum is naturally created in cooling radiators R773 and R774 on riser 702, and vise versa (when manifold 703 turns). The frequent boiler on/off switching can be reduced for multiple-section systems. Condensate from radiators returns through heat activated valves (HAV) 705 on each radiator (or solenoid or check valve) into condensing section 708 of the boiler in an idle system. Vacuum in the system is created and maintained by a vacuum pump 704, optionally vacuum can be restored in a separated cooled section 702. Check valve 709 prevents hot water backflow from boiler during heating cycle. If required, manifold 703 can be utilized to close boiler vapor supply line completely, and vacuum level in the system can be restored by vacuum pump without waiting for boiler cooling to 100° F.

The efficiency of the regular non-condensing steam boilers integrated into a two-pipe vacuum heating system is expected to improve due to operation in vacuum, lower temperature of return condensate, and ability to control vapor temperature depends on the outside temperature. In some embodiments, it is possible to use the proposed system with regular non-condensing boilers; the condensing section elimination from the boiler would benefit the boiler maintenance, life expectancy, and cost.

In some embodiments, instead of a boiler, other heat sources may be utilized for the vapor vacuum system described herein, such as district heating, micro-turbine exhaust, heat and power cogeneration heat, waste heat, geothermal, solar, etc.

Compared to a hot water heating system with a condensing boiler, the proposed system:
(1) Has higher energy value heat which is delivered into the radiators by vapor.
(2) Employs no hot water circulators, bypass valves, expansion tank, etc.
(3) Has less condensing coil length.
(4) Has less water in the boiler.
(5) Will not require expensive building repairs if leakage occurs.
(6) Has less electricity dependency.
(7) Has no frozen pipe problems and expensive repairs caused by power shortage.
(8) Requires no mechanical floor every 15-20 floors for high rise building to pump hot water.

Regular non-condensing boilers can be integrated into a two-pipe vapor vacuum heating system as well. The condensing section exclusion from the boiler would cause a decrease in the energy efficiency of the system, but would benefit the boiler maintenance, life expectancy, and cost.

While vapor (steam) heating is well known, it has long been known and believed that vapor heating systems deliver hot condensate above 100° F. Since conventional condensing boilers require condensate return temperatures below 100° F., the prior art has taught away from utilizing condensate from vapor heating systems with condensing boilers. The inventor has recognized the aforementioned problem in the prior art, and has developed several methods and systems to lower the condensate return temperature as described herein. When used alone or in combination, the various methods allow vacuum heating systems to be integrated with condensing boilers for the first time.

The prior art has also never disclosed vapor vacuum condensing boilers, and taught away from their use, because such condensing boilers require low-temperature condensate return, which was not previously possible with prior art steam/vapor systems.

4. Radiator Designs Having Low Temperature Condensate Return

Fourth are presented several systems and method of operating radiators with the vapor vacuum system to ensure low temperature condensate return.

Figure 8:
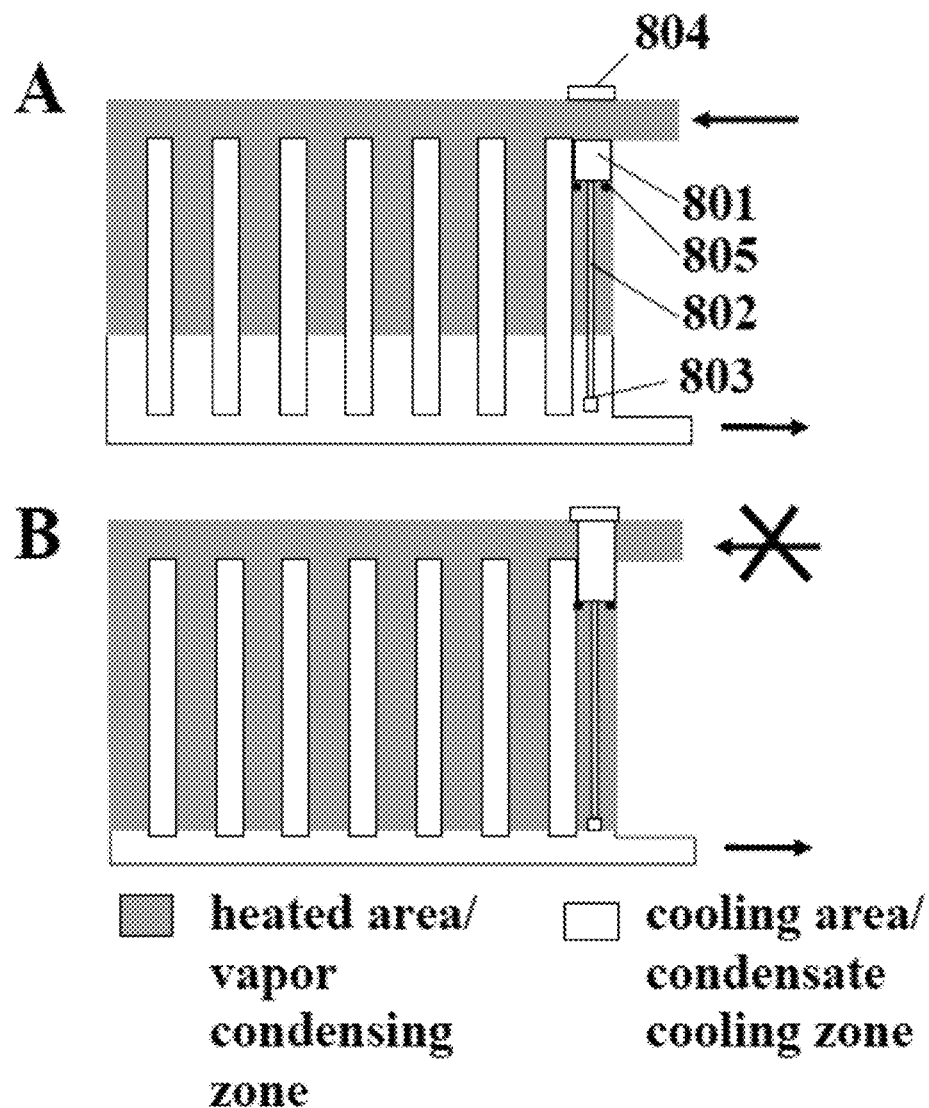
FIG. 8 illustrates a schematic of an improved flat panel radiator with a build-in heat-activated valve (HAV) according to another embodiment of the present invention for use with a vapor vacuum heating system.

A schematic of a flat panel radiator with a build-in heat-activated valve (HAV) is shown in FIG. 8. The valve includes a bellow 801 connected by a capillary 802 to a capsule 803 containing a low temperature boiling fluid (such as pentane, acetone, etc) or wax inside. When the radiator bottom gets hot, the condensate heats the capsule and the evaporated liquid/wax expands the bellow 801 to close radiator (as shown in FIG. 8, part B). When the radiator bottom cools down, condensed liquid drains back into the capsule 803 and the contracted bellow 801 opens the radiator entrance (FIG. 8, part A). During the heating cycle, the valve occasionally opens and closes, keeping the radiator heating area hot and condensate temperature low. The valve is inserted through a radiator plug 804, into a position fixed by nibs 805 and can be easily accessed for inspection and/or replacement. The bellow type valve described here may be a reliable and economical alternative to the HAV. In one embodiment, a backup HAV at each radiator exit is an optional safety feature.

Figure 9:
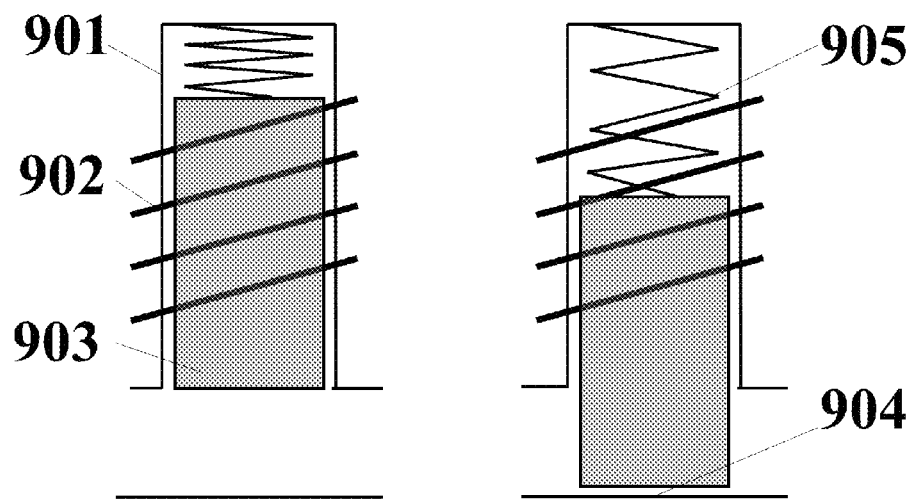
FIG. 9 illustrates a schematic of an enclosed control valve according to one embodiment of the present invention for use with a vapor vacuum heating system.

A room/zone temperature controller coupled with a solenoid valve is a common solution today for building's heat distribution control, but the seal on the valve stem usually develops leaks with time and usage. In one embodiment, the problem may be resolved with a new enclosed valve design for a vapor supply line into radiators as shown in FIG. 9. A magnet 903 inside plastic tube 901 and induction coil 902 is locked into orifice seat 904 by a retractable mechanism and spring 905 to block vapor flow. In some embodiments, a turning movement may be added to extend life-time. These valves are not expected to close the supply line bubble-tight, but 90-95% of passage closing would suffice to control heat distribution. FIG. 9 (left), shows the valve open, and FIG. 9 (right) shows the valve closed.

In summary, heat distribution through the system is controlled by radiator size (heating area), HAV which is either build-in or located on condensate return line, room controllers, and boiler operating parameters adjusted to the outside temperature.

The system according to this embodiment has the following major differences relative to a single-pipe VVH:
(1) Condensate return line(s) from the radiators to the boiler condensing section, in which plastic tubing can be employed because of the low temperature condensate return.
(2) HAV on condensate return line from each radiator. Optionally, a backup HAV at the condensate entrance into boiler condensing section may be used to prevent radiators' HAV malfunction; and paper thermometer indicators on each condensate return line can be used to locate a failed HAV.

5. Vacuum Condensing Boiler Designs

Fifth are presented several designs for condensing vacuum boilers that can be utilized with the low temperature vapor vacuum system. Since the various vapor vacuum system embodiments according to the present invention allow integration of condensing boilers for the first time, vacuum condensing boilers are desirable for use with the present invention. Because of the various embodiment innovations described in this application, vapor vacuum heating systems with vacuum condensing boilers are feasible to use for the first time. Accordingly, embodiments of the present invention also include vacuum condensing boilers as described below. Various condensing boiler designs are envisioned to be useable with the present vapor vacuum system, and the particular condensing boiler designs are not intended to limit the scope of the present invention.

An attractive feature of the vapor vacuum heating system is advanced heat transfer conditions. Heat transfer coefficients in the boiler are changed by orders of magnitude depending on temperature differences between the wall and boiling temperature of the saturated liquid (Farber-Scorah Boiling Curve, see, for example, FIG. 6.14 in P. K. Nag, *Heat and Mass Transfer*, 2nd Ed., 2007 and FIG. 5.1 in M. L. Corradini, *Fundamentals of Multiphase Flow*, 1997). Hot water boilers work in the least efficient regime of interface evaporation (pure convection). Furthermore, in hot water systems, the "bubbles" regimes, which have the highest heat transfer coefficients, are avoided because the hot water circulation worsens in the presence of the vapor phase. Conversely, in a vacuum system, heat transfer instantly occurs in the most efficient "bubbles" regime because water boils at lower temperatures. Therefore, the required heat exchange area can be reduced significantly not only in the boiler evaporative section, but also in the boiler condensing section.

Figure 10:
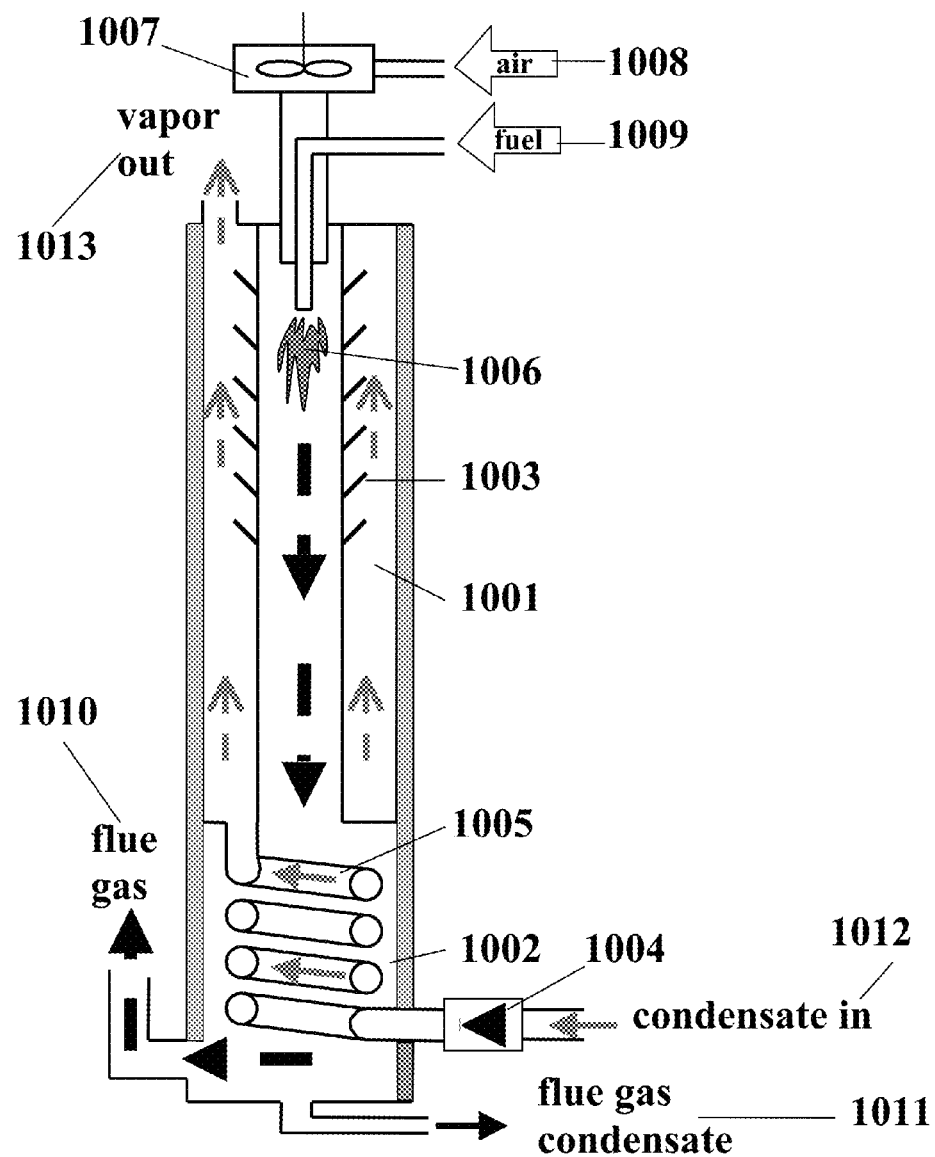
FIG. 10 illustrates a schematic of one embodiment of a vacuum condensing boiler according to another embodiment of the present invention.

FIG. 10 illustrates a schematic of a vacuum condensing steam boiler with a single pass down flow configuration according to one embodiment of the present invention. Two- and three-pass apparatus may be used as well. High temperature flue gas from a burner 1006 evaporates water in a boiler cylindrical evaporating section 1001 and then flows down into a condensing section 1002 along a spiral tube heat exchanger 1005 filled with condensate return from the radiators. Air 1008 and fuel 1009 are supplied from the boiler top; an air blower 1007 is utilized to start the system. Cold condensate 1012 from radiators enters into the spiral tube heat exchanger 1005 from the bottom of the boiler and rises up due to hot water's lower density, boils, and exits the boiler as vapor phase 1013. Condensate 1012 from the radiators periodically returns into the boiler through a back flow valve 1004 when the boiler stops and the system pressure equalizes. To avoid a sharp decrease in the heat transfer in the evaporating section due to transition into film boiling, fins 1003 are provisioned to direct vapor phase outward from the heat exchange area in the evaporating section 1001 of the boiler. Flue gas 1010 leaves the boiler bottom through an exhaust line, while flue gas condensate 1011 is removed from the boiler bottom through a separate line.

Figure 11:
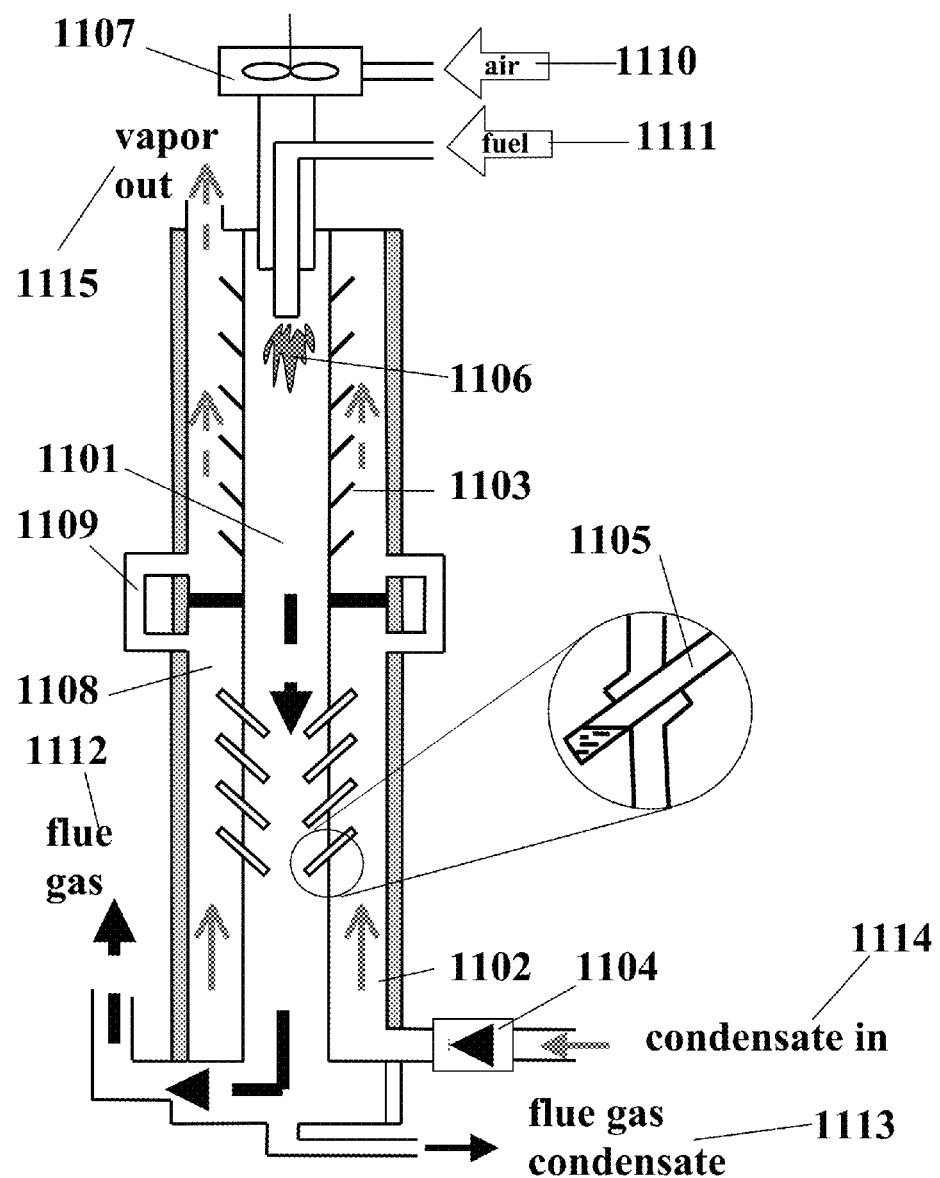
FIG. 11 illustrates a schematic of another embodiment of a vacuum condensing boiler according to yet another embodiment of the present invention.

In one alternative embodiment of the vacuum condensing boiler, an array of short thick wall heat pipes can be utilized in the condensing section instead of the spiral tube heat exchangers, as shown in FIG. 11. High temperature flue gas from a burner 1106 evaporates water in a boiler cylindrical evaporating section 1101 and then flows down into a condensing section 1102. Heat pipes 1105 are threaded through the inner wall of the condensing section 1102. These heat pipes have no wick capillary structure; instead, they comprise short, closed-end tubes with a working liquid under vacuum (water can be used as a working liquid in some embodiments). The condensing section 1102 comprises two semi-cylinders 1108 connected to the evaporating section 1101 by lines 1109 that can be taken apart for the heat pipes' inspection and replacement. Although the tips of these heat pipes 1105 will be exposed to corrosive flue gas, the condensing section 1102 would still be functional if the walls of one or several heat pipes fail. Air 1110 and fuel 1111 are supplied from the boiler top; an air blower 1107 is utilized to start the system. Cold condensate 1114 from the radiators enters from the bottom of the boiler and rises up due to hot water's lower density, boils, and exits the boiler as vapor phase 1115. Condensate from the radiators periodically returns into the boiler through a back flow valve 1104 when the boiler stops and the system pressure equalizes. To avoid a sharp decrease in the heat transfer in the evaporating section 1101 due to transition into film boiling, fins 1103 are provisioned to direct the vapor phase outward from the heat exchange area in the evaporating section of the boiler. Flue gas 1112 leaves the boiler bottom through an exhaust line, while flue gas condensate 1113 is removed from the boiler bottom through a separate line.

In some embodiments of the present invention, vacuum condensing boilers having multiple passes designs. Proposed in FIGS. 11 and 12 were designs of vacuum condensing boilers with single-pass flue gas flow. Like hot water condensing boilers, two- and three-flue gas passage designs can be foreseen for the purpose of compact design and efficiency. Instead of using a single-pass flow of flue gas from top to bottom as shown in FIG. 11, flue gas flows in multiple passes from top to bottom, and back to the top, as it exchanges heat with the condensate return. Such multiple pass embodiment can increase the efficiency of heat exchange and provide for a more compact design.

6. Single-Pipe Vapor Vacuum System Integration with Condensing Boilers

Figure 12:
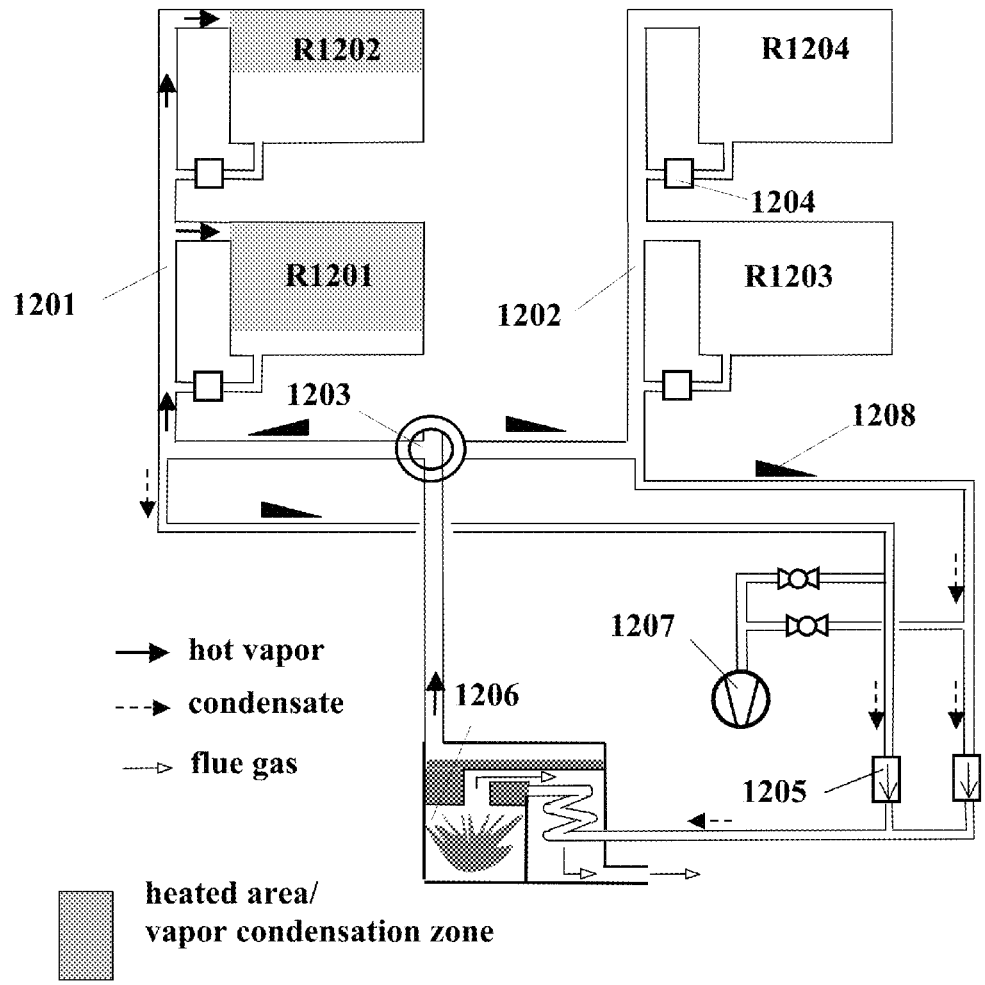
FIG. 12 illustrates a schematic of yet another embodiment of the present invention in which a single-pipe vapor vacuum heating system is integrated with a vacuum condensing boiler.

Sixth is presented a single-pipe vapor vacuum system integration with a condensing boiler. FIG. 12 illustrates a single-line vacuum system which may be integrated with a condensing boiler. A single-pipe system is partitioned into section 1201 and section 1202 using a manifold (or set of valves) 1203. When section 1201 is in heating cycle, section 1201 is connected to the evaporating section of a condensing boiler 1206 by the manifold 1203. When section 1202 is in cooling cycle, condensate released from radiators R1203 and R1204 flows through heat activated valves 1204 and accumulates above backflow valve 1205 leading to the condensing section of the boiler 1206. If required, vacuum in cooling section 1202 can be restored by a vacuum pump 1207. Line pitching 1208 is provisioned for proper condensate flows. When the cycle is reversed on sections 1201 and 1202, condensate accumulated above backflow valve 1205 flows into the condensing section of the boiler 1206.

Accordingly, another embodiment of the present invention is a heating system having a closed-loop single-pipe vapor vacuum distribution system having periodic condensate return and a vacuum condensing boiler, the system comprising a vapor source adapted to generate vapor, the vapor source comprising an evaporating section and a condensing section; one or more radiators; a feeder conduit connecting said vapor source to said radiators; a return conduit for returning condensate from each radiator back to said vapor source, wherein said return conduit contains no steam traps; a vacuum pump to evacuate air from the system to a vacuum level, wherein the vapor source, the feeder conduit, and the return conduit are air-tight; a temperature sensor adapted to sense a temperature of the vapor leaving the vapor source; a pressure sensor adapted to sense a pressure of the vapor source; and a control unit for controlling the vacuum condensing boiler and the vacuum pump based on the temperature and the pressure sensed by the temperature sensor and the pressure sensor to maintain a consistent vacuum level and a consistent temperature of the vapor, wherein the return conduit returns said condensate from the radiators to the condensing section at a temperature below approximately 100° F. sufficient for condensing water from flue gas from a burner in the vapor source.

6.B Alternative Temperature-Regulated Radiator Design

Figure 13:
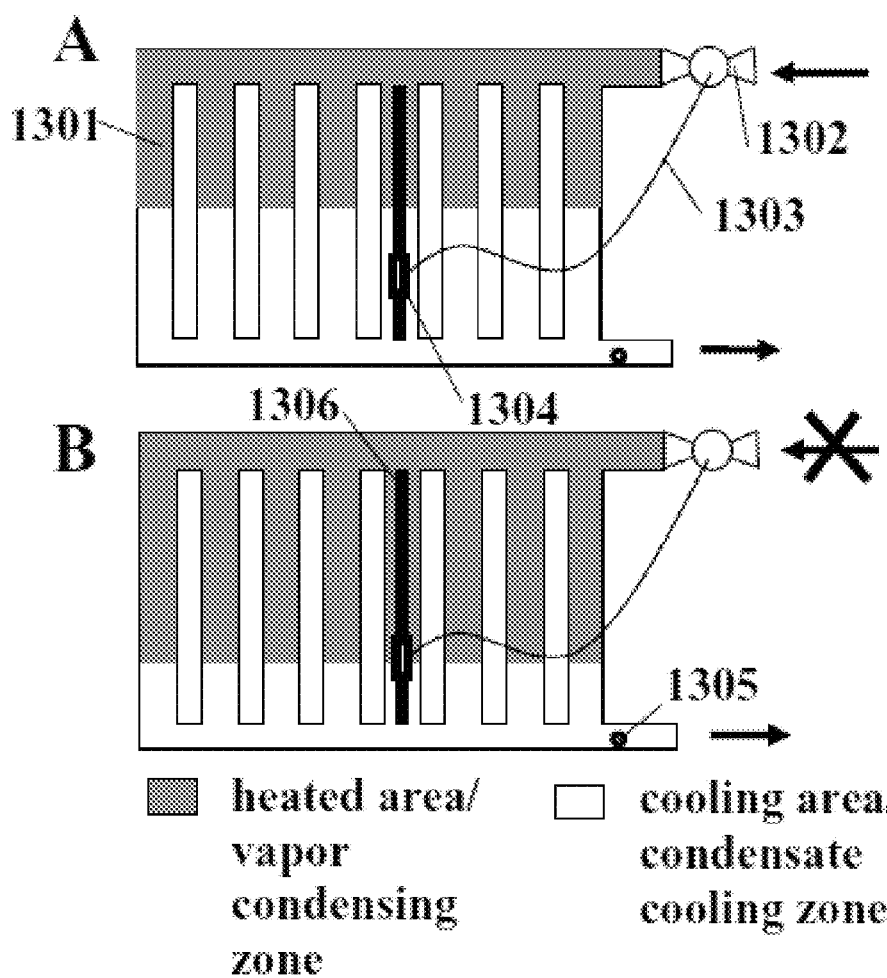
FIG. 13 illustrates a schematic of an embodiment of a radiator design having a temperature controlled sliding member for controlling a temperature profile in the radiator according to yet another embodiment of the present invention.

FIG. 13 illustrates an alternative embodiment of a temperature-regulated radiator 1301 design according to yet another embodiment of the present invention. A temperature-regulated valve 1302 controls heat supply into radiator 1301 based on a signal from temperature sensing element 1304 located in a space to be heated and connected to valve 1302 by capillary 1303. The sensing element 1304 setting is set to about 100° F. and attached to the radiator by sliding bar 1306. Heat supply into the radiator is controlled by temperature sensing element 1304 along sliding bar 1306; at the same time, the temperature of condensate return is limited to about 100° F. to ensure maximum condensing efficiency of the boiler. Configuration A shows radiator open when preset area is not heated yet, and configuration B shows radiator closed when preset area is heated.

Accordingly, another embodiment of the present invention is a radiator comprising a temperature regulated valve on a vapor supply line into the radiator which is closed by a signal from a temperature sensing media attached to the radiator, wherein the temperature sensing media is sliding along the radiator height in order to control which portion of the radiator is employed for heat delivery.

In one alternative embodiment of the present invention, the temperature regulated valve on the vapor supply line comprises an induction coil around a plastic cylinder, a magnet, a spring, and a retractable mechanism in order to close the vapor supply line by the magnet by a signal from the temperature sensing media.

7. Naturally-Induced Vacuum Embodiments

Seventh is presented an embodiment of the present invention with a naturally induced vacuum. According to another embodiment, in place or in addition to a vacuum pump, the boiler operations may be cycled in order to naturally induce and maintain a vacuum. For this purpose, an air vent/vacuum check valve set or a combined device is provisioned either on each radiator or on the system air vent line connected to each radiator. In the first heating cycle, the boiler is stopped when thermostat's set temperature is achieved and the most distant radiator is heated from top to bottom. The second condition is essential to verifying that the system is completely purged of air. In a cooled system, steam condenses inside and creates a vacuum, but the vacuum check valves will not let air in. Theoretically, system can create a vacuum as low as 27 to 28.5 inches Hg when cooled down to 90-120° F., correspondingly. Additionally, in some embodiments, a vacuum pump can also be utilized for cold start of leak tight system and for converted steam system with minor leaks.

To take advantage of a vacuum in the system, the second and subsequent heating cycles are performed with a negative boiler cut off pressure setting or setting lower than vacuum check valve cracking pressure. If required, the air purging cycle can be repeated at boiler cut off pressure setting higher than vacuum check valve cracking pressure. The system is operated by automatic boiler controller in order to optimize working pressure/vacuum sequence.

The previously described vacuum single-pipe system of FIG. 1 which has periodic condensate return can be readily converted into a vapor vacuum system with naturally-induced vacuum by adding check valve to each radiator air vent. The cycling boiler operations include the first heating cycle at a pressure higher than the check valves' cracking pressure; vacuum formation in the closed, cooled system; and the subsequent boiler operation set to vacuum or pressure below check valves cracking pressure. The radiator check valve can be installed either before or after the radiator vent valve on each radiator. If the vacuum check valve is installed before the radiator air vent valve, the air vent valve is not participating in the second and subsequent heating cycles; so longer trouble-free operation time is expected. The radiator vacuum check valves stay closed as long as the system operates under vacuum. Should any vacuum check valve fail, the corresponding air vent valve will still be on guard to stop the steam from exiting the radiator; air will be sucked in through the faulty vacuum check valve after every heating cycle and the system will start to function like a regular steam heating system.

In warm weather, complete system heating cycle, in order to purge the system of air and create a vacuum, is excessive. An auxiliary vacuum pump, connected to the system through control valve, can be provisioned to quickly restore vacuum in retrofitted system before heating cycle. Compared to known vacuum systems where high capacity vacuum pump is on and off during every heating cycle, vacuum pump of significantly less capacity, cost and maintenance operates only for approximately 10-15 minutes to restore vacuum in the system. Then the boiler is cycled at cut off pressure higher than check valves' cracking pressure until thermostat set temperature is achieved; air is completely purged from the system by that time. Vacuum emerges naturally afterwards in idle cooling system. A gas-fueled system with millivolt control, powered by pilot flame, is electricity independent and will maintain the vacuum without vacuum pump in case of power shortage.

By installing a check valve with 1 psi cracking pressure behind each air vent valve, a one-hundred-year-old residential single-pipe steam system which had six radiators was converted by the inventor into a vacuum system with naturally induced vacuum. In test runs, 24 inch Hg vacuum was produced in 80 minutes after the boiler stopped in the first heating cycle. Vacuums of 22, 19 and 17 inch Hg were retained after 330, 260, and 165, correspondingly. This timing matches boiler day time cycling frequency during a cold season, but system ability to hold vacuum overnight is not sufficient. Either vacuum pump should be employed to restore vacuum in the morning or system should be purged from air during first heating cycle at pressure higher then check valves cracking pressure.

Figure 14:
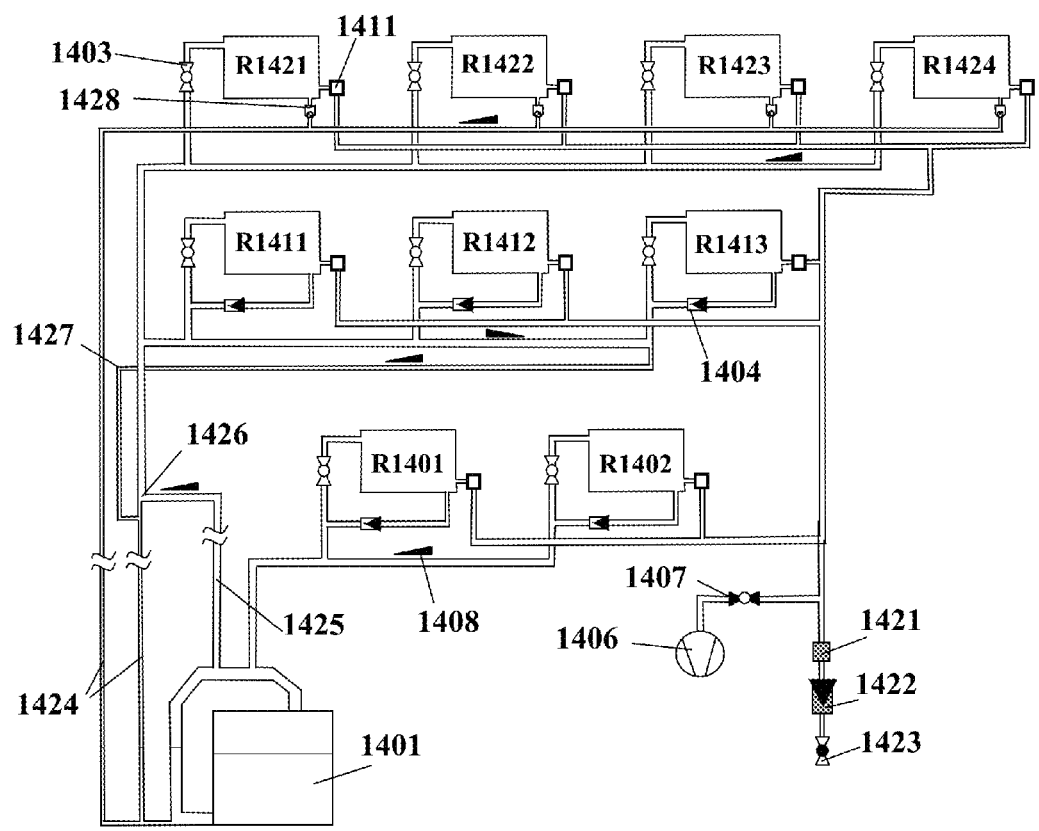
FIG. 14 illustrates a schematic of an embodiment of a large system with naturally induced vacuum according to yet another embodiment of the present invention.

An illustrative schematic for a large system with naturally induced vacuum according to one embodiment of the present invention is shown in FIG. 14. Such a system includes a boiler

1401, radiators R1421-R1424, R1411-R1413, and R1401-R1402 with a radiator control valve 1403, a radiator condensate flow control valve 1404 and a radiator air vent valve 1411 on each radiator. For the conversion of large existing steam systems into vapor vacuum systems with a naturally-induced vacuum, a single system vacuum check valve 1422, a system air vent valve 1421, and a system control valve 1423 may be utilized to improve reliability and leak detection. To protect the system from radiator vacuum check valve failure/leakage, lines from each radiator air vent 1411 are connected to the system's only vacuum check valve 1422. The on and off control valve 1423 is in sync with the boiler operation and can be used instead of or in addition to the system vacuum check valve 1422 and for routine system pressure leak tests. Similarly, the system's air check valve 1421 would secure system against radiators' air vent valve failure; faulty valves can easily be traced by monitoring the temperature of the lines. As previously discussed, vacuum was created initially and restored (if necessary) by vacuum pump 1406 connected through a vacuum pump control valve 1407. Line pitching 1408 is provisioned for proper condensate flows.

Due to heat loss in a long supply lines, too much steam may condense on conduit walls. Intermediate condensate drippings 1426 and 1427 into wet return 1424 are shown: from up feed riser 1425 and from a group of upper floor radiators (R1411, R1412, R1413), respectively. For radiators R1421-R1424, a separate condensate return through the line with a float check valve 1428 on each radiator is shown. Radiators R1401 and R1402 are closest to the boiler 1401 and have short supply lines.

Without changing the system piping and radiator arrangement, steam from the district grid may be utilized in place of the steam boiler in a vacuum system with a naturally induced vacuum. The vapor heating system with a naturally induced vacuum may be integrated into a district steam heating system in one of two ways:

(1) Single loop (direct steam usage): After pressure reduction, the district steam is throttled into a vapor heating system with a naturally-induced vacuum. The amount of steam is controlled in order to keep the heating system at the desired vacuum level. A water pump would be provisioned in such system in order to return excessive condensate into a district steam heating system (2) Separate loop (indirect steam usage): A coil with high-pressure district steam is used inside an evaporative heat exchanger to get the vapor heating system started with naturally-induced vacuum.

Depending on the particular system specifics, an automatic boiler controller would perform the following functions:

(1) Vacuum pump switch on/off to restore a vacuum in the idle cooled system.
(2) First boiler heating cycle at switch off pressure slightly higher than vacuum check valve cracking pressure.
(3) Temperature control of the most distant radiator as an indication of the complete air removal from the system.
(4) Monitoring the speed of the vacuum formation in a system.
(5) Second and subsequent heating cycles operate at the boiler cut-off pressure below vacuum check valves cracking pressure; the warmer the weather outside, the less cut-off pressure is utilized and the lower is the steam/vapor temperature.
(6) Low water shut off device to prevent boiler overheating.
(7) Air vent line temperature monitoring to detect radiators air vent failure.

The boiler controller may be integrated into the building control system in order to optimize operation. One high power boiler can be replaced by a set of smaller capacity boilers fired up alone or in a group to save energy, as well as to allow ease of maintenance and emergency repairs.

8. Illustrative Control Logic for System Operation

Eight is presented illustrative control logic for system operation (boiler and vacuum pump) according to one embodiment of the present invention. According to one illustrative embodiment of the present invention, a possible boiler control logic is shown in Table 2.

According to one embodiment of the present invention, vacuum heating system control includes several conditional loops to switch the boiler ON and OFF. The boiler is ON if all of the following conditions are met:

(1) House temperature is below set temperature by predetermined offset temperature;
(2) Vapor temperature at the boiler exit is below a set temperature; and
(3) Water level in the boiler is higher than a low water cut off setting.

The house temperature controller follows day/time/temperature settings to keep temperature within house comfortable during day time and lower at night to save energy. The vapor temperature at the boiler exit is adjusted depending on the outside temperature, the colder the outside temperature the higher the vapor temperature at the boiler exit. The boiler is switched ON and OFF to maintain the vapor set temperature during the heating cycle. Water cut off setting is set by the boiler manufacturer.

Only when the boiler is OFF and cooled below 100° F.—usually in the night or early in the morning—the vacuum level is checked routinely and restored if required. The vacuum pump is turned ON if all of the following conditions are met:

(1) Boiler is OFF;
(2) Boiler temperature is below 100° F.; and
(3) Vacuum in the system is below a pressure switch setting, preferably in the range of 25-28 inch Hg, and even more preferably at the highest possible pressure setting.

The vacuum pump restores vacuum level in the system up to the pressure switch setting, and is switched OFF and disconnected after this level is reached. Depending on the system's leak tightness, pump may be turned on a daily, weekly, or monthly basis.

In one embodiment of the present invention, the vacuum level in the system is constantly monitored based on pressure in the system and vapor temperature at the boiler exit. In air tight system, these parameters follow the saturated steam temperature table within 1° F. difference. Air presence in the system reduces the temperature of the saturated vapor, the more air, the bigger the deviation. Based on Dalton's law of Partial Pressures, in temperature interval of 140-212° F. a deviation of 12-18° F. corresponds roughly to 30% air presence in the system and can be used for alarm notice and mandatory system stop for leak search and to restore vacuum in the system. This logic can be incorporated into the boiler controller to constantly monitor the deviation between vapor temperature at the boiler exit from the steam table value of saturated steam at current pressure. When compared to the values recorded at the boiler fresh start, this data provides valuable information about changes in the system tightness.

The house controller is usually installed in the farthest room which is the last room to receive heat. Additionally, radiators in other rooms can be furnished with individual room controllers.

For vacuum heating systems working with regular boiler, a control valve on radiator supply line is switched ON and OFF by the room controller depending on temperature in the room and a float ball check valve on each radiator is used to prevent vapor entering into condensate return line.

For vacuum heating systems working with a condensing boiler, control of heat supply into radiators per room base requires one of the following:
  (1) Control valve on radiator supply (feeder) line connected to room controller and HAV on condensate return line;
  (2) Radiator build-in HAV on condensate exit line; or
  (3) Control valve on radiator supply (feeder) line connected to a sensing element which is set to around 100° F. and slides along radiator height.

TABLE 2

Illustrative Control Logic for System Operation

System settings:

Boiler is switched ON when difference between temperature in a most distant room ($T_{room}$) and a set temperature ($T_{set}$) is more than 3° F.
Vapor from boiler upper temperature (193° F.), lower temperature (179° F.) are chosen depending on outside temperature (14° F. temperature offset)
Initial system vacuum of 28 inch Hg
Operational procedure:

While difference between temperature in a most distant room $T_{room}$ and $T_{set}$ is more than 3° F., room controller switch boiler ON
Boiler start oscillating
  IF vapor temperature on boiler exit > 193° F., boiler OFF
  IF vapor temperature on boiler exit < 179° F., boiler ON
When temperature in a most distant room $T_{room}$ is equal to $T_{set}$, room controller switch boiler OFF
  IF vapor temperature on boiler exit is less than 100° F.
    IF vacuum level less than 20" Hg, alarm "Time to check system for leaks"
    IF vacuum level is less than 28" Hg, vacuum switch ON to start vacuum pump
(solenoid valve OPEN and vacuum pump ON)
    IF vacuum level is 28" Hg, vacuum switch OFF to stop vacuum pump (solenoid valve CLOSE and vacuum pump OFF) - Vacuum restored, system waiting for thermostat calls 9. Vapor Vacuum Heating System with Sustained Vacuum Unlike conventional steam and vacuum vapor systems, no steam traps are required in the present invention. The prior art teaches away from the present invention by implementing steam traps. In the prior art of vacuum heating, the vacuum pump switches on once the vacuum in the system dropped below a set point because of either air leakage or increase of the system pressure caused by water vapor from the boiler. In the latter case, the vacuum pump is employed along the heating cycle to remove hot condensate from radiators via steam traps. But in reality, the vacuum pump pulls as much water and vapor as is released from the steam traps. Meanwhile, steam trap failure is a major problem of steam systems and this failure is the reason why high capacity vacuum pumps are employed and are often overloaded. The novel technique of recurring air evacuation, as discussed herein, prevents hot vapor/condensate from entering the vacuum pump. Preventing hot vapor/condensate from entering the vacuum pump thus permits a small capacity vacuum pump to be used by some embodiments the present invention to remove mostly air with the benefit that (1) only a small capacity vacuum pump needs to be used, and (2) a vacuum pump needs to be running only for short time intervals.

9.A. Vapor Vacuum Heating System with Sustained Vacuum Utilizing Improved Pump Controls A preferred embodiment of the present invention is to employ newly installed smaller diameter copper and plastic tubing and flat panel radiators instead of heavy steel pipes and cast iron radiators. Therefore the system mass, volume, pick-up factor and vulnerability to leaks of the present invention is much less. A small amount of condensate retained in tubing, heat up/cooling time makes the system less inertial and more controllable.

In some embodiments of the heating system of FIG. 1, described above, vacuum pump at the boiler creates initial vacuum of 26-28 inch Hg in the system before cold start and bring back if necessary when temperature of the water in the cooled boiler dropped below 40° C. but initial vacuum was not restored in the system. The small leak tight vacuum system works fine but is difficult to scale-up for bigger projects where numerous micro-leaks inevitably develops with time.

In a pilot setup for some embodiments of the present invention, using transparent ½" OD plastic tubing on condensate lines reveals a phenomenon of water plug buildup in the radiator return line due to vacuum formation by condensing vapor. These water plugs prevent vapor entering into return lines but water can flow through the water plugs. Also it was found that the internal space of the return lines is not uniform and has water plugs blocking the return lines separated by empty spaces. In order to purge the return lines, a vacuum pump connection to the vacuum heating system was modified.

Figure 15:
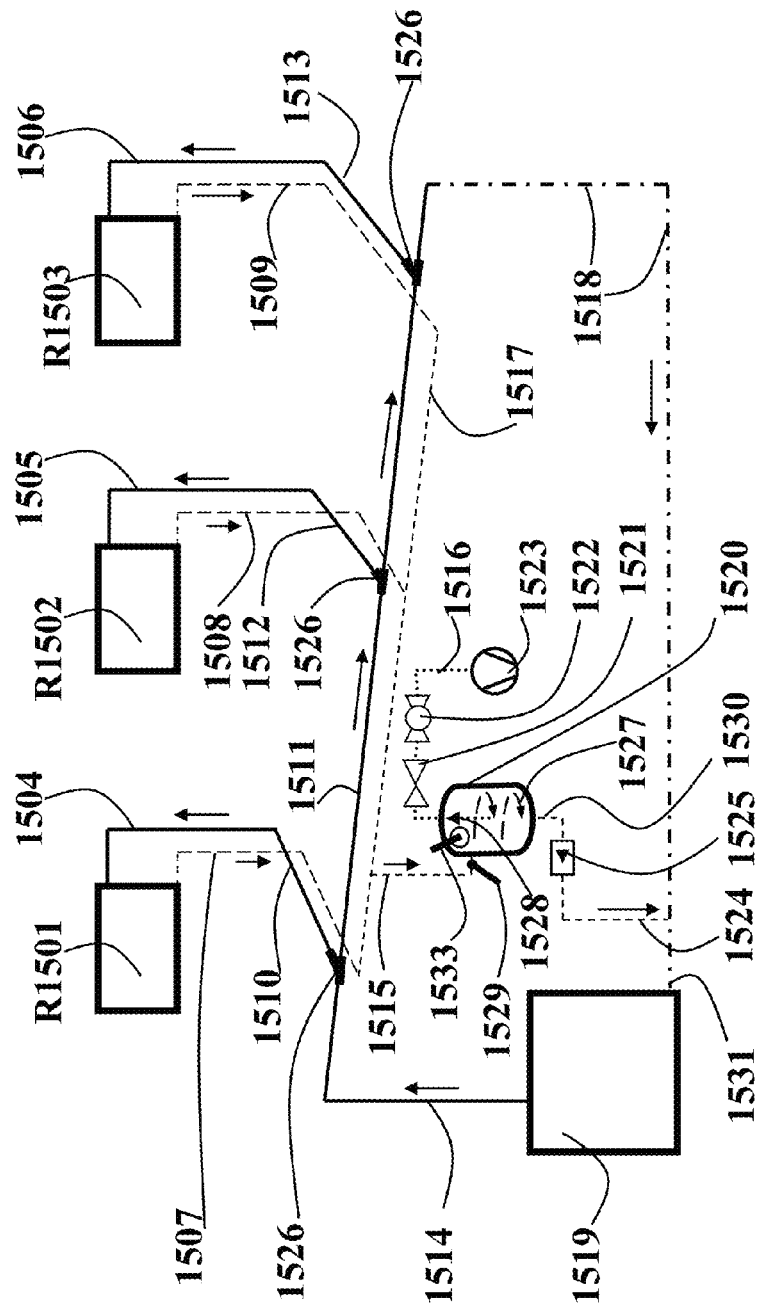
FIG. 15 illustrates a schematic of a two pipe vapor vacuum heating system with radiator condensate return to a vapor-condensate separator with a vapor temperature sensor at the separator entrance for controlling vacuum pump shut-off according to yet another embodiment of the present invention.

Depicted in FIG. 15 schematic is an embodiment of the present invention which includes a vapor supply which is boiler 1519 to supply vapor to vertical vapor supply line 1514 to supply vapor to a main horizontal-downward pitched vapor supply line 1511 with T-connectors at locations 1526 to supply vapor to vapor supply risers 1504, 1505, and 1506 that supply vapor to radiators R1501, R1502, and R1503. Additionally, the horizontal-downward pitched vapor supply line 1511 is connected to a downward condensate return line 1518 which takes return condensate to boiler 1519 at boiler connection 1531.

Also depicted in FIG. 15 schematic, is that condensate can exit from radiators R1501, R1502, and R1503 and pass down return lines 1507, 1508, and 1509 respectively, by gravity to a common return line 1517 which is connected to a common return line 1515 which is connected to a separator 1520. The return line 1515 enters into the separator 1520 on a tangential course so that any droplets of liquid phase 1527 spiral outwardly and down within the separator 1520 due to gravity and centrifugal force acting on spiraling course of the condensate droplets 1527. In the bottom of separator 1520, the condensate 1527 drains by gravity into a condensate line leading to a check valve 1525. From the check valve 1525, condensate passes into condensate line 1524 and then into condensate return line 1518 which returns condensate to boiler 1519 at boiler connection 1531. Vapor phase from line 1515, containing traces of water vapor and air, is depicted in FIG. 15 schematic as being removed from the top of separator 1520 via a pipe to a temperature-controlled valve 1521 which connects to a solenoid valve 1522 which is connected to a vacuum pump 1523.

In preferred embodiments of the present invention, a temperature of return line 1515 is monitored by a temperature sensor 1529 positioned at the line 1515 entrance into the separator 1520. In some embodiments of the invention, the heating system has a self-controlled temperature-activated valve 1521 so that valve 1521 is "open" when the temperature at the entrance of separator 1520 is between about 30° C. to about 35° C. or lower. The temperature-activated valve 1521 would be closed when the temperature of the vapor phase 1528 at the entrance of separator 1520 is above 35° C.

The vacuum occurring in the heating system embodiments of the present invention can be measured by any method known in the art. The descriptions of embodiments of the present invention refer a vacuum measurement in inches Hg which is a measurement of a decrease in measured pressure from atmospheric pressure. The heating system of the present invention uses a pressure-activated controller unit to turn the vacuum pump 1523 on when the vacuum is below a selected range, and uses a pressure-activated controller unit to turn the vacuum pump 1523 off where the vacuum is above a selected range. When the heating system is idle, depending upon the leakiness of the heating system to the atmosphere, the vacuum pump 1523 will intermittently turn on to restore the vacuum inside lines of the heating system to the selected range.

Based using the FIG. 15 schematic which is a model embodiment of the heating system of the present invention, the effect of turning "on" the boiler will now be described. In FIG. 15, the vacuum pump 1523 would be switched "on" when the boiler 1519 is fired via a call from the room temperature controller for a new heating cycle. Rising water vapor pressure in line 1514 would push traces of air from the boiler 1519, radiators R1501, R1502, and R1503, return lines 1507, 1508, 1509, 1511, and 1515 into the separator 1520. In addition, when the pressure measured by a pressure sensor located after the vapor source exit into the heating system, rises up into a selected range of inches Hg of pressure, then the vacuum pump 1523 would turn "on" to remove air from separator 1520. Once the air from boiler, radiators, and return lines has been evacuated by vacuum pump 1523, then hot vapor/condensate from the vapor source would follow next and would be detected by the temperature sensor 1529 at the entrance of separator 1520. When the temperature sensor 1529 signals that the temperature at the separator entrance has increased to above 35° C. to 40° C., then the vacuum pump controller unit is notified by the temperature sensor 1529, and the vacuum pump controller turns off the vacuum pump 1523 and closes solenoid valve 1522. Also depicted in FIG. 15 between separator 1520 and solenoid valve 1522 is a back-up for safety, temperature-activated valve 1521 which can be set to close when the measured temperature at temperature sensor 1529 is 40° C. These controls minimize how much hot vapor/condensate is wastefully drawn into the vacuum pump 1523.

In some embodiments of the present invention, the water vapor content in vapor phase may be monitored at the entrance of the separator 1520 to detect air presence. Air presence in vacuum reduce water partial pressure and cause deviation from tabulated water pressure values versus temperature in vacuum. For example changes in vapor phase content can be detected using capacitive-based sensors driven by a 0.9-1.0 kilohertz frequency alternating current electric signal because the dielectric capacitance differs greatly when in air as compared to when in hot vapor. The dielectric constant of air is about 1.00 at standard temperature and pressure (STP) whereas the dielectric constant of water can range from about 80 at 20° C. to about 55 at 100° C. (The measured dielectric constant change is a measurement that is relative to the dielectric constant (permittivity) of a vacuum which has an assigned value of 1.0). In some embodiments of the present invention, as depicted in FIG. 15, there is a capacitive sensor 1533 which may be a capacitive-based sensor 1533 located at the entrance or within separator 1520. In some embodiments, there may be a humidity sensor in addition to a temperature sensor.

Air leaks in embodiments of the present invention can deplete the vacuum needed to efficiently generate vapor and thus air leaks will need to be located to stop the air leaks. Thus monitoring the output signals from capacity sensors in each separator can be used to help to locate air leaks per section of the heating system. The testing for the air leak by the presence of air coming down a particular condensate return line to the separator can be systematically investigated to control which condensate return lines are open and could be sending the air and thus would have the air leak whether in the vapor supply lines, radiators or in condensate return lines.

When the boiler 1519 goes idle, water vapor condensation in radiators causes increase of vacuum level in a system, and later on air leakage may cause a slow decrease of vacuum level in the system. The temperature in separator 1520 drops below 30-35° C. at this point, and activity of the vacuum pump in the idle, cooled system is regulated by a pressure sensor. For example, the vacuum pump 1523 may have a vacuum pump switch setting to turn vacuum pump on when vacuum is only 14 inches Hg, and may have a vacuum pump switch setting to turn the vacuum pump off when the vacuum has increased 18 inches Hg, according to some embodiments of the present invention. The vacuum pump 1523 routinely maintains vacuum in the idle system within the preset interval.

When the boiler 1519 is fired via a call from the room temperature controller for a new heating cycle, the vacuum pump is switched on intermittently. Rising water vapor pressure pushes any remaining air from the boiler 1519, radiators R1501, R1502, and R1503, and return lines 1507, 1508, 1509, 1511, and 1515, into the separator 1520. When the pressure in the system rises to vacuum switch lower setting point, vacuum pump controller switches vacuum pump 1523 on to remove air from the separator 1520. When air is evacuated, and hot vapor/condensate mixture enters separator 1520 at temperature above 30-35° C., and the temperature switch 1529 stops the vacuum pump 1523 and closes the solenoid valve 1522. The vacuum pump is employed for short time intervals for these recurring air removals because of small internal volume of return lines. It has been observed in some embodiments of the present invention that a vacuum pump control unit setting "off" at 18 inches Hg, and "on" at 14 inches Hg creates between about 25 to 27 inch Hg vacuum in the heating system when said heating system is cooling (via naturally-induced vacuum). Thus, the system and method in some embodiments of the present invention resolves the problem of minor air leakage into the heating system and improves heating system resilience.

9.B. Reducing Noise in Vapor Vacuum Heating Systems

It is observed when the boiler 1519 is "on" during the heating cycle and vapor linear velocity in the heating system tubes is relatively high, that water droplets which are present in a vapor supply conduit lines 1504, 1505, 1506, 1510, 1511, 1512, 1513, or 1514 then pass into the radiators R1501, R1502, and R1503. Subsequently as the heating system cools when boiler 1519 is not in a heating mode, then noise is heard at bottom of vapor supply riser lines 1504, 1505 and 1506 due to vapor bubbling through accumulated water droplets. Several embodiments of the present invention are contemplated as approaches that can lessen or prevent such noise. In one embodiment of the present invention, the heating system has a new boiler design that has a low volume evaporation zone and a high volume preheating zones to reduce the amount of evaporated water after a boiler has stopped heating. In another embodiment of the present invention, there are spirals in the vertical part of the riser to spin the upward vapor flow in order to create a centrifugal force so that water droplets in the vapor are pushed towards the inside walls of the risers 1504, 1505, and 1506, which can help keep the center of the vapor supply risers open for vapor flow without vapor bubbling through the condensate. In yet another embodiment of the present invention for reducing noise, the main and horizontal supply conduit lines 1504, 1505, 1506, 1510, 1511, 1512, 1513, and 1514 and the T-connectors 1526 depicted in FIG. 15 are specialized to separate drops of condensate into the lower part of the conduits and T-connectors to flow back to the boiler by gravity while allowing the vapor to move without bubbling to the radiators. The specialization of the conduits and T-connectors is depicted in FIG. 16A disassembled and in FIG. 16B assembled together.

Figure 16A:
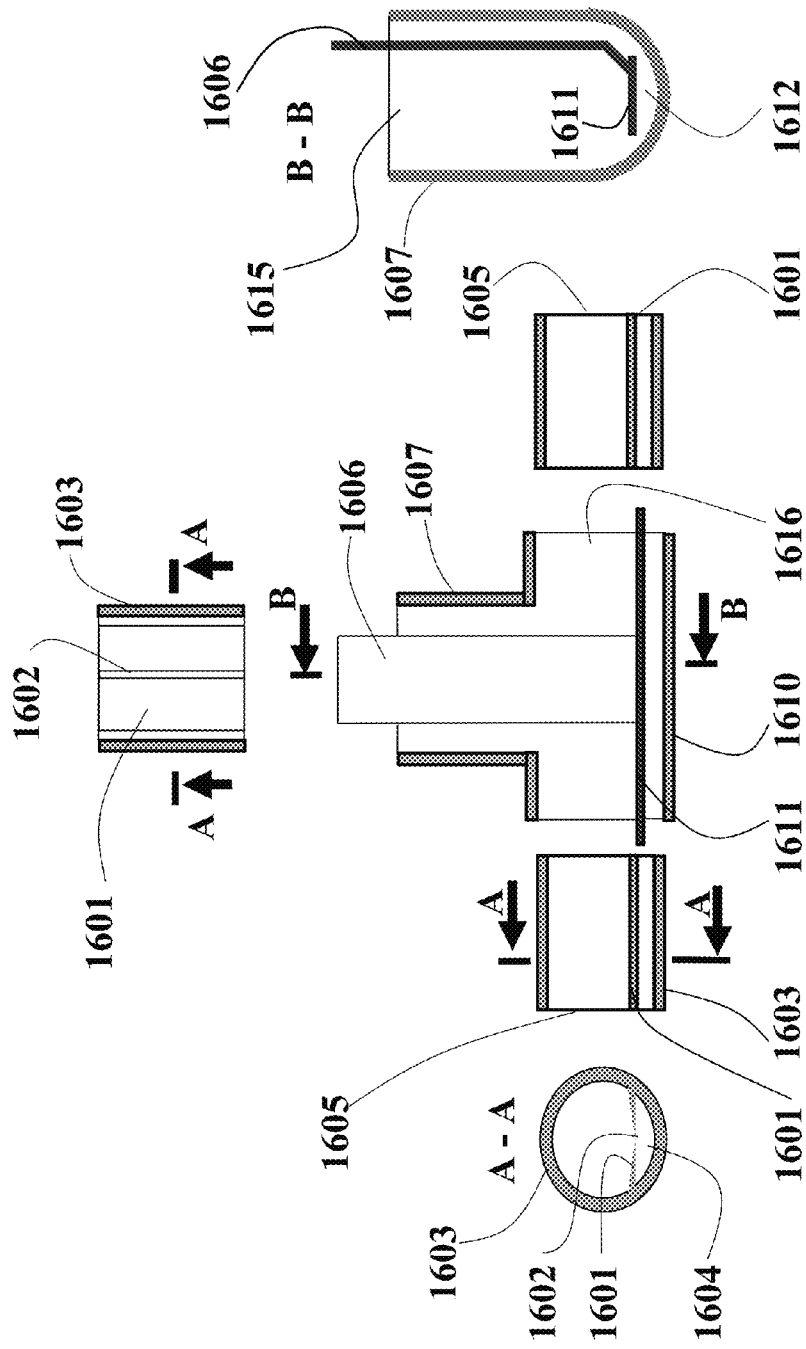
FIG. 16A illustrates a schematic cross section view of a specialized T-connector with its three pipes (conduits) ends in position to be connected to the T-connector with a mid-T-connector region cross-view B-B and a cross-section view A-A through the main and horizontal pipes (conduits) to indicate where droplets of condensate could collect in the lower part of each part of the conduit according to yet another embodiment of the present invention.

Depicted schematically in FIG. 16A in dissembled form are three different views of three specialized vapor supply conduit lines 1603 and a specialized T-connector 1610 designed to prevent noise from vapor bubbling through condensate residing in vapor supply conduit lines and in vapor supply risers feeding vapor to radiator(s) during the heating phase of the system of the present invention.

Depicted on the far left side of FIG. 16A, is a cross-section A-A view of a vapor supply conduit line 1603 with a sub-divider 1601. In this particular embodiment, the middle of the sub-divider 1601 has an opening 1602. The subdivision of the interior space of specialized vapor supply conduit line 1603 by sub-divider 1601 creates a vapor supply channel 1605 above the sub-divider 1601, and a condensate channel 1604 below the sub-divider 1601. Should condensate form in the vapor supply conduit line 1603, then this condensate can move by gravity from the vapor supply channel 1605 through opening(s) 1602 into the condensate channel 1604. Via the condensate line 1604, the condensate can travel to the boiler or to another allocated destination for the condensate. In other embodiments of the present invention, the location of the opening 1602 with respect to sub-divider 1601 can be different. In other embodiments of the present invention, the opening(s) 1602 may be selected from the group consisting of a long slot, a hole, a plurality of holes, a mesh, a fibrous weave, a porosity for wicking/draining condensate, any other kind of openings, and a mixture thereof.

Embodiments of the present invention include processes and methods for making the sub-divider(s) 1601, opening(s) 1602 in vapor supply conduit lines, and in risers by any means of manufacturing and using any plumbing types of piping and pipe connection means known in the art. A preferred material for the conduit lines and t-connectors is a polysulfone plastic (Solvay Specialty Polymers, BASF, and PolyOne Corporation). Note that in some embodiments of the present invention that the T-connector 1610 may have been extruded and/or machined from plastic such as for example polysulfone or any other material which can handle the temperature ranges occurring in the present heating system invention. Note that in some embodiments of the present invention that parts or all of the vapor supply conduit lines and risers and vapor return lines tubes may have been extruded and/or machined from plastic such as for example, polysulfone or any other material which can handle the temperature ranges occurring in the present heating system invention.

Thus present invention embodiments include a method for preventing vapor supply lines and risers from forming condensate plugs and generating noise from vapor bubbling through the condensate plugs when the boiler is turned on and vapor has to push through the condensate plugs in vapor supply conduit lines and risers, comprising the steps of: providing a vapor supply line 1603 or a riser 1603 with a sub-divider 1601 wherein the sub-divider 1601 has hole(s) 1602; allowing a draining of the condensate from the vapor supply channel 1605 through the holes 1602 into a condensate channel 1604; allowing the condensate in the condensate channel 1604 to drain back to the boiler 1519; and pushing vapor when the boiler is turned on through condensate-free vapor channels in vapor supply conduit lines and risers in order to avoid creating noises.

Depicted in the upper middle of FIG. 16A is a longitudinal section view of a vapor supply line or riser 1603 which displays the flat surface of sub-divider 1601 and a slot opening 1602. Depicted in the center area of FIG. 16A is T-connector 1610 in a longitudinal view of its tubular intersection. Depicted in the lower part of T-connector 1610 is an in-line tubular pathway with openings 1616. Depicted in the in-line tubular pathway is a sub-divider 1611. In FIG. 16A ends of sub-divider 1611 extend beyond openings 1616. In other embodiments of the T-connector 1610, sub-divider 1611 ends are flush with openings 1616. In yet other embodiments of T-connector 1610, the sub-divider 1611 ends are recessed within openings 1616. Depicted in the upper part of T-connector 1610 is tubular branch 1607 which is oriented at a right angle to the in-line tubular pathway. Tubular branch 1607 has depicted flat side of a sub-divider 1606. Sub-divider 1606 has no openings on its surface. In other embodiments, the sub-divider 1606 can have one or more openings. The openings may be selected from the group consisting of a long slot, a hole, a plurality of holes, any other kind of openings, and a mixture thereof.

Depicted on the right side of FIG. 16A is a sectional view B-B which consists of a longitudinal section view through tubular branch 1607 and a cross-sectional view through the lower in-line tubular pathway of the T-connector 1610. Sub-divider 1606 is connected to sub-divider 1611 in sectional view B-B. Sub-divider 1606 is depicted as extending beyond tubular branch 1607 opening 1615 in sectional view B-B. Beneath sub-divider 1611 is condensate space 1612 in sectional view B-B and note that water droplets can pass around the width of sub-divider 1611 to drain into condensate space 1612.

Figure 16B:
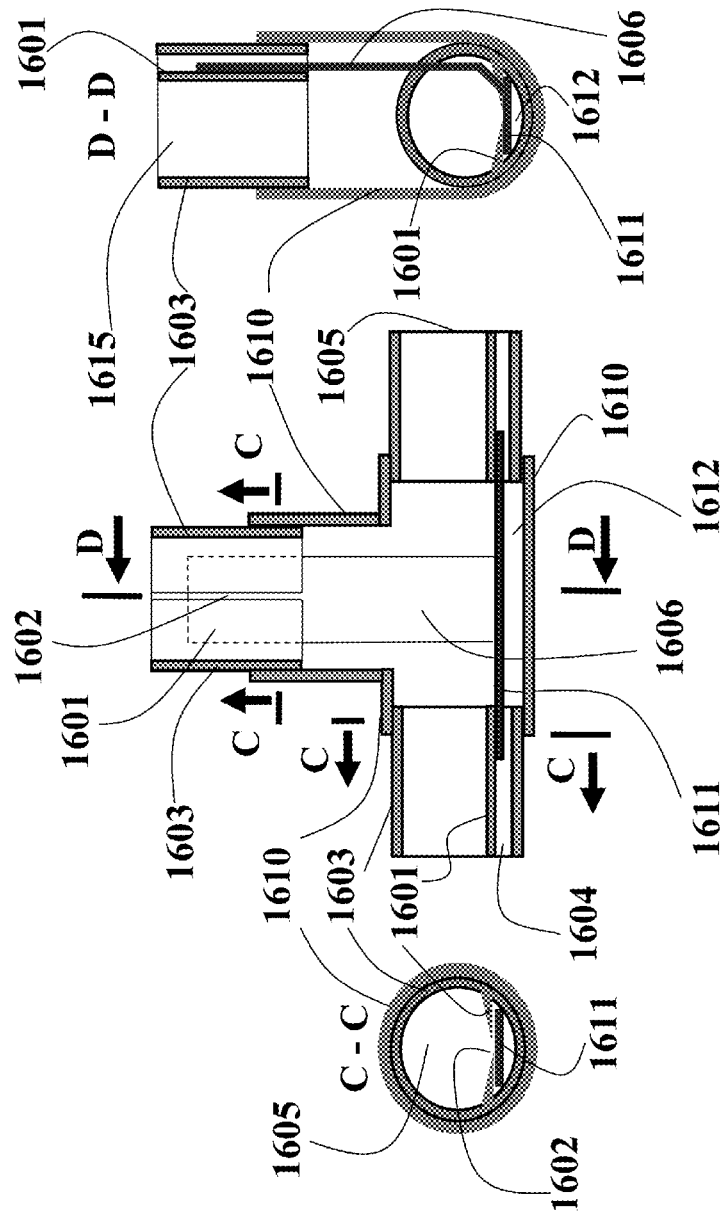
FIG. 16B illustrates a schematic cross section view line-up of a specialized T-connector with its three pipes connected into the T-connector with a mid-T-connector region cross-view D-D and a cross-section view C-C through the main and horizontal pipes (conduits) to indicate where droplets of condensate could collect in the lower part of each part of the conduit according to yet another embodiment of the present invention.

FIG. 16B schematic depicts the assembly of the three vapor supply conduit lines 1603 into T-connector 1610. Note in schematic FIG. 15 that connection 1526 in some embodiments of the present invention, may be a specialized T-connector joining three specialized vapor supply conduit lines. The specialized T-connector can be of the T-connector 1610 kind which is depicted in FIGS. 16A and 16B. Furthermore, the three specialized vapor supply conduit lines can be the kind depicted in FIGS. 16A and 16B. Depicted on far left of FIG. 16B is a cross-sectional view at section C-C which shows vapor supply conduit line 1603 is inserted into opening 1616 of T-connector. Depicted also is sub-divider 1611 of the T-connector 1610 inserted below sub-divider 1601 of vapor supply conduit line 1603. Depicted in center of FIG. 16B is a longitudinal section of the assembled three vapor supply conduit lines 1603 into T-connector 1610. Depicted on right side of FIG. 16B is a longitudinal sectional view D-D through the T-connector 1610.

9.C. Vapor Vacuum Heating Systems Buildings

Figure 17A:
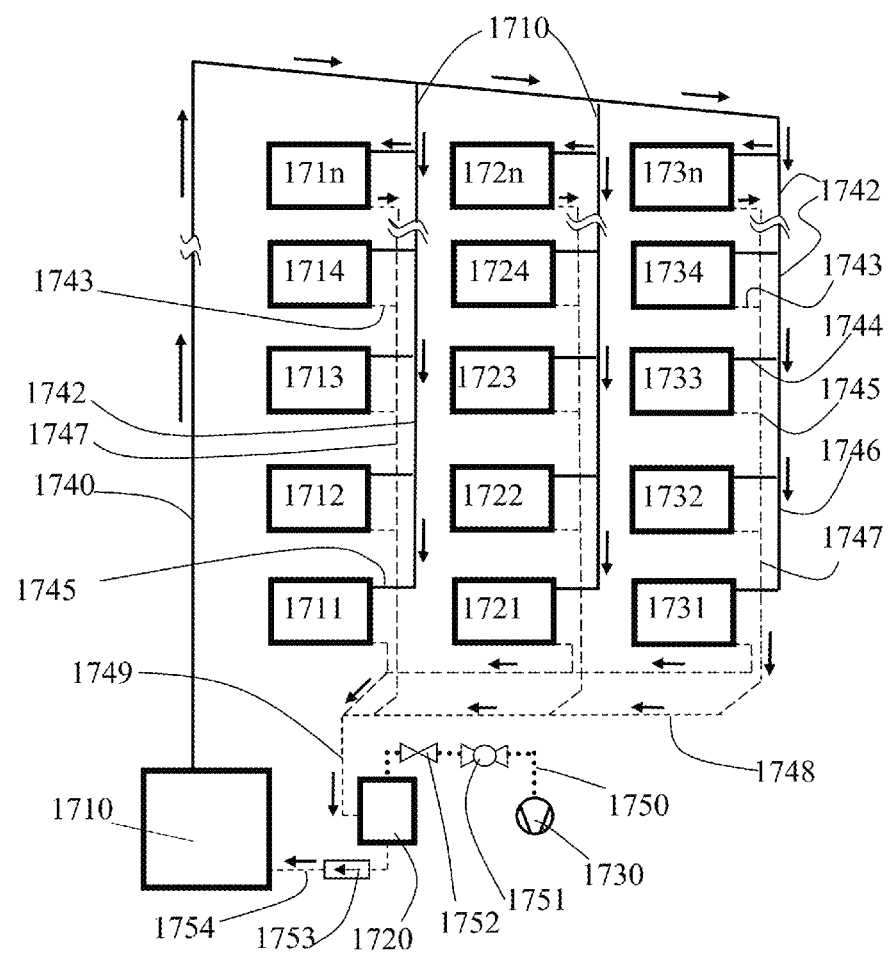
FIG. 17A illustrates yet another embodiment of a two pipe vapor vacuum heating system with condensate return from radiators into a vapor-condensate separator, useful for a high building where a noise problem is resolved by supplying vapor into radiators down-feed so the droplets of water in the supply lines are naturally carried into radiators and back into the boiler.

As depicted in schematic of FIG. 17A of a heating system embodiment of the present invention for a high building, the noise problem from vapor bubbling in condensate plugged vapor supply conduit lines can be minimized by supplying vapor by a down-feed method. FIG. 17A heating system will now be described only in terms of how the high building heating system needs to be different than the heating system depicted in FIG. 15, with only three risers shown for simplicity sake. Boiler 1710 supplies vapor in a main long vertical multi-story vapor up-feed line 1740 to above the highest radiators in the building and into a horizontal-downward sloping continuation of the overhead main vapor supply line 1740 (solid line).

Depicted in FIG. 17A the overhead main vapor supply line 1740 divides into three down-feed vapor supply conduit lines 1710 which deliver vapor to the highest floor of radiators 171n, 172n, and 173n. The highest radiators in the building are the first to receive down-feed vapor from the down-feed vapor supply lines 1710. Down-feed vapor supply line 1710 then becomes line 1742 in this schematic. Down-feed vapor supply lines 1742 deliver vapor to radiators 1714, 1724, 1734 and then to radiators 1713, 1723, 1733 and then to radiators 1712, 1722, and 1732. Down-feed vapor supply line 1742 then becomes line 1746 in this schematic. Down-feed vapor supply lines 1746 feed the lowest radiators 1711, 1721, and 1731.

Each column of radiators has a return down-feed line (dashed line), so that the droplets of water in the supply lines naturally carried into the radiators can go back into the boiler without clogging a vapor supply. The return down-feed lines are 1743, 1745, 1747, 1748 and 1749. There is a separate return line from lowest radiators 1711, 1721, and 1731 into return line 1748 to prevent condensate flooding in the lowest radiators. All return lines enter separator 1720 and the vapor phase can go through the temperature-controlled valve 1752, through the solenoid valve 1751 and get pumped out of the heating system by vacuum pump 1730. As with the separator in FIG. 15, condensate is captured in separator 1720 and drained through a check valve 1753 and sent via the return line 1754 into boiler 1710.

Figure 17B:
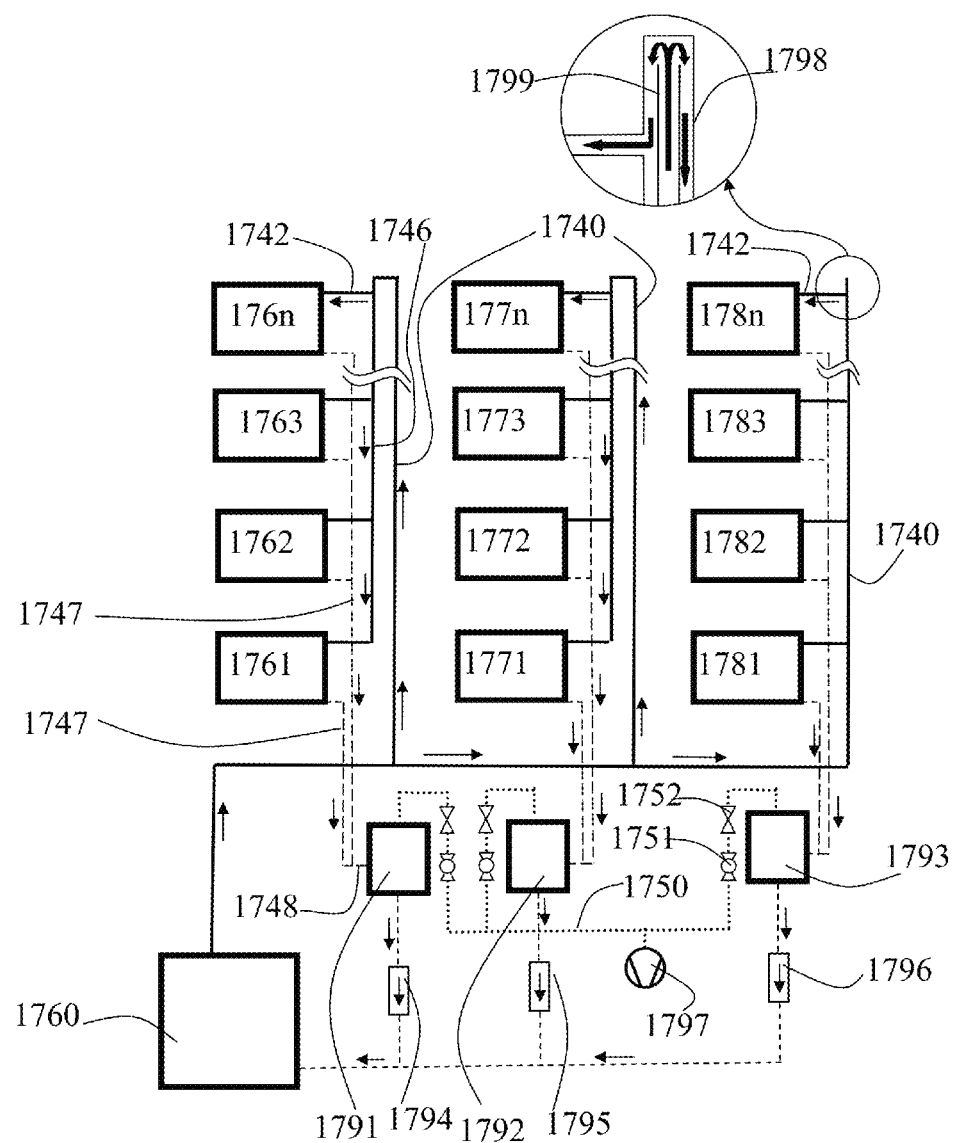
FIG. 17B illustrates yet another embodiment of two pipe vapor vacuum heating system using multiple risers with multiple radiator condensate returns to multiple vapor-condensate separators, useful for a high building having limited attic space and so that a noise problem is resolved by supplying vapor into radiators down-feed so the droplets of water in the supply lines are naturally carried into radiators and back into the boiler.

In case of limited space on attic, multiple lines 1740 from the basement to the upper floors can be provisioned to supply vapor from boiler 1760 as depicted in FIG. 17B. Vapor is delivered from vapor supply down-feed lines 1746 to vapor supply lines 1742 to supply vapor to radiators 176n, 177n, 1763, 1773, 1762, 1772, 1761, and 1771. Optionally, as depicted for the right-most riser 1740, an "inner tube" 1799 delivers vapor from the basement to the top floor and outer tube 1798 distributes vapor into radiators 178n, 1783, 1782, and 1781. Each column of depicted radiators has a vapor/condensate return (dashed line) down-feed line 1747, so that the droplets of water in the supply lines naturally carried into the radiators can go back into the boiler by gravity. There is a separate return vapor/condensate line 1747 from lowest radiators 1761, 1771, and 1781 into return line 1748 to prevent condensate flooding in the lowest radiators. Each of the return line 1747 depicted in FIG. 17B has its own separator 1791, 1792, or 1793, temperature-controlled valve 1752, and solenoid valve 1751. The three depicted solenoid valves 1751 are connected by a common vacuum pump line 1750 to a vacuum pump 1797. Each separator 1791, 1792, 1793 has its own condensate drain with a drain line to a separate check valve 1794, 1795, or 1796 respectively. Condensate from check valves drains back to boiler 1760.

The heating system depicted in FIG. 17B is equipped with multiple separators, and optionally each separator may have its own vacuum pump. The higher the vacuum is created for a particular separator, the greater the rate at which vapor that can be pulled into the radiators connected by return lines to that separator. Accordingly, heat distribution by specific risers can be increased or decreased by changing the range of vacuum by orchestrating the "on"/"off" cycling of the vacuum pumps.

The temperature-regulated valves can be utilized in some vacuum heating system embodiments of the present invention with the temperature-regulated valves added to the vapor supply line to each radiator in order to fine tune a room temperature.

9.D. Liquid Lift Apparatus for Use with Vapor Vacuum Heating Systems

Figure 18A:
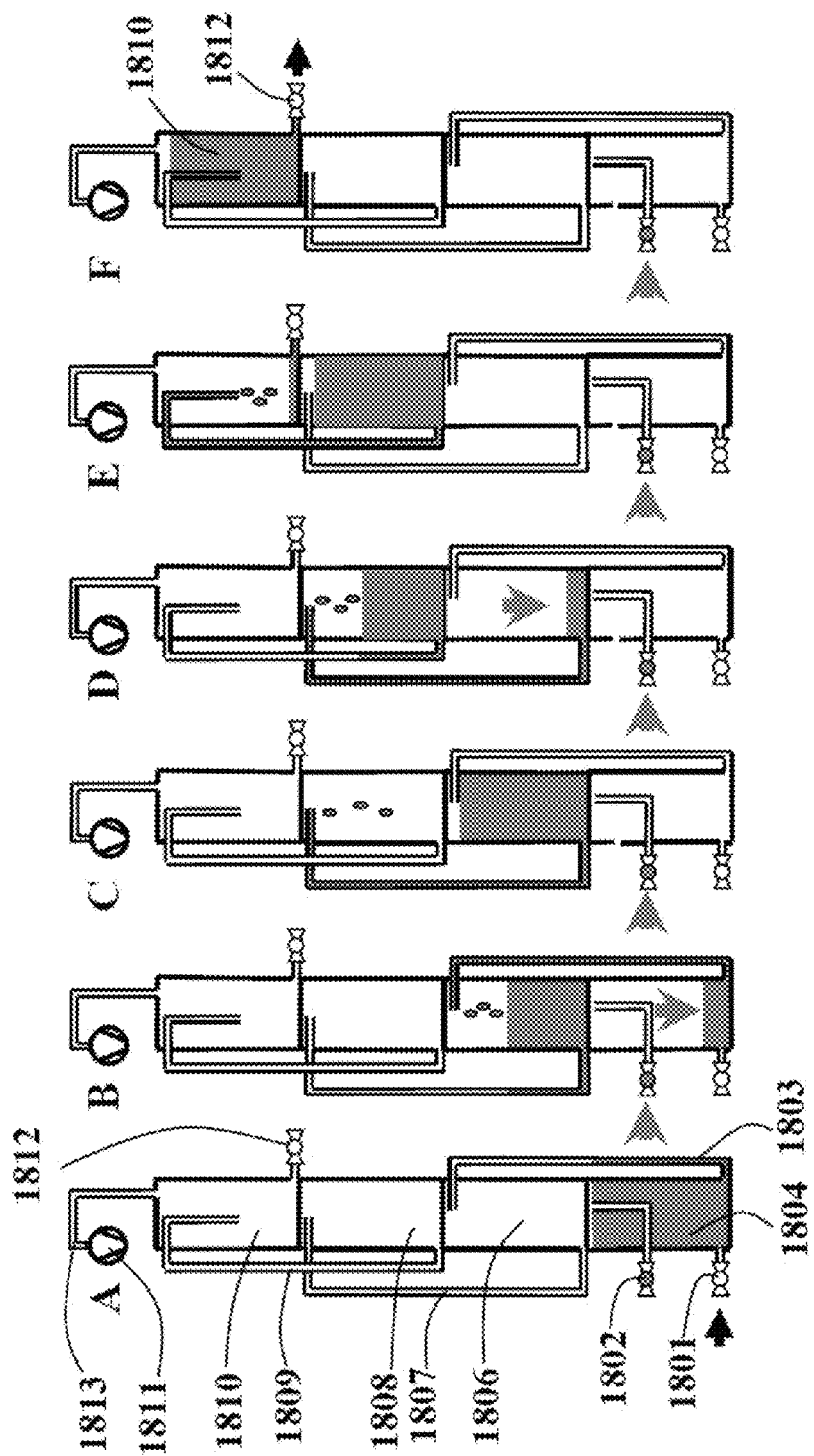
FIG. 18A illustrates yet another embodiment of two pipe vapor vacuum heating system for buildings higher than 10 meters wherein a condensate return conduit includes externally-connected compartments and solenoid valves so that a vacuum pump can be used to lift water from one compartment up to the next compartment and so on, until the water has been moved to the highest compartment by vacuum.
Figure 18B:
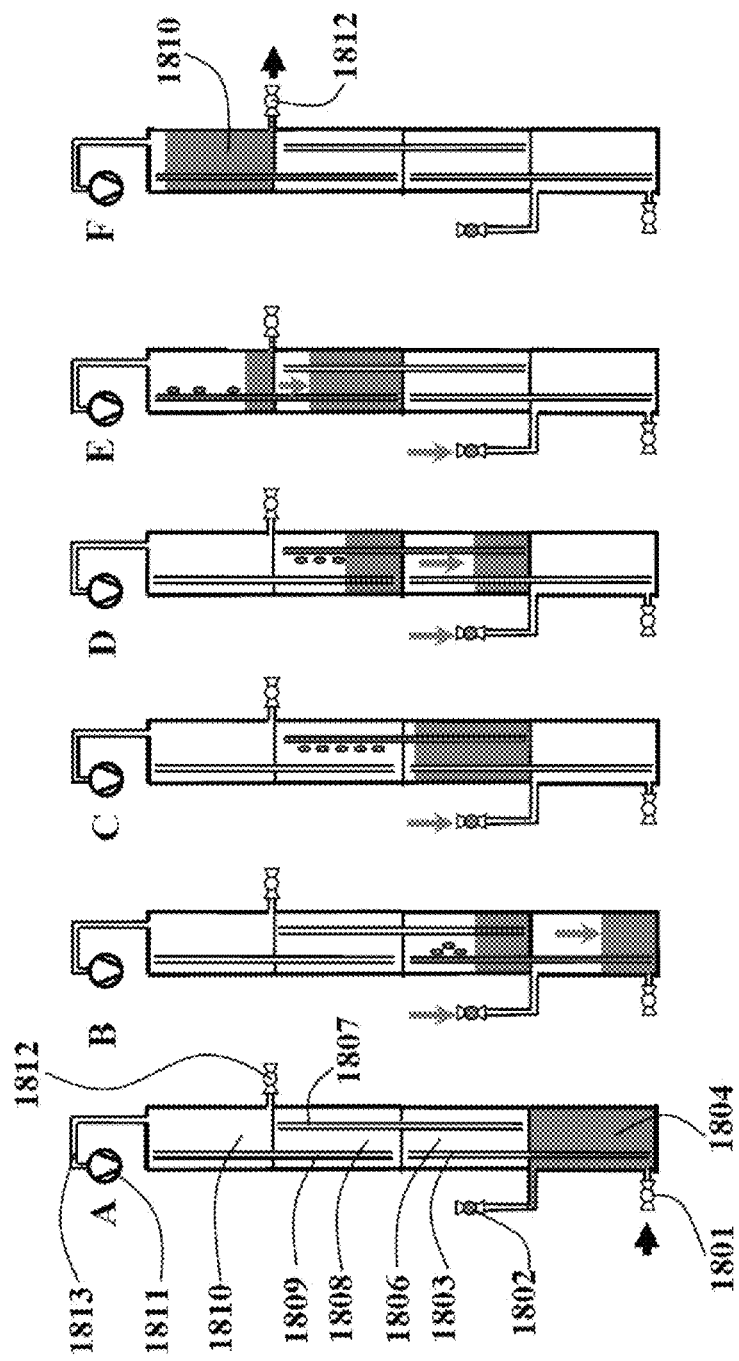
FIG. 18B illustrates yet another embodiment of a two pipe vapor vacuum heating system for buildings higher than 10 meters wherein a condensate return conduit includes internally-connected compartments and valves so that a vacuum pump can be used to lift water from one compartment up to the next compartment and so on, until the water has been moved to the highest compartment by vacuum.

In some embodiments of the present invention, a vacuum heating system boiler can be installed on the top of the building or on a high upper floor using a "water-lift" rather than a high pressure pump to return the condensate back to the boiler from basement more than 10 meters below the boiler. The use of a "water lift" in some embodiments of the present invention allows a vacuum heating system boiler to be installed on the top of the building or on a high upper floor. This "water lift" has a particularly high utility in the flood-prone regions of New York City, N.Y. where increasingly a boiler cannot be installed in a basement due to the growing risk of widespread flooding every few years from an ocean hurricane storm. Example embodiments of a "water-lift" in a vacuum heating system of the present invention are depicted in FIG. 18A and FIG. 18B. FIGS. 18A and 18B support embodiments for both a method and an apparatus of the present invention using a vacuum pump 1813 for returning a condensate from a compartment in a basement 1804 through three sequential compartments 1806, 1808 and 1810 with combined height of two adjunct compartments being at most about 10 meters. Thus the apparatus depicted in FIGS. 18A and 18B provides a method to return condensate by up to 20 meters to a boiler of a heating system using a vacuum pump rather than using a high-pressure pump. The more compartments water lift apparatus has, the higher can the liquid be lifted.

While a boiler has not been depicted in FIG. 18A or 18B, a boiler could be installed at the same elevation as any one of the compartments 1806, 1808 or 1810. The method embodiment of the present invention that relates to the "water-lift" apparatus depicted in FIG. 18A and in FIG. 18B comprises a method of: (1) creating and maintaining a vacuum in the apparatus by using the vacuum pump 1813 to create a pressure gradient inside a passage of the apparatus; and (2) using the pressure gradient in a passageway of the apparatus to push the condensate from a lower compartment in the passageway of the apparatus to an upper compartment in the passageway of the apparatus. Depicted schematically in FIG. 18A, and FIG. 18B is an apparatus which comprises four intermediate compartments 1804, 1806, 1807, and 1810 and three solenoid valves 1801, 1802, and 1812. A difference between the invention embodiments depicted in the schematics of FIG. 18A and FIG. 18B is the location of pipes 1803, 1807, and 1809; where in FIG. 18A the pipes are depicted as external to the intermediate compartments, whereas in FIG. 18B the pipes are depicted as internal to the intermediate compartments.

It is contemplated that in some embodiments of the present invention that one vacuum pump could provide the vacuum pressure drop for two or more of the water-lifts ("condensate lifts") depicted schematically in FIG. 18A and FIG. 18B.

FIG. 18A and FIG. 18B will now be described in greater detail. FIGS. 18A and 18B depict embodiments of the present invention which comprise a "water-lift" method and which comprise a "water-lift" apparatus. FIGS. 18A and 18B each provide six diagrams: a diagram "A", a diagram "B", a diagram "C", a diagram "D", a diagram "E", and a diagram "F". These diagrams are a basic schematic model for a "water-lift" whereby there is a gradual lifting of an amount of condensate (water) from a basement condensate tank 1804 to a higher condensate tank 1806 and therefrom to a higher condensate tank 1808 and therefrom to a higher condensate tank 1810. The total change in elevation of condensate by the "water-lift" is up to 20 meters. Some embodiments of the water-lift depicted in FIG. 18A and FIG. 18B are contemplated to be useful for performing condensate return in heating system installations in high-rise buildings. Below is a description of the methods being performed sequentially in diagrams A-F of FIGS. 18A and 18B.

Diagram "A" of FIG. 18A depicts a method for filling a lowest compartment 1804 with a condensate from a condensate source, comprising the steps of: closing a solenoid valve 1802 and opening a solenoid valve 1812; and delivering the condensate from the condensate source through an open solenoid valve 1801 to fill the lowest compartment 1804 with the condensate.

Diagram "B" of FIG. 18A depicts a method for moving the condensate from the lowest compartment 1804 to an intermediate compartment 1806 above the lowest compartment 1804, comprising the steps of: (1) closing the solenoid valves 1801 and 1812 before opening the solenoid valve 1802; and (2) switching on a vacuum pump 1811 so that atmospheric pressure pushes the condensate from the lowest compartment 1804 via a pipe 1803 into the intermediate compartment 1806.

Diagram "C" of FIG. 18A depicts a method for moving the condensate from the intermediate compartment 1806 to an intermediate compartment 1808 above the intermediate compartment 1806, comprising the steps of: (1) keeping the solenoid valves 1801 and 1812 closed and the solenoid valve 1802 open; and (2) keeping vacuum pump 1811 running so that atmospheric pressure pushes the condensate from the intermediate compartment 1806 via pipe 1807 to an intermediate compartment 1808.

Diagram "D" of FIG. 18A depicts a method for continued moving of the condensate from the intermediate compartment 1806 to an intermediate compartment 1808 above the intermediate compartment 1806, comprising the steps of: (1) keeping the solenoid valves 1801 and 1812 closed and solenoid valve 1802 open; and (2) keeping on vacuum pump 1811 running so that atmospheric pressure pushes the condensate from the intermediate compartment 1806 via pipe 1807 to an intermediate compartment 1808 and also starts to push condensate up pipe 1809 as the intermediate compartment 1808 fills with condensate.

Diagram "E" of FIG. 18A depicts a method for moving the condensate from intermediate compartment 1808 to the topmost compartment 1810 above the intermediate compartment 1808, comprising the steps of: (1) keeping closed the solenoid valves 1801 and 1812 and solenoid valve 1802 open; and (2) keeping on vacuum pump 1811 so that atmospheric pressure pushes the condensate from the intermediate compartment 1808 via pipe 1809 to the topmost compartment 1810.

Diagram "F" of FIG. 18A depicts that the condensate is now in the top-most compartment 1810. To return condensate from topmost compartment 1810 to a boiler, a boiler condensate line should be connected to solenoid valve 1812; stop vacuum pump 1811; leave solenoid valve 1801 closed; leave solenoid valve 1802 open; and open solenoid valve 1812 to allow condensate to drain from compartment 1810 to a boiler connected to solenoid valve 1812.

The only requirement for the method and apparatus depicted in FIGS. 18A and 18B, is that the vertical height of pipes 1803, 1807, and 1809 cannot exceed the height of the condensate that can be created by the vacuum pump 1811. Average sea-level pressure is about 29.9 inches Hg. One atmosphere pressure is caused by the weight of a column of fresh water of approximately 10.3 m (33.8 ft). Thus under normal average atmospheric conditions, a vacuum pump creating a 14 inches Hg vacuum can force the condensate in pipes 1803, 1807, and 1809 to rise to a height of roughly 15 feet. The pipe's maximum height calculation is: 33.8 feet maximum condensate height/atmospheric pressure×(relative pressure of 14 inches Hg of vacuum/29.9 inches Hg for 1 atmospheric pressure)=15.8 feet.

Today's common practice in high-rise building is a hydronic system with water pumps on mechanical floors every 15-20$^{th}$ floor (about 40-60 m height); these high pressure pumps are expensive, occupy valuable space, consume large amounts of electricity, and require regular maintenance. Instead, the proposed "water-lift" method of water delivery by embodiments of the present invention can be employed as well for use in a domestic water supply installation. Low pressure plastic tubing can be used for the "water lift" and it has the advantages of being cheaper and non-corrosive. Additionally, water reservoirs would be installed every 5-10 floors to ensure the optimal pressure range for plumbing fixtures, and pressure reducing valves can be eliminated with proposed method.

9.E. Vapor Vacuum Heating Systems with Boiler at a Building Top

Figure 19:
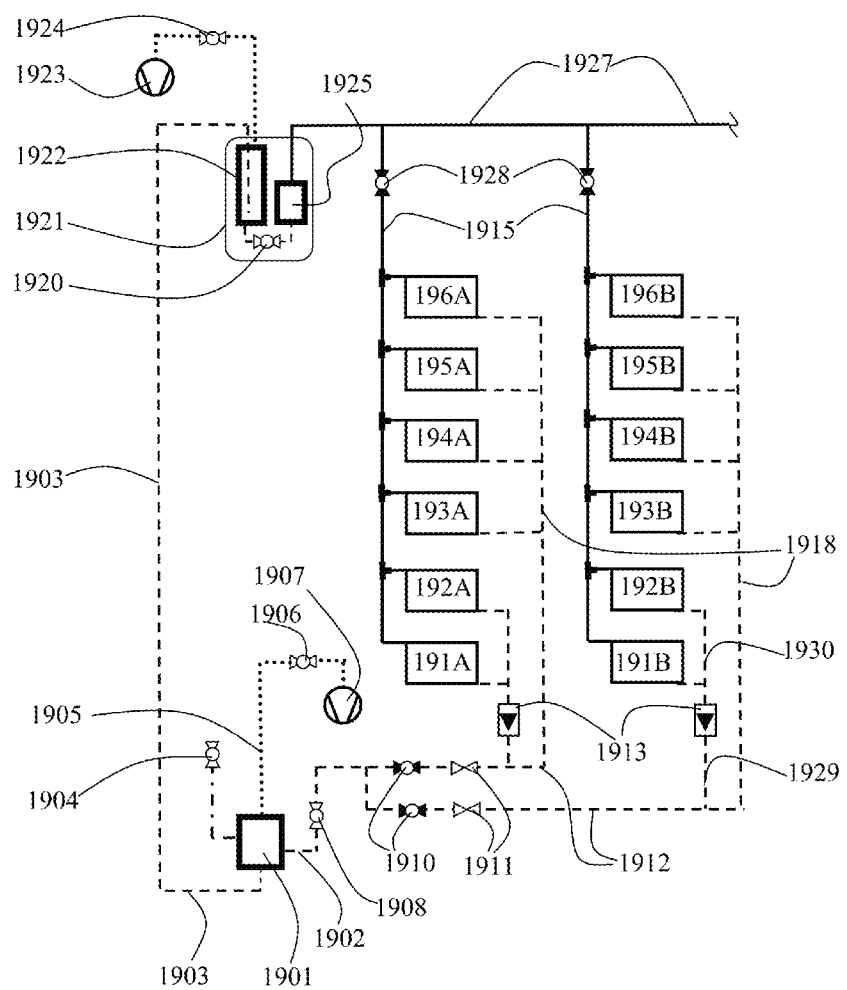
FIG. 19 illustrates a schematic of yet another embodiment of a two pipe vapor vacuum heating system in which the boiler is located on the top of the building with radiator condensate return to a vapor-condensate separator in the basement of the building and with a vacuum pump to return condensate from separator back up to the boiler when boiler water level is too low for continued operation.

Depicted in FIG. 19 schematic for some embodiments of the present invention is a vacuum system with a boiler 1921 on the top of the building. Boiler 1921 comprises a "storage" section 1922 which passes water through solenoid valve 1920 to evaporator 1925 to make vapor which can be sent out into horizontal main vapor supply line 1927. A condensing boiler concept can be naturally utilized if flue gas from boiler is cooled in boiler section 1921. Vapor from horizontal main line 1927 passes through solenoid valves 1928 of each vapor supply down-feed risers 1915 which supplies vapor using T-connections to radiators 196A, 195A, 194A, 193A, 192A, 191A, 196B, 195B, 194B, 193B, 192B, and 191B. For sake of clarity, only two down-feed risers 1915 for six-floor building are depicted in FIG. 19, thus the number of vapor supply down-feed risers 1915 and building height depicted in FIG. 19 is not a limitation. Some embodiments of the present invention may employ more of vapor supply down-feed lines 1915. Of the 12 radiators depicted, the top 8 drain their condensate by gravity in return lines 1918, 1912, and therefrom the condensate travels through temperature-regulated valves 1911 and therefrom the condensate travels through solenoid-regulated valves 1910 and therefrom the condensate travels through solenoid valve 1908 and therefrom the condensate drains into a common condensate return line 1902 connected to the separator 1901. Also FIG. 19 depicts that steps are taken to prevent condensate overflow from condensate return lines 1912 back into the bottom radiators R192A, R191A, R192B, and R191B. There are separate condensate return lines 1930 from these four lower radiators with each condensate return line 1930 having a check valve 1913 and therefrom the condensate enters condensate return lines 1912, and therefrom the condensate passes through temperature-regulated valve 1911 and therefrom the condensate travels through solenoid-regulated valve 1910 and therefrom the condensate passes through a solenoid valve 1908 with the condensate draining into a common condensate return line 1902 that feeds condensate to the separator 1901 depicted in FIG. 19.

If and when the water level in boiler 1921 section 1922 drops below a minimum safe level, then steps are taken so that the vacuum sustaining heating system, depicted in FIG. 19, will add condensate to boiler section 1922 to raise the water level. The first step is to close solenoid valve 1908 and solenoid valve 1920. Then solenoid valve 1904 is opened to the atmosphere, and a "water-lift" apparatus system 1903 is switched "on" to return condensate to boiler 1921 for section 1922. The "water-lift" apparatus 1903 is depicted in FIGS. 18A and 18B and described in the written description accompanying FIGS. 18A and 18B. Vacuum pump 1923 is switched "on" and solenoid valve 1924 is opened so that the vacuum pump 1923 lowers the pressure in boiler 1921 section 1922. The "water-lift" 1903 transports condensate from lower floors in the high-rise building into the boiler section 1922 and when the water level in boiler 1921 section 1922 is back up to a safe level, then solenoid valve 1904 is closed to the atmosphere. Next, vacuum pump 1907 is started and solenoid valve 1906 is opened to restore the vacuum in the separator 1901. Also solenoid valves 1908 is opened for air evacuation from separator 1901 and solenoid valve 1920 in boiler 1921 is opened so that condensate can flow into boiler evaporator section 1925 to create vapor. In FIG. 19, the depicted two vacuum pumps: vacuum pump 1923 which is used by "water-lift" and vacuum pump 1907 which is used for separator 1901, can in some embodiments of the present invention be piped to back-up each other's vacuum work. It is an option in some embodiments to use a single vacuum pump with a particular piping layout. Further note that as explained in detail in relation to FIG. 15, that temperature controlled valves 1911 on condensate 1912 return lines will close automatically when temperature in line 1912 rise above setting of 35-40° C. when air is purged from each line 1915 by the activity of vacuum pump 1907. A solenoid valve 1910 is provided to be able to shut condensate drainage from each down-feed vapor supply riser 1915 when (1) a part of the vacuum sustaining heating system needs to be shut down for repair or maintenance, and/or (2) an area of the heating system needs to be fine-tuned to adjust its heat distribution to radiators.

9.F. Vapor Vacuum Heating Systems Integration with District Heat

In other embodiments of the present invention, the vacuum heating system can be integrated into a district heating system using either up-feed vapor supply risers to radiators or down-feed vapor supply to the radiators, similar to the systems depicted in FIG. 15 and in FIG. 17, correspondingly. Two alternative methods of integration of district heat systems into embodiments of the present invention are discussed next.

Figure 20:
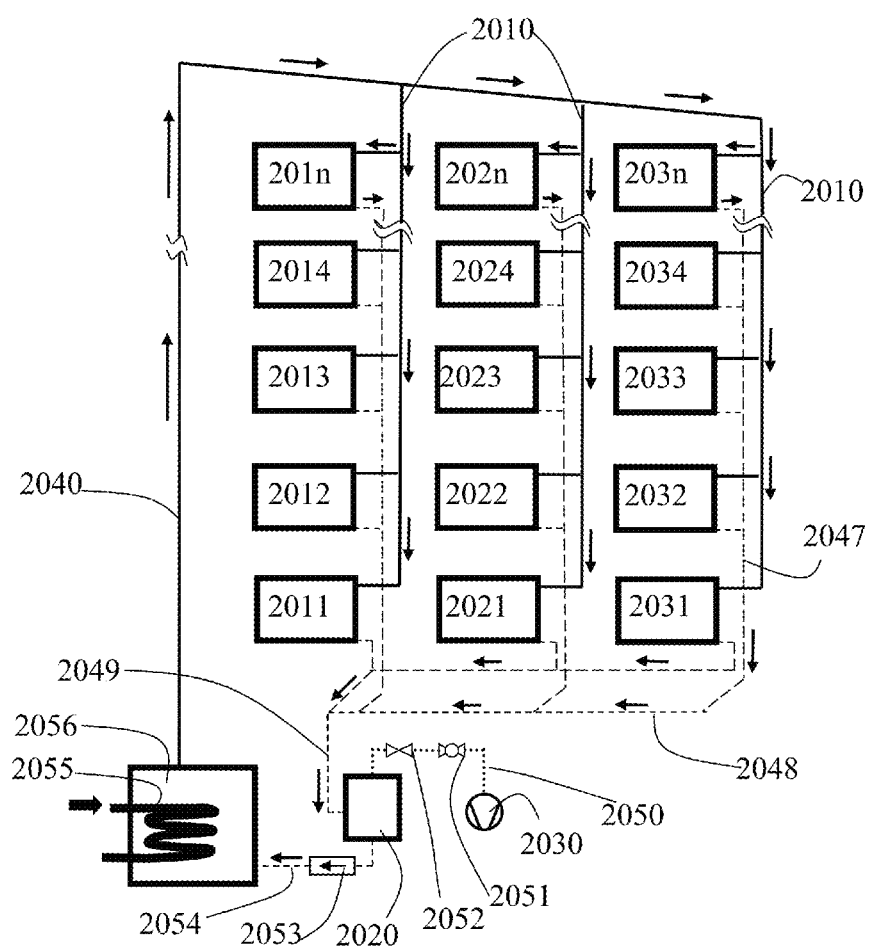
FIG. 20 illustrates a schematic of yet another embodiment of two pipe vapor vacuum heating system in which a district steam heating system supplies heat through a heat exchanger coil with down-feed vapor delivery as illustrated in FIG. 17A so that a noise problem is resolved because the droplets of water in the supply lines are naturally carried into radiators and back into the boiler.

One method and apparatus for some embodiments of the present invention is depicted in FIG. 20 where a "separate-loop" heat exchanger delivers steam heat as a means for an integration of district heat systems. Instead of boiler, separate loop of a district steam system as a coil 2055 is located in a vacuum heating system heat exchanger 2056. Otherwise the system and controls in FIG. 20 are similar to FIG. 17A.

Depicted in FIG. 20 schematic is an embodiment of the present invention which includes a vapor supply which is a heat exchanger 2056 which obtains district steam system heat delivered by a "separate-loop" heat source coil 2055. The vapor from heat exchanger 2056 supplies vapor to riser 2040 to supply vapor to a main horizontal-downward pitched vapor supply line with T-connectors to supply vapor to vapor supply down-feed lines 2010 that supply vapor to radiators 201*n*, 2014, 2013, 2012, 2011, 202*n*, 2024, 2023, 2022, 2021, 203*n*, 2034, 2033, 2032, and 2031.

Also depicted in FIG. 20 schematic, is that condensate can exit from the radiators and pass down return lines 2047 by gravity to a common return line 2048 which is connected to a common vapor return line 2049 which is connected to a separator 2020. The vapor from the common return line 2049 enters into the separator 2020 on a tangential course so that any droplets of condensate spiral outwardly and down within the separator 2020 due to gravity and centrifugal force acting on spiraling course of the condensate droplets. In the bottom of separator 2020, the condensate drains by gravity into a condensate line leading to a check valve 2053. From the check valve 2053, condensate passes into condensate line 2054 and then into heat exchanger 2056. Air is removed from the top of separator 2020 via a pipe to a temperature-activated valve 2052 which connects to a solenoid valve 2051 which is connected via pipe 2050 to a vacuum pump 2030.

In preferred embodiments of the present invention, the vapor phase from common vapor return line 2049 is monitored by a temperature sensor positioned in vapor return line 2049 at the entrance to the separator 2020. In some embodiments of the invention, the heating system has a temperature-activated valve 2052 so that valve 2052 is "open" when the temperature of the vapor phase at the entrance of separator 2020 is between about 30° C. to about 35° C. or lower and is closed when the temperature of the vapor phase at the entrance of separator 2020 is above 35° C.

The measured pressure decrease ("vacuum") is measured at an exit of the vapor source—heat exchanger 2056. The heating system of the present invention depicted in FIG. 20 may use a pressure-activated controller unit to turn the vacuum pump 2030 on when the vacuum is outside a selected range, and turn the vacuum pump 2020 off where the vacuum is in a selected range. When the heating system is idle, depending upon the leakiness of the heating system to the atmosphere, the vacuum pump 2030 will intermittently turn on to restore the vacuum inside lines of the heating system to the selected range.

The vacuum pump 2030 depicted in FIG. 20 is switched "on" when the heat exchanger 2010 receives heat from "separate-loop" heat source coil 2055 via a call from the room temperature controller for a new heating cycle. Latent heat from district steam condensing within coil 2055 cause water evaporation in shell part of heat exchanger 2056. Rising water vapor pressure in line 2040 would push any air from heat exchanger 2056, down-feed vapor supply risers 2010, radiators, condensate return lines 2047, 2049 into the separator 2020. In addition, when the pressure measured by a pressure sensor located at the vapor source exit of heat exchanger 2010 rises up into a set range, then the vacuum pump 2030 turns "on" to remove air from separator 2020. Once the air from the heat exchanger, risers, radiators, and return lines has been evacuated by vacuum pump 2030, then hot vapor/condensate will be detected by the temperature sensor located at the entrance of separator 2020. When the temperature sensor signals that the temperature at the separator entrance has increased to between 35° C. to 40° C., then the vacuum pump controller turns off the vacuum pump 2030 and closes solenoid valve 2051. Also depicted in FIG. 20 between separator 2020 and solenoid valve 2051 is a back-up temperature-activated valve 2052 which can be set to close when the measured temperature at temperature sensor is 40° C. These controls minimize how much hot vapor/condensate is wastefully drawn into the vacuum pump 2030.

Figure 21:
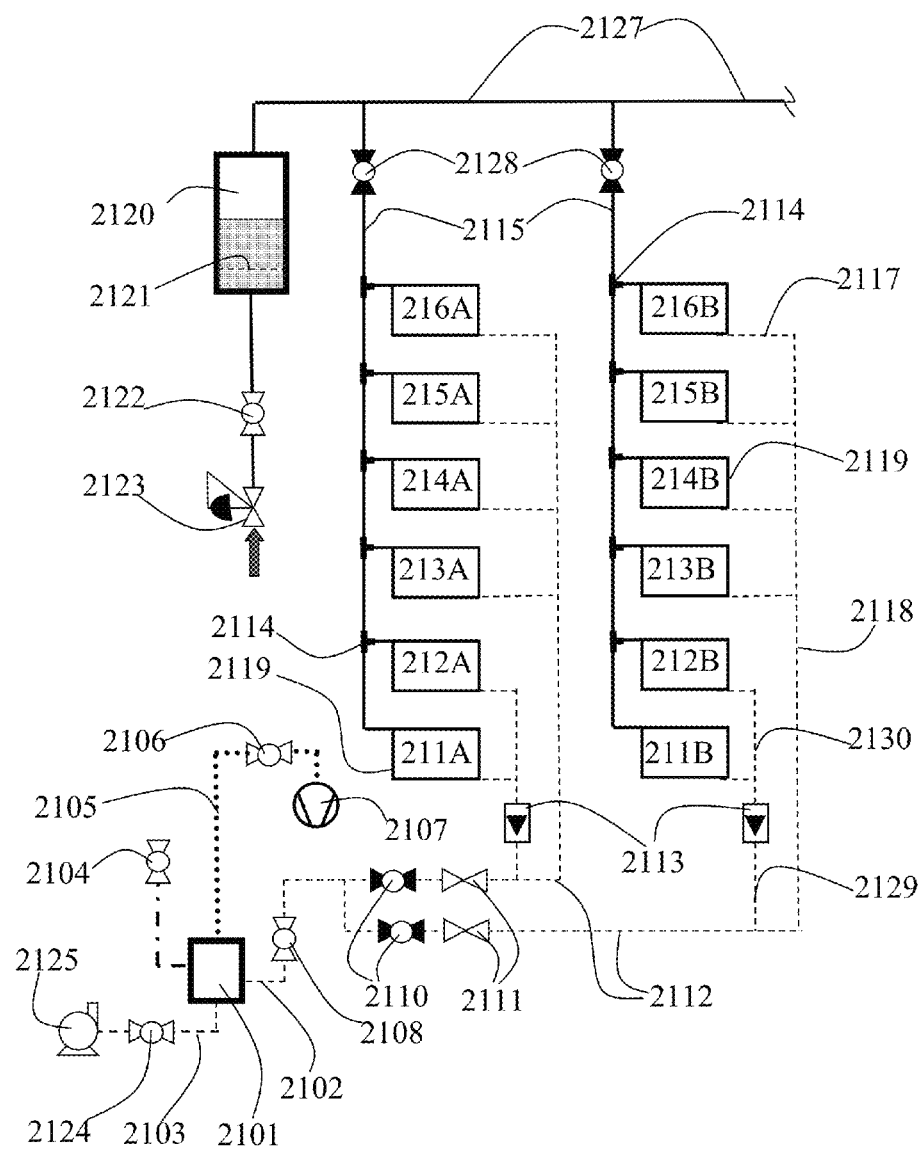
FIG. 21 illustrates a schematic of yet another embodiment of a low volume two pipe vapor vacuum heating system in which a district steam heating system supplies heat via a pressure reducer and a control valve under a perforated plate in an evaporator so that vapor is quickly generated without pounding and by using down-feed vapor delivery as illustrated in FIG. 17A so the droplets of water in the supply lines are naturally carried into radiators and down to the separator from which condensate is periodically pumped out.

Depicted in FIG. 21 schematic is an alternative method and apparatus for obtaining a vapor source for a vacuum sustaining heating system of the present invention by an integration of a district heat system. The vapor source is steam from a district steam grid. District steam supplied via pressure reducer 2123 passes through control valve 2122 into evaporator 2120 under perforated plate 2121. Tiny bubbles of steam condenses instantly and quickly heat water in evaporator 2120. Saturated vapor enters main vapor supply line 2127 gradually and without pounding. Please, note that evaporator 2101 with perforated plate 2121 is optional, steam from control valve 2122 can be supplied directly to vapor supply line 2127. Note that evaporator 2101 with perforated plate 2121 is optional; alternatively, steam from control valve 2122 can be supplied directly to vapor supply line 2127. Main vapor supply line 2127 is connected to two or more down-feed lines 2115 through a valve 2128. The rest of the heating distribution system schematic and operation of the system depicted in FIG. 21 relates generally to the system depicted in FIG. 17A. Thus FIG. 21 depicts a schematic for embodiments of the present invention heating system for a high building which provides a minimal noise. Conventional T-connectors 2114 and lines 2115 can be used to down-feed vapor to radiators 216A, 215A, 214A, 213A, 212A, 211A, 216B, 215B, 214B, 213B, 212B, and 211B. In FIG. 21, the top radiators of each column of radiators have a return line 2117 which enters a main condensate return line 2118 to return lines 2112 and therefrom through valves 2111, 2110, and 2108 before entering separator 2101 via condensate return line 2102. Also FIG. 21 depicts a schematic for embodiments of the present invention heating system wherein there is a separate return line 2130 from lowest two radiators 212A, 211A, 212B, and 211B with check valves 2113 to prevent condensate flooding in the lowest radiators. From the check valves 2113 the condensate passes into return lines 2112 and therefrom through valves 2111, 2110, and 2108 before entering separator 2101 via final condensate return line 2102.

Before hot vapor/condensate reaches the separator 2101, air present in the heating system will be removed by vacuum pump 2107 as will now be described. Air in vapor-supply lines 2127 and 2115, in the radiators, and in return lines 2118, 2130, 2112, and 2102 condensate return lines, passes through valves 2111, 2110, 2108, and therefrom through line 2102 into the separator 2101 and passes through valve 2106 to vacuum pump 2107. Excessive condensate in separator 2101 needs to be periodically removed by pump 2125 after closing valve 2108 and opening valve 2104 and valve 2124. During normal operations of the heating system, note that valve 2108 is open and valves 2104 and 2124 are closed. Thus after separator 2101 has been emptied of condensate, then valves 2104 and 2124 are closed and valve 2108 is opened.

9.G. Reducing Stress of Water Column High Pressure in Return Lines

Figure 22:
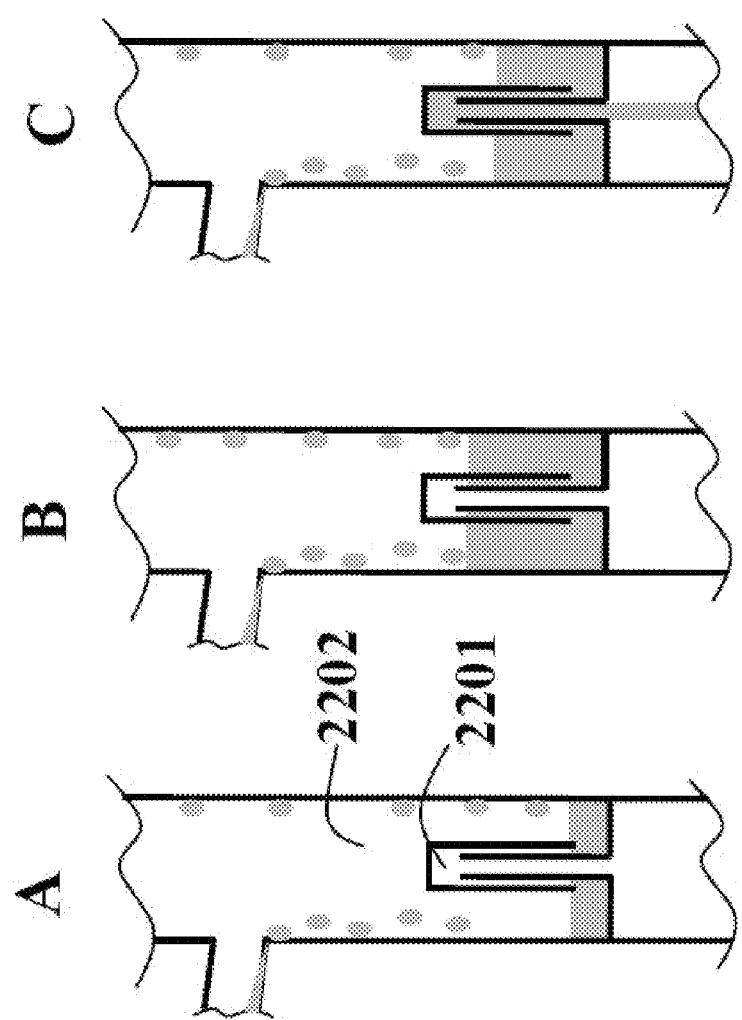
FIG. 22 illustrates a schematic of yet another embodiment of two pipe vapor vacuum heating system for use in high-rise buildings which is to use a soxhlet type overflow component to compartmentalize the condensate return lines every 10-15 meters in order to reduce condensate return line stress from water column pressures and high water velocities in the vertical line of condensate return lines.

Condensate return lines in high-rise buildings may be exposed to stress due to a water column high pressure in the return line or a high linear velocity of water in the return line. Depicted in FIG. 22 schematic is an apparatus and a method to be used in a vertical condensate return line to reduce this stress. The apparatus uses soxhlet type overflow device 2201 in a separate compartment 2202. Depicted in panel A of FIG. 22, are condensate droplets falling in the vertical condensate return line and accumulating in a compartment 2202. Later in time, as depicted in panel B of FIG. 22, more condensate has accumulated in the compartment 2202 but no condensate is inside soxhlet type overflow device 2201. Later in time, as depicted in panel C of FIG. 22, condensate from the compartment 2202 is draining through the soxhlet type overflow device 2201 into the vertical condensate return line below the soxhlet type overflow device 2201. The Soxhlet type overflow device 2201 in the compartment 2202 would be spaced in the vertical condensate return line about every 5-10 meters, in one illustrative embodiment. Optionally, an externally located soxhlet type overflow device could be used.

10. Vacuum Heating Field Test: Installation Schematic, Technical Details, and Results In order to experimentally test and evaluate the effectiveness of some of the embodiments of the present invention in a real-world situation, a five-month field test was conducted during the frigid 2013-2014 heating season in a 1,150-sq-ft apartment on the second floor of a two-family house outside Boston. Initially, the apartment was heated by an old boiler and cast iron radiators that appear to have been there since the early 1900s. A separate natural gas meter serving only the boiler was installed so that daily gas consumption could be accurately measured.

In order to compare the efficiency potential of modern vacuum steam components to the old steam technology, the old system was left in place while installing new, European-style steel-panel radiators in the same apartment. These radiators were connected to the old boiler by ¾-inch and ½-inch copper tubing using ProPress fittings. Flexible ⅝-inch-outside diameter Teflon tubing designed for continuous operating temperatures up to 155° C. (311° F.) was used in tight spaces as the vapor supply lines. The condensate was returned to the boiler by gravity through ⅜-inch-diameter polypropylene tubing. The system operating temperature never exceeded 85° C. (185° F.) although a temperature of 100° C. could have attained if needed.

Depicted in FIG. 2 is the initial setup in which the condensate return tubing was connected to a 4 ft³/min Robinair one-stage rotary-vane vacuum pump 202 in the basement. Before the boiler was started, the vacuum pump 202 created an initial vacuum of 26-27 inch Hg while the heating system was cold. If the amount of vacuum was not restored when the system cooled following a heating cycle ("cooled" meaning the temperature at the supply line from the boiler is below 40° C.), then the vacuum pump 202 would switch "on" and restore the vacuum to the setup level. It was found later that the old steam boiler was sucking air via large leak in a boiler "chest" which was hard to find and impossible to fix. As result, during the day the air content in the heating system increased which deteriorated the heating system effectiveness and the radiators were unevenly heated.

Using a transparent ½" OD plastic tubing for the condensate return lines, it was discovered that water plugs would build up in the radiator condensate return line due to the formation of a vacuum when the vapor condensed. These water plugs stopped vapor from entering the condensate return lines but allowed water to flow down the condensate return lines. Thus the using of ½" OD plastic tubing as the condensate return line functioned as a natural steam trap was found. It was also observed that the internal space of the condensate return lines was not uniform and that the water plugs in the return lines were separated by voids. It was observed that after boiler was stopped the system needed a long time to equilibrate and it took a long time for the condensate to drain back down the condensate return lines into the boiler. In addition, there was the problem that turning on the vacuum pump caused the "water plugs" in condensate return line to be instantly sucked into the vacuum pump. The sucked-in condensate would mix with the vacuum oil of the vacuum pump and deteriorate the performance of the vacuum pump.

In order to purge the condensate return lines of the "water plugs", the rotary vain vacuum pump which needed to use vacuum pump oil was replaced by 3 ft³/minute, oil-free, piston-type vacuum pump made by AirTeck® Vacuum. This oil-free vacuum pump had no oil to get contaminated during the "water plug" purging of the condensate return lines. In addition, this oil-free pump tolerated higher operating temperatures. Connections to the system and control algorithm were modified. A detailed schematic of the system is presented in FIG. 15, where only three out of six radiators are shown for simplicity. The system depicted in FIG. 15 includes a boiler 1519, radiators R1501-1503, vapor supply lines 1514, 1511, 1510, 1511, 1512, and 1513 to bring vapor from the boiler to the top of the radiators, and condensate return lines 1507-1513, and 1515 to carry condensate from the bottom of the radiators to the separator 1520. Vapor/liquid mixture 1515 from the condensate return lines enters at a tangential angle into the separator 1520, where droplets of condensate 1527 spin down by gravity and centrifugal forces. The vapor phase 1528 is removed from the top of the separator 1520. The condensate 1524 from the separator 1520 drains by gravity and passes through a check valve 1525 and into the boiler 1519. When the air/water vapor/condensate mixture 1515 entering the separator 1520 has a temperature below 30° C.-35° C., it consists mostly of air and it can be sucked into line 1516 by vacuum pump 1523. The higher temperatures of line 1515 the more hot water vapor enter separator 1520 and this causes the temperature sensor on line 1515 to send a signal to the vacuum pump controller which stops vacuum pump 1523 and closes solenoid valve 1522. A temperature activated valve 1521 is provisioned as backup for valve 1522.

The new vacuum pump 1523 routinely maintains a level of vacuum in the idle system that is within the preset interval. Additionally, the vacuum pump is switched "on" when the boiler is fired via a call from the room temperature controller for a new heating cycle. The rising water vapor pressure in the system pushes remaining air from the boiler and radiators via the condensate return lines into separator 1520. When pressure in the system has risen up to the vacuum switch's lower setting point, then the vacuum pump 1523 starts to remove air from the separator 1520. When the air has been evacuated, and hot vapor/condensate mixture enters separator 1520, temperature switch (located at the separator entrance, set value 30-40° C.) stops the vacuum pump and close solenoid valve 1521. It very notable that the vacuum pump was found to need to operate only for 3-5 minutes to handle these recurring air removals. Furthermore, it was found that with vacuum pump switch setting at 18/14 inch Hg ("off"/"on" correspondingly), the new vacuum pump control procedure produces 25-27 inch Hg vacuum in a cooled system, running in three- to eight-minute cycles totaling one-and-a-half to two hours per day.

In prior art of vacuum heating, a vacuum pump would switch "on" once the vacuum in a system drops below set point because of either (a) an air leakage or (b) a vapor pressure increase from the boiler. In case (b), a vacuum pump would be employed during the entire heating cycle to remove hot condensate from radiators via steam traps. In reality, the vacuum pump would suck in all the water and vapor that leaked through the steam traps. Because steam trap failures are such a common affliction of steam heating systems, high capacity vacuum pump are commonly-employed almost non-stop to sustain a suitable vacuum level, and frequently as a result the vacuum pump becomes overloaded. Because no heating system is without some air leakage, a vacuum pump is needed to periodically evacuate air from the heating system. However in contrast the prior art, the discharge of hot vapor/condensate into the vacuum pump is prevented by the present invention's control system features (which have temperature and pressure control settings for starting and stopping the vacuum pump, and for opening and closing the vacuum line from the separator to the vacuum pump). A small capacity vacuum pump is quite sufficient and quite unexpectedly needs to be turned "on" for only a short time interval.

For some embodiments of the present invention, the one control cycle of the sustained vacuum heating system and methods is as follows: (1) When the heating system is cool, the vacuum pump turns "on" at a vacuum level of about 14 inches Hg (measured at the exit of the vapor source) and the vacuum pump turns "off" at a vacuum level of about 18 inches Hg (measured at the exit of the vapor source). (2) However, when a room thermostat commands the heating system vapor source (i.e., boiler or other vapor source) to begin to deliver vapor, then the level of vacuum at the exit of the vapor source decreases (because of increased vapor pressure) and the vacuum pump turn "on". (3) When the hot vapor/condensate passes through the heating system risers, the radiators, the condensate return lines, and then warms a temperature sensor at the entrance of the separator to above 35° C., then the temperature sensor signals the vacuum pump controller to turn "off" and valves to the vacuum pump are shut off to isolate the vacuum pump from exposure to the hot vapor/condensate. (4) Hot vapor from the boiler warms radiators and room until the room thermostat indicates that the room is warm and then the thermostat shuts the boiler off (5) As the heating system cools, the vacuum level in the heating system rises to a peak of about 25-27 inches Hg and then slowly the vacuum level declines. When the vacuum level falls to about 14 inches Hg, the vacuum pump controller turns "on" when the temperature sensor at the entrance of the separator has cooled below about 35° C.

A data acquisition system recorded every 10 seconds during tests the following data: (a) the temperature of the flue gas, (b) the temperature of the vapor at the boiler exit, (c) the temperature at the entrance into each radiator, and (d) the temperature of the condensate return. The data acquisition system also recorded the level of vacuum in the system and the fuel gas consumption rate by the boiler.

Figure 23A:
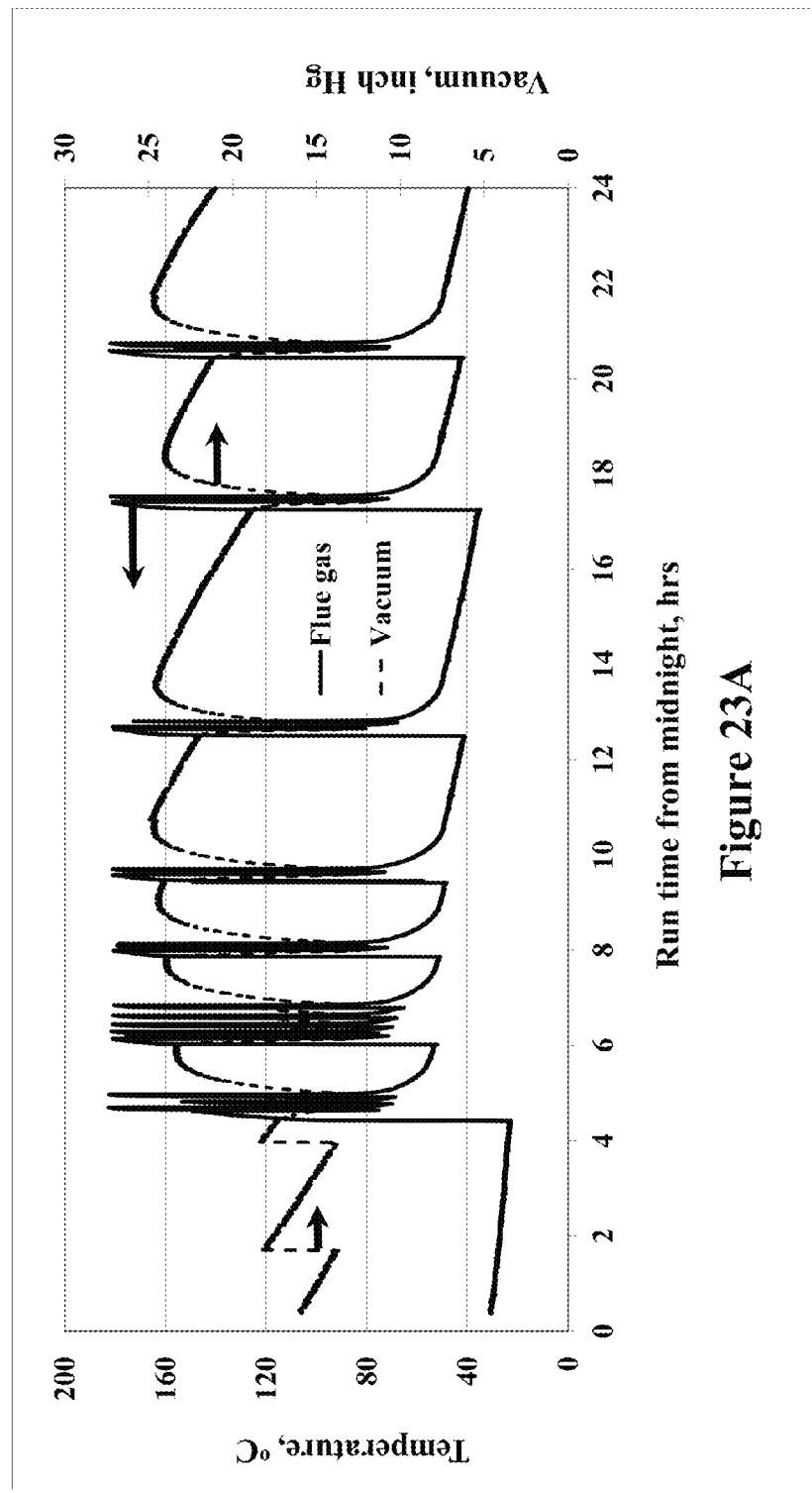
FIG. 23A presents a twenty-four (24) hour chart record of flue gas temperature measurements and vacuum measurements from a field test of an experimental embodiment of the present invention which is a vacuum-sustaining heating system.

In FIG. 23A a twenty-four (24) hour chart record is presented from a field test of an experimental embodiment of the present invention which is a vacuum-sustaining heating system. The chart record has a continuous record of the heating system temperature and vacuum for Apr. 5, 2014 which was noted by the Inventor to be a representative cold weather Boston day. Zero (0) hour of the experiment was at 12 o'clock midnight. From midnight to 4 AM, the heating system flue gas temperature was recorded to be between 20° C.-30° C. indicating that the boiler was "idle" (shut "off"). To sustain the vacuum level in the heating system at this time, the heating system vacuum pump automatically turned "on" (about once per two hours in this field test) for a very brief interval of 3-5 minutes to bring the level of vacuum in the "cool" heating system from about 14 inches Hg to about 18 inches Hg. From the chart record, the start of the boiler heating cycle is readily apparent. There is a rapid spiking of the flue gas temperature and a rapid coincident drop in the vacuum level measure at the exit of the boiler supplying hot vapor. The turning "off" of the boiler is evident from the rapid fall in flue gas temperature and there is a rapid increase in the heating system vacuum level due to vapor condensation.

Figure 23B:
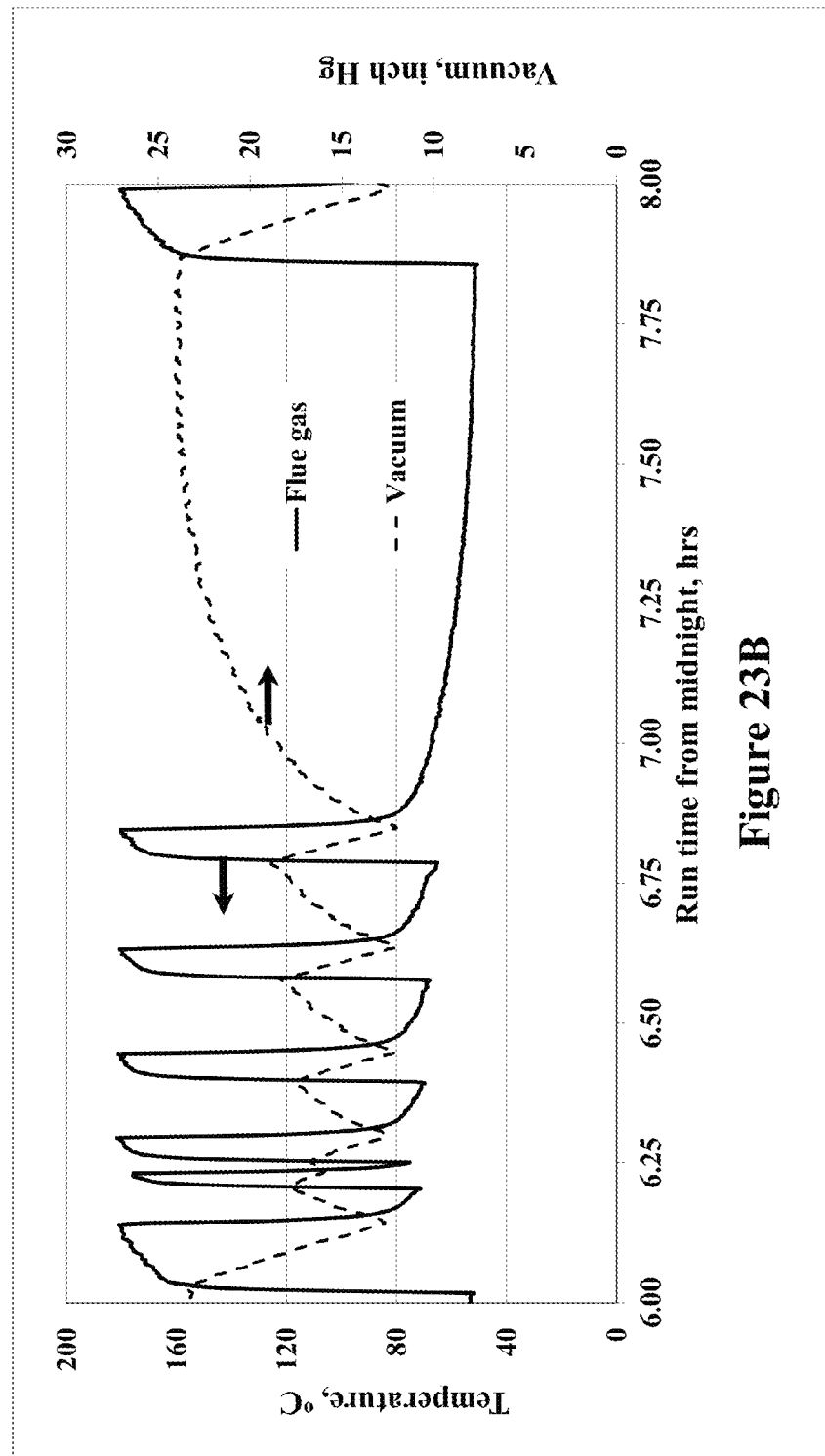
FIG. 23B presents the chart record data of hours 6 am to 8 am of the 24 hour chart record of FIG. 23A.

In FIG. 23B, the hours 6 am to 8 am of the 24 hour chart record of FIG. 23A are presented. The record shows there was intermittent vacuum pump switching "on" at ~6:12 AM during heating cycle. Please, note that vacuum level of 25 inches Hg reached later after heating cycles exceeds vacuum controller upper setting of 18 inches Hg.

In an upgraded system the boiler is fired and stopped by a temperature controller based on the vapor temperature at the boiler exit. For example, on cold days the boiler operates in the 80-90° C. (176-194° F.) range; on warmer days, the range can be reduced to 65-75° C. (149-167° F.) or lower. When cold-started, the boiler heats up to its upper set temperature and is then stopped (while continuing to supply vapor to the radiators) and cooled until it reaches the lower set temperature, at which point it is fired up again, and so on.

After the experimental data was collected from testing the old boiler and new vacuum steam heating system embodiment of the present invention, then the new vacuum steam heating system was disconnected from the boiler and the original steam system was reconnected. The original steam system configuration was monitored for around two weeks. Then at that point, a new high-efficiency Peerless boiler was installed and connected to the old steam system. After a weeklong test, the old system was disconnected and the new vacuum heating system was connected to the new boiler. Finally, in order to avoid frequent cycling, the vacuum sustaining steam heating system was tuned by replacing the radiator in the farthest room where the thermostat was located, with another radiator with a larger capacity. Thus, both the old steam system and the new vacuum steam system were paired up for testing with the old boiler and the new boiler.

Figure 24:
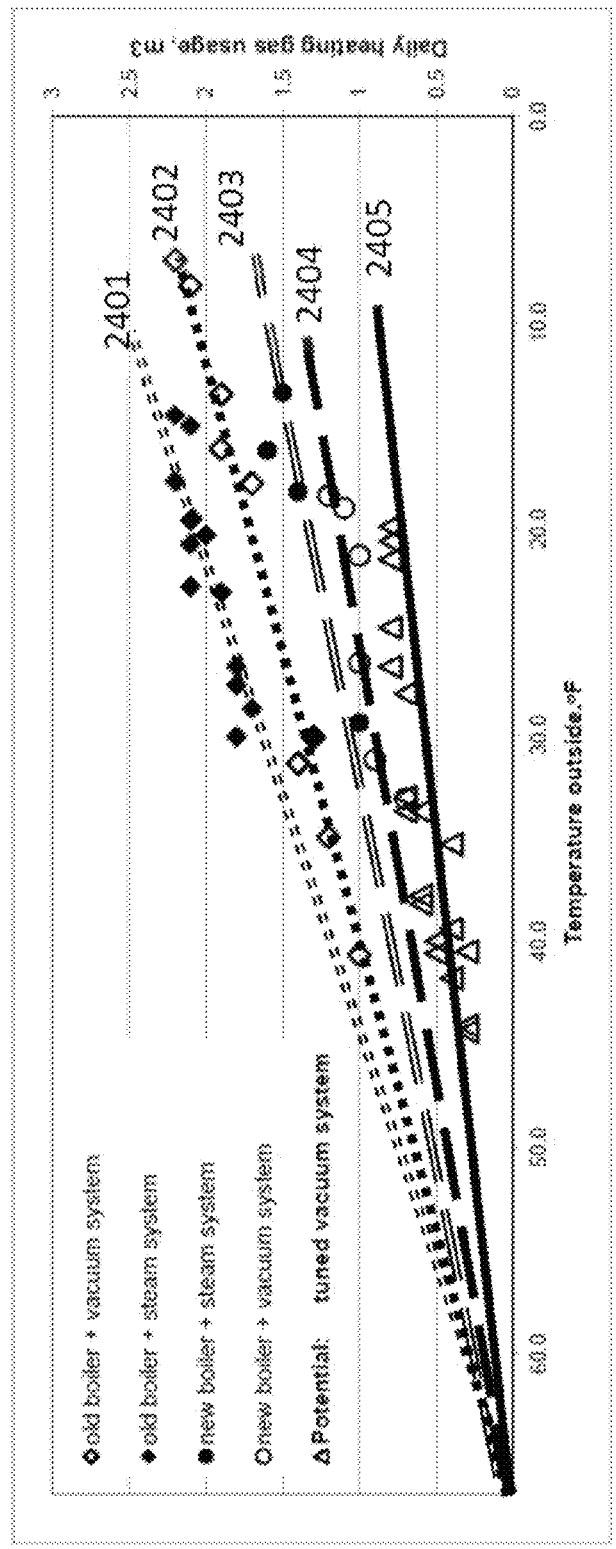
FIG. 24 presents a graph of field test data for five types of heating systems: original steam boiler and original steam system, original steam boiler and new vacuum distribution system, new steam boiler and original steam system, new boiler and new vacuum distribution system, tuned new boiler and new vacuum distribution system related to the present invention.

FIG. 24 presents a graph plotting field test data for five types heating systems: 2401, 2402, 2403, 2404, and 2405 related to the present invention. The Y-axis is "Daily heating gas usage, cubic meters" and the X-axis is average "Temperature outside, ° F.". It was assumed that the zero intercept of the Y-axis (when there is zero gas consumption) will occur at average outside temperature 67° F. which is equal to the average inside temperature. It was assumed also that heat loss from the house and corresponding fuel gas usage is linearly proportional to the difference between inside and outside average daily temperatures. The key to the line plots in FIG. 24 is as shown in Table 3, and the results are shown in Table 4.

TABLE 3

Experimental Setup

| Plot | Description |
|---|---|
| 2401 | System 2401 plots test data from tests of old boiler with original steam distribution system. |
| 2402 | System 2402 plots test data is from tests of old boiler with new vacuum distribution system. |
| 2403 | System 2403 plots test data is from tests of new boiler with original steam distribution system. |
| 2404 | System 2404 plots test data is from tests of new boiler with new vacuum distribution system. |
| 2405 | System 2405 plots test data of a "tuned system" of new boiler with new vacuum distribution system. |

TABLE 4

Experimental Results

| System comparison | Predicted Consumption (Therms) | Percent Savings |
|---|---|---|
| Old Boiler - Single Pipe Steam | 1,004 | |
| Old Boiler - Vacuum System | 741 | 26.2% |
| New Boiler - Single Pipe Steam | 840 | |
| New Boiler - Vacuum System | 541 | 35.5% |
| Old Boiler - Single Pipe Steam | 1,004 | |
| New Boiler - Single Pipe Steam | 840 | 16.4% |
| Old Boiler - Vacuum System | 741 | |
| New Boiler - Vacuum System | 541 | 27.0% |
| New Boiler - Vacuum System | 541 | |
| New Boiler - Tuned Vacuum System | 500 | 7.7% |
| Old Boiler - Single Pipe Steam | 1,004 | |
| New Boiler - Tuned Vacuum System | 500 | 50.2% |

Linear regression analysis of gas consumption as a function of outside temperature was performed, with a correction on outdoor light intensity; results are presented in Table 4 and FIG. 24. It can be concluded that the boiler upgrade yielded an approximately 16 to 27 percent fuel savings (steam and vacuum distribution system, correspondingly); an additional 26 percent to 35 percent gain was achieved by retrofit of the distribution system from steam to vacuum. The local gas provider hired an independent vendor to verify the test methodology, operation consistency and inside-outside temperatures. From a cold start, the new radiators were observed to be hot all the way across after around 20 minutes. In a typical steam system, the radiators most remote from the boiler would be the last to receive heat and also the cause of uneven heat distribution and excessive fuel usage; but in a vacuum system the radiators are heated more evenly, almost simultaneously.

These experimental heating system embodiments of the present invention demonstrated the present invention embodiments provide gains in system efficiency fuel economy and the following additional benefits as well:

(1) Invention produces a deep vacuum of 25-28 in Hg in the heating system when heating system is idle which means there is a broad range of operating temperatures given the amount of vacuum that can be attained to produce steam vapor for radiators which means better human comfort;

(2) Invention needs no steam traps and no hot condensate pumps which translates to a heating system with low maintenance costs and higher reliability;

(3) Invention can use lower-capacity vacuum pumps and run the vacuum pump for a short time which means less electricity dependence;

(4) Invention can use small-diameter copper/plastic tubing which means a heating system of the present invention has a low installation cost, minimal corrosion, is less leak-prone, has improved safety, no water spillover and no expensive repairs; and (5) Invention can use flat-panel lightweight radiators which are quick to heat up, do not cause room overheating.

This test case only demonstrates the potential savings of retrofitting a very small building. In bigger projects, higher energy efficiency gains can be predicted because in a conventional steam system, the bigger the building, the more uneven the heat distribution. The major vacuum system concern—maintaining vacuum and preventing leaks—is resolved by the new control concept, plumbing and elimination of steam traps.

10.B. Further Optional Improvements to Reduce Noise

In a tested setup of the heating system, while the boiler was on during the heating cycle and vapor linear velocity in the tubes is high, water droplets from the supply conduit were carried into the radiators. In a cooling system with idle boiler, a bubbling noise was observed in the horizontal vapor supply conduit lines 1510, 1512 and 1513 at the point where these vapor supply conduit lines bend-up to the radiators (see FIG. 15 schematic).

To try to prevent this noise, one method tested was a modified vapor supply line to a radiator. As depicted in FIG. 25 schematic, a T-connection of main vapor supply conduit line 2501 is made with a ⅝" copper-pipe vapor supply line 2502. The ⅝" copper-tube vapor supply line 2502 connected to copper tee 2506 on main in a basement by Propress fitting 2508 and is then connected to a ⅝" OD Teflon-tube 2504 by using a compression union 2503. A long flexible polypropylene ½"OD tube 2505 is inserted inside the Teflon tube 2540 and the copper-pipe 2502. The lower end of the inner tube 2505 is fixed in an upper portion of the copper-tube vapor supply line 2502 to facilitate vapor 2506 going into entrance of the thin polypropylene tube 2505 while condensate 2507 accumulates and flows down into the main vapor supply conduit line 2501 through annulus created by polypropylene tube 2505 inside copper-pipe 2502.

Other methods to prevent this noise include the following: (a) using a spiral insert in the vertical portion of the riser to spin the flow in order to create centrifugal force in the uprising vapor and push water droplets toward walls—can be used in combination with an inner tube; (b) using a special profile of main and horizontal tubes where droplets of condensate are separated into lower segment/partition of conduit and flow back into the boiler by gravity. These tubes can be made from extruded plastic (for example polysulfone). Such special tubing will provide the counter-flow of vapor (toward radiators) and condensate (return into the boiler) in the main and branch lines. To prevent vapor bubbling through condensate in the branching tee, a special tee design is proposed. For more detail see the specialized T-connector and vapor supply lines depicted in FIG. 16A, and FIG. 16B; and (c) supplying vapor into the radiators by a down-feed vapor supply conduit line (for example from the top of the house) so that droplets of water in the supply lines will naturally flow into the radiators and back into the boiler.

CONCLUSION

While the methods disclosed herein have been described and shown with reference to particular operations performed in a particular order, it will be understood that these operations may be combined, sub-divided, or re-ordered to form equivalent methods without departing from the teachings of the present invention. Accordingly, unless specifically indicated herein, the order and grouping of the operations is not a limitation of the present invention.

While the present invention has been particularly shown and described with reference to embodiments thereof, it will be understood by those skilled in the art that various other changes in the form and details may be made without departing from the spirit and scope of the present invention.

What is claimed is:

1. A heating system integrating a closed-loop, two-pipe vapor vacuum distribution sub-system, comprising:
   a vapor source adapted to generate vapor, the vapor source having a vapor source temperature sensor and a vapor source pressure sensor adapted to sense a vapor source temperature and a vapor source pressure of the vapor from the vapor source;
   a plurality of radiators;
   an up-feeder conduit connecting said vapor source to said radiators;
   a down-return conduit for returning condensate by gravity from each radiator, wherein said down-return conduit contains no steam traps;
   a separator adapted to separate the condensate into liquid and gas phases, and to feed the liquid phase into the vapor source, wherein the separator comprises a gravity return condensate line from the separator via a check valve into the vapor source, and wherein the separator comprises a separator temperature sensor adapted to sense a separator temperature of the condensate at the separator;
   a vacuum pump connected to the separator to evacuate air from the heating system to a preset vacuum interval, wherein the vapor source, the radiators, the up-feeder conduit, the down-return conduit, and the separator are sufficiently air-tight to ensure vacuum pump operation;
   a vapor source control unit for controlling the vapor source based on a building temperature controller, and additionally based on a preset vapor source temperature interval by measuring the vapor source temperature sensed by the vapor source temperature sensor and/or the vapor source pressure sensed by the vapor source pressure sensor; and
   a vacuum pump control unit for controlling the vacuum pump based on the vapor source pressure sensor to maintain the preset vacuum interval in the heating system, and additionally based on a preset separator limiting temperature of the separator temperature sensor,
   wherein when the vapor source is on and the separator temperature is below the preset separator limiting temperature, the vacuum pump is turned on, and wherein when the vapor source is on and the separator temperature exceeds the preset separator limiting temperature, the vacuum pump is turned off, thereby switching the vacuum pump off when hot vapor enters the separator and allowing the vacuum pump to remove only air without being exposed to hot vapor.

2. The system of claim 1, wherein the preset vacuum interval is within 5 to 15 inches Hg when the vapor source is on, and within 10 to 20 inches Hg when the vapor source is off, with the heating system itself producing a higher vacuum level during a cooling phase.

3. The system of claim 1, wherein supply conduit tubing and fittings provision a condensate return channel at a bottom of a vapor supply conduit.

4. The system of claim 1, wherein at a temperature as low as 20° C. on the gravity return condensate line at the separator, the vacuum pump control unit stops the vacuum pump, and the preset vacuum interval is between 27 inch Hg (off) and 0.5 inch Hg (on).

5. The system of claim 1, wherein the preset vapor source temperature interval is a function of outside temperature.

6. The system of claim 1, wherein the vapor source is a boiler.

7. The system of claim 1, wherein the vapor source, located at a building top, supplies vapor into the radiators via down-feed from the building top.

8. The system of claim 7, wherein radiators on lowest floor(s) of a high rise building are connected to the separator via a separate line in order to prevent condensate flooding from the radiators located on higher floors.

9. The system of claim 1, further comprising a plurality of one or more additional separators.

10. The system of claim 9, wherein heat distribution is controlled by changing a vacuum level in the separators.

11. The system of claim 1, wherein the vapor source is located on a top of a building and comprises an evaporating section and a storage section, wherein condensate from a bottom is periodically returned into the storage section of the vapor source by a liquid lift apparatus.

12. The system of claim 11, wherein the liquid lift apparatus is adapted to pumping a liquid to a height above 10 meters by using a liquid lift vacuum pump, compartments, and valves, the liquid lift apparatus comprising:
 means for filling a lowest compartment with the liquid, closing a liquid supply line, and connecting the lowest compartment to atmosphere;
 means for switching the liquid lift vacuum pump on and pulling the liquid from a lower compartment at a bottom to a compartment above at a top via transport tubes connecting the bottom of the lower compartment to the top of the compartment above; and
 means for switching the liquid lift vacuum pump off when all of the liquid from the lowest compartment is pulled to a top-most compartment by vacuum, opening a valve to discharge the liquid from the top-most compartment, and closing the valve.

13. The system of claim 1, wherein the vapor source is a heat exchanger with heat supplied into the heat exchanger from a district heating grid.

14. The system of claim 1, wherein the vapor source is steam from a district heating grid supplied into the heating system based on a signal from the building temperature controller, and the condensate is periodically returned into the district heating grid via the separator.

15. The system of claim 14, wherein the steam from the district heating grid is supplied through a perforated plate of an evaporator.

16. The system of claim 1, further comprising:
 means to prevent condensate hammering in return lines of the heating system, wherein the return lines from the radiators to a vertical collector line are smaller in diameter, and wherein the vertical collector line is divided into compartments by soxhlet type separators.

17. The system of claim 1, wherein an electrostatic capacitive sensor in the separator is calibrated to indicate an air content in the gas phase via a difference in a water vapor capacitance in vacuum, and a current gas phase capacitance in the heating system.

18. The system of claim 1, further comprising a plurality of one or more additional separators, and wherein an electrostatic capacitive sensor is located in each of the separators to monitor and locate air leakage for a riser base associated with each separator.

19. A heating system integrating a closed-loop vapor vacuum distribution sub-system, a vapor source, and a plurality of radiators, the heating system comprising:
 a separator adapted to separate condensate into liquid and gas phases, and to feed the liquid phase into the vapor source, wherein the separator comprises a separator temperature sensor adapted to sense a separator temperature of the condensate at the separator;
 a vacuum pump to evacuate air from the heating system to a preset vacuum interval; and
 a vacuum pump control unit for controlling the vacuum pump based on a pressure sensor to maintain the preset vacuum interval in the heating system, and additionally based on a preset separator limiting temperature of the separator temperature sensor,
 wherein when the vapor source is on and the separator temperature is below the preset separator limiting temperature, the vacuum pump is turned on, and
 wherein when the vapor source is on and the separator temperature exceeds the preset separator limiting temperature, the vacuum pump is turned off, thereby switching the vacuum pump off when hot vapor enters the separator and allowing the vacuum pump to remove only air without being exposed to hot vapor.

20. The system of claim 19, wherein the preset vacuum interval is between 2 to 20 inches Hg, with the heating system itself producing a higher vacuum during a cooling phase.

21. The system of claim 19, further comprising a plurality of one or more additional separators.

22. The system of claim 21, wherein heat distribution is controlled by changing a vacuum level in the separators.

23. The system of claim 19, wherein an electrostatic capacitive sensor in the separator is calibrated to indicate an air content in the gas phase via a difference in a water vapor capacitance in vacuum, and a current gas phase capacitance in the heating system.

24. A control unit for a heating system comprising a closed-loop vapor vacuum distribution sub-system, a vapor source, a plurality of radiators, a separator for separating condensate into liquid and gas phases, and a vacuum pump to evacuate air from the heating system to a preset vacuum interval, the control unit comprising:
 a controller for controlling the vacuum pump based on a pressure sensor to maintain the preset vacuum interval in the heating system, and additionally based on a separator temperature sensor adapted to sense a separator temperature of the condensate in the separator,
 wherein when the vapor source is on and the separator temperature is below a preset separator limiting temperature, the vacuum pump is turned on, and
 wherein when the vapor source is on and the separator temperature exceeds the preset separator limiting temperature, the vacuum pump is turned off, thereby switching the vacuum pump off when hot vapor enters the separator and enabling the vacuum pump to remove mostly air without hot vapor.

25. The control unit of claim 24, wherein the control unit performs a process to routinely check a vacuum level of the heating system and restore if necessary, by turning on the vacuum pump when the vapor source is off, a vapor source temperature is below 100° F., and the vacuum level in the heating system is below the preset vacuum interval.

26. The control unit of claim 24, wherein the control unit performs a process to check for leak tightness of the heating system by monitoring a vacuum level in the heating system based on the pressure sensor, and activates an alarm when a temperature of the vapor at the pressure sensed by the pressure sensor deviates from a steam table value of a saturated steam temperature at the sensed pressure.

27. The control unit of claim 24, wherein the vapor source is switched on and off by the control unit until a temperature in a space to be heated is equal to a thermostat set temperature.

28. The control unit of claim 24, wherein a vacuum level and a corresponding temperature of the vapor source are adjusted based on an outside temperature, and wherein a lower outside temperature results in a higher operating pressure and a corresponding higher temperature of the vapor source.

29. The system of claim 19, wherein return lines from the radiators are smaller in diameter than a common vertical condensate return line.

\* \* \* \* \*